(12) United States Patent
Chandrashekhar et al.

(10) Patent No.: US 11,258,668 B2
(45) Date of Patent: Feb. 22, 2022

(54) NETWORK CONTROLLER FOR MULTI-SITE LOGICAL NETWORK

(71) Applicant: VMware, Inc., Palo Alto, CA (US)

(72) Inventors: Ganesan Chandrashekhar, Campbell, CA (US); Pankaj Thakkar, Cupertino, CA (US); Aravinda Kidambi Srinivasan, Mountain View, CA (US); Aayush Saxena, Santa Clara, CA (US); Anuprem Chalvadi, Sunnyvale, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/906,935

(22) Filed: Jun. 19, 2020

(65) Prior Publication Data

US 2021/0314225 A1 Oct. 7, 2021

Related U.S. Application Data

(60) Provisional application No. 63/005,934, filed on Apr. 6, 2020.

(51) Int. Cl.
*H04L 12/24* (2006.01)
*H04L 12/26* (2006.01)
(Continued)

(52) U.S. Cl.
CPC .......... *H04L 41/0893* (2013.01); *H04L 41/02* (2013.01); *H04L 41/0246* (2013.01);
(Continued)

(58) Field of Classification Search
None
See application file for complete search history.

(56) References Cited

U.S. PATENT DOCUMENTS 6,219,699 B1 4/2001 McCloghrie et al.
6,347,374 B1 2/2002 Drake et al.
(Continued)

FOREIGN PATENT DOCUMENTS

CN 102124456 A 7/2011
CN 103650433 A 3/2014
(Continued)

OTHER PUBLICATIONS

Author Unknown, "Apache Cassandra™ 12 Documentation," Jan. 13, 2013, 201 pages, DataStax.
(Continued)

*Primary Examiner* — Lance Leonard Barry
(74) *Attorney, Agent, or Firm* — Adeli LLP

(57) ABSTRACT

Some embodiments provide a method for a first network controller executing at a first site of multiple sites spanned by a logical network. Network controllers execute at each site. The method generates logical network state data for the first site based on (i) data received from computing devices that implement the logical network at the first site and (ii) logical network configuration data from a network manager at the first site. The method provides the logical network state data for the first site to a second network controller executing at a second site. The method provides logical network state data received from the second site to the computing devices that implement the logical network at the first site.

25 Claims, 36 Drawing Sheets

(51) Int. Cl.
    *H04L 29/12*     (2006.01)
    *H04L 29/08*     (2006.01)
    *H04L 41/0893*     (2022.01)
    *H04L 43/06*     (2022.01)
    *H04L 61/103*     (2022.01)
    *H04L 41/02*     (2022.01)
    *H04L 43/04*     (2022.01)
    *H04L 41/0873*     (2022.01)
    *H04L 41/085*     (2022.01)
    *H04L 41/0246*     (2022.01)
    *H04L 67/289*     (2022.01)
    *H04L 41/22*     (2022.01)

(52) U.S. Cl.
    CPC ........ *H04L 41/085* (2013.01); *H04L 41/0873* (2013.01); *H04L 43/04* (2013.01); *H04L 43/06* (2013.01); *H04L 61/103* (2013.01); *H04L 41/22* (2013.01); *H04L 67/289* (2013.01)

(56) References Cited

U.S. PATENT DOCUMENTS

| | | |
|---|---|---|
| 7,502,884 B1 | 3/2009 | Shah et al. |
| 7,802,000 B1 | 9/2010 | Huang et al. |
| 8,479,275 B1 | 7/2013 | Naseh |
| 8,611,351 B2 | 12/2013 | Gooch et al. |
| 8,625,616 B2 | 1/2014 | Vobbilisetty et al. |
| 8,660,129 B1 | 2/2014 | Brendel et al. |
| 8,707,417 B1 | 4/2014 | Liang et al. |
| 9,311,122 B2 | 4/2016 | Guay et al. |
| 9,330,161 B2 | 5/2016 | D'Amato et al. |
| 9,432,215 B2 | 8/2016 | Stabile et al. |
| 9,602,312 B2 | 3/2017 | Koponen et al. |
| 9,672,054 B1 | 6/2017 | Gupta et al. |
| 9,672,060 B2 | 6/2017 | Behere et al. |
| 9,825,851 B2 | 11/2017 | Agarwal et al. |
| 9,847,938 B2 | 12/2017 | Chanda et al. |
| 9,912,616 B2 | 3/2018 | Shen et al. |
| 9,923,811 B2 | 3/2018 | Agarwal et al. |
| 9,977,688 B2 | 5/2018 | Nipane et al. |
| 10,091,028 B2 | 10/2018 | Koponen et al. |
| 10,110,417 B1 | 10/2018 | Hankins et al. |
| 10,120,668 B2 | 11/2018 | Palavalli et al. |
| 10,135,675 B2 | 11/2018 | Yu et al. |
| 10,142,127 B2 | 11/2018 | Cherian et al. |
| 10,162,656 B2 | 12/2018 | Palavalli et al. |
| 10,187,302 B2 | 1/2019 | Chu et al. |
| 10,205,771 B2 | 2/2019 | Palavalli et al. |
| 10,241,820 B2 | 3/2019 | Lambeth et al. |
| 10,243,797 B2 | 3/2019 | Lambeth et al. |
| 10,243,834 B1 | 3/2019 | Shekhar et al. |
| 10,243,846 B2 | 3/2019 | Jiang et al. |
| 10,243,848 B2 | 3/2019 | Agarwal et al. |
| 10,257,049 B2 | 4/2019 | Fried et al. |
| 10,339,123 B2 | 7/2019 | Venkatesh et al. |
| 10,560,343 B1 | 2/2020 | Cartsonis et al. |
| 10,579,945 B2 | 3/2020 | Gaurav et al. |
| 10,637,800 B2 | 4/2020 | Wang et al. |
| 10,673,752 B2 | 6/2020 | Agarwal et al. |
| 10,693,833 B2 | 6/2020 | Mathew et al. |
| 10,832,224 B2 | 11/2020 | Palavalli et al. |
| 10,880,158 B2 | 12/2020 | Lambeth et al. |
| 10,880,170 B2 | 12/2020 | Wang et al. |
| 10,897,420 B1 | 1/2021 | Pianigiani et al. |
| 10,908,938 B2 | 2/2021 | Palavalli et al. |
| 10,942,788 B2 | 3/2021 | Palavalli et al. |
| 10,999,154 B1 | 5/2021 | Ahrenholz et al. |
| 11,057,275 B1 | 7/2021 | Arunachalam et al. |
| 11,088,902 B1 | 8/2021 | Palavalli et al. |
| 11,088,916 B1 | 8/2021 | Chandrashekhar et al. |
| 11,088,919 B1 | 8/2021 | Chandrashekhar et al. |
| 2002/0029270 A1 | 3/2002 | Szczepanek |
| 2002/0093952 A1 | 7/2002 | Gonda |
| 2002/0131414 A1 | 9/2002 | Hadzic |
| 2003/0167333 A1 | 9/2003 | Kumar et al. |
| 2003/0185151 A1 | 10/2003 | Kurosawa et al. |
| 2003/0185152 A1 | 10/2003 | Nederveen et al. |
| 2003/0188114 A1 | 10/2003 | Lubbers et al. |
| 2003/0188218 A1 | 10/2003 | Lubbers et al. |
| 2004/0052257 A1 | 3/2004 | Abdo et al. |
| 2005/0190757 A1 | 9/2005 | Sajassi |
| 2005/0235352 A1 | 10/2005 | Staats et al. |
| 2005/0288040 A1 | 12/2005 | Charpentier et al. |
| 2006/0092976 A1 | 5/2006 | Lakshman et al. |
| 2006/0179243 A1 | 8/2006 | Fields et al. |
| 2006/0179245 A1 | 8/2006 | Fields et al. |
| 2006/0193252 A1 | 8/2006 | Naseh et al. |
| 2006/0221720 A1 | 10/2006 | Reuter |
| 2006/0251120 A1 | 11/2006 | Arimilli et al. |
| 2007/0058631 A1 | 3/2007 | Mortier et al. |
| 2007/0130295 A1 | 6/2007 | Rastogi et al. |
| 2007/0217419 A1 | 9/2007 | Vasseur |
| 2007/0239987 A1 | 10/2007 | Hoole et al. |
| 2008/0013474 A1 | 1/2008 | Nagarajan et al. |
| 2008/0049646 A1 | 2/2008 | Lu |
| 2008/0104302 A1 | 5/2008 | Carpio |
| 2008/0133729 A1 | 6/2008 | Fridman et al. |
| 2008/0268847 A1 | 10/2008 | Mukherjee et al. |
| 2008/0301379 A1 | 12/2008 | Pong |
| 2009/0037367 A1 | 2/2009 | Wein |
| 2009/0070337 A1 | 3/2009 | Romem et al. |
| 2009/0193297 A1 | 7/2009 | Williams et al. |
| 2009/0241192 A1 | 9/2009 | Thomas |
| 2009/0279536 A1 | 11/2009 | Unbehagen et al. |
| 2009/0279545 A1 | 11/2009 | Moonen |
| 2009/0292858 A1 | 11/2009 | Lambeth et al. |
| 2009/0296726 A1 | 12/2009 | Snively et al. |
| 2010/0250784 A1 | 9/2010 | Henry et al. |
| 2010/0257263 A1 | 10/2010 | Casado et al. |
| 2010/0275199 A1 | 10/2010 | Smith et al. |
| 2010/0322255 A1 | 12/2010 | Hao et al. |
| 2011/0032898 A1 | 2/2011 | Kazmi et al. |
| 2011/0047218 A1 | 2/2011 | Nojima et al. |
| 2011/0051714 A1 | 3/2011 | Somes |
| 2011/0085569 A1 | 4/2011 | Gnanasekaran et al. |
| 2011/0164752 A1 | 7/2011 | Wainner et al. |
| 2011/0188509 A1 | 8/2011 | Kern et al. |
| 2011/0231602 A1 | 9/2011 | Woods et al. |
| 2011/0299413 A1 | 12/2011 | Chatwani et al. |
| 2012/0084406 A1 | 4/2012 | Kumbalimutt |
| 2012/0120964 A1 | 5/2012 | Koponen et al. |
| 2012/0147898 A1 | 6/2012 | Koponen et al. |
| 2012/0275328 A1 | 11/2012 | Iwata et al. |
| 2013/0018947 A1 | 1/2013 | Archer et al. |
| 2013/0024579 A1 | 1/2013 | Zhang et al. |
| 2013/0042242 A1 | 2/2013 | Kagan |
| 2013/0044636 A1 | 2/2013 | Koponen et al. |
| 2013/0044641 A1 | 2/2013 | Koponen et al. |
| 2013/0044761 A1* | 2/2013 | Koponen ............... H04L 45/04 370/401 |
| 2013/0058250 A1 | 3/2013 | Casado et al. |
| 2013/0058335 A1 | 3/2013 | Koponen et al. |
| 2013/0058350 A1 | 3/2013 | Fulton |
| 2013/0058354 A1 | 3/2013 | Casado et al. |
| 2013/0058358 A1 | 3/2013 | Fulton et al. |
| 2013/0060819 A1 | 3/2013 | Lambeth et al. |
| 2013/0060940 A1 | 3/2013 | Koponen et al. |
| 2013/0074065 A1 | 3/2013 | McNeeney et al. |
| 2013/0103817 A1 | 4/2013 | Koponen et al. |
| 2013/0125120 A1 | 5/2013 | Zhang et al. |
| 2013/0132533 A1 | 5/2013 | Padmanabhan et al. |
| 2013/0144992 A1 | 6/2013 | Barabash et al. |
| 2013/0159637 A1 | 6/2013 | Forgette et al. |
| 2013/0212212 A1 | 8/2013 | Addepalli et al. |
| 2013/0215769 A1 | 8/2013 | Beheshti-Zavareh et al. |
| 2013/0254328 A1 | 9/2013 | Inoue et al. |
| 2013/0286833 A1 | 10/2013 | Torres et al. |
| 2013/0287026 A1 | 10/2013 | Davie |
| 2013/0301425 A1 | 11/2013 | Udutha et al. |
| 2013/0301501 A1 | 11/2013 | Olvera-Hernandez et al. |
| 2013/0308641 A1 | 11/2013 | Ackley |
| 2014/0064104 A1 | 3/2014 | Nataraja et al. |
| 2014/0136908 A1 | 5/2014 | Maggiari et al. |

(56) References Cited

U.S. PATENT DOCUMENTS

| | | |
|---|---|---|
| 2014/0146817 A1 | 5/2014 | Zhang |
| 2014/0172740 A1 | 6/2014 | McCormick et al. |
| 2014/0208150 A1 | 7/2014 | Abuelsaad et al. |
| 2014/0211661 A1 | 7/2014 | Gorkemli et al. |
| 2014/0241356 A1 | 8/2014 | Zhang et al. |
| 2014/0250220 A1 | 9/2014 | Kapadia et al. |
| 2014/0269435 A1 | 9/2014 | McConnell et al. |
| 2014/0301391 A1 | 10/2014 | Krishnan et al. |
| 2014/0337500 A1 | 11/2014 | Lee |
| 2015/0009797 A1 | 1/2015 | Koponen et al. |
| 2015/0016276 A1 | 1/2015 | Decusatis et al. |
| 2015/0063364 A1 | 3/2015 | Thakkar et al. |
| 2015/0100704 A1 | 4/2015 | Davie et al. |
| 2015/0103842 A1 | 4/2015 | Chandrashekhar et al. |
| 2015/0103843 A1 | 4/2015 | Chandrashekhar et al. |
| 2015/0106804 A1 | 4/2015 | Chandrashekhar et al. |
| 2015/0117256 A1* | 4/2015 | Sabaa ............... H04L 12/4633 370/254 |
| 2015/0229641 A1 | 8/2015 | Sun et al. |
| 2015/0237014 A1 | 8/2015 | Bansal et al. |
| 2015/0263946 A1 | 9/2015 | Tubaltsev et al. |
| 2015/0312326 A1 | 10/2015 | Archer et al. |
| 2015/0326467 A1 | 11/2015 | Fullbright et al. |
| 2016/0057014 A1 | 2/2016 | Thakkar et al. |
| 2016/0094396 A1 | 3/2016 | Chandrashekhar et al. |
| 2016/0134528 A1 | 5/2016 | Lin et al. |
| 2016/0210209 A1* | 7/2016 | Verkaik ............... G06F 11/2033 |
| 2016/0352588 A1* | 12/2016 | Subbarayan ........... H04L 67/32 |
| 2016/0373530 A1* | 12/2016 | Duda ..................... H04L 45/58 |
| 2016/0380815 A1 | 12/2016 | Agarwal et al. |
| 2016/0380891 A1 | 12/2016 | Agarwal et al. |
| 2016/0380925 A1 | 12/2016 | Agarwal et al. |
| 2016/0380973 A1 | 12/2016 | Sullenberger et al. |
| 2017/0034129 A1 | 2/2017 | Sawant et al. |
| 2017/0048110 A1 | 2/2017 | Wu et al. |
| 2017/0048130 A1 | 2/2017 | Goliya et al. |
| 2017/0063633 A1 | 3/2017 | Goliya et al. |
| 2017/0063794 A1 | 3/2017 | Jain et al. |
| 2017/0063822 A1 | 3/2017 | Jain et al. |
| 2017/0104720 A1 | 4/2017 | Bansal et al. |
| 2017/0126551 A1 | 5/2017 | Pfaff et al. |
| 2017/0163532 A1 | 6/2017 | Tubaltsev et al. |
| 2017/0163598 A1 | 6/2017 | Shen et al. |
| 2017/0163599 A1 | 6/2017 | Shen et al. |
| 2017/0171055 A1 | 6/2017 | Wang et al. |
| 2017/0249195 A1* | 8/2017 | Sadana .................... G06F 9/505 |
| 2017/0250912 A1 | 8/2017 | Chu et al. |
| 2017/0264483 A1 | 9/2017 | Lambeth et al. |
| 2017/0289033 A1 | 10/2017 | Singh et al. |
| 2017/0310641 A1* | 10/2017 | Jiang ..................... H04L 61/103 |
| 2017/0317954 A1 | 11/2017 | Masurekar et al. |
| 2017/0317969 A1 | 11/2017 | Masurekar et al. |
| 2017/0324645 A1 | 11/2017 | Johnsen et al. |
| 2017/0331711 A1* | 11/2017 | Duda ................. H04L 41/0631 |
| 2017/0344444 A1* | 11/2017 | Costa-Roberts ...... H04L 41/046 |
| 2018/0062881 A1 | 3/2018 | Chandrashekhar et al. |
| 2018/0062923 A1 | 3/2018 | Katrekar et al. |
| 2018/0063195 A1 | 3/2018 | Nimmagadda et al. |
| 2018/0123877 A1 | 5/2018 | Saxena et al. |
| 2018/0123903 A1 | 5/2018 | Holla et al. |
| 2018/0157537 A1 | 6/2018 | Chen et al. |
| 2018/0234459 A1 | 8/2018 | Kung et al. |
| 2018/0309718 A1 | 10/2018 | Zuo |
| 2019/0014040 A1 | 1/2019 | Yerrapureddy et al. |
| 2019/0190780 A1 | 6/2019 | Wang et al. |
| 2019/0207847 A1 | 7/2019 | Agarwal et al. |
| 2019/0260610 A1 | 8/2019 | Dubey et al. |
| 2019/0260630 A1 | 8/2019 | Stabile et al. |
| 2019/0303326 A1 | 10/2019 | Desai et al. |
| 2019/0334765 A1 | 10/2019 | Jain et al. |
| 2019/0342175 A1 | 11/2019 | Wan et al. |
| 2019/0363975 A1 | 11/2019 | Djernaes |
| 2019/0379731 A1 | 12/2019 | Johnsen et al. |
| 2020/0021541 A1 | 1/2020 | Chanda |
| 2020/0076684 A1 | 3/2020 | Naveen et al. |
| 2020/0106744 A1 | 4/2020 | Miriyala et al. |
| 2020/0169496 A1 | 5/2020 | Goliya et al. |
| 2020/0195607 A1 | 6/2020 | Wang et al. |
| 2020/0296035 A1 | 9/2020 | Agarwal et al. |
| 2020/0358693 A1 | 11/2020 | Rawlins |
| 2020/0366741 A1 | 11/2020 | Kancherla et al. |
| 2021/0194729 A1 | 6/2021 | Semwal et al. |

FOREIGN PATENT DOCUMENTS

| | | |
|---|---|---|
| CN | 103890751 A | 6/2014 |
| CN | 110061899 A | 7/2019 |
| EP | 1154601 A1 | 11/2001 |
| EP | 1635506 A1 | 3/2006 |
| EP | 1868318 A1 | 12/2007 |
| EP | 3016331 A1 | 5/2016 |
| EP | 3314831 A1 | 5/2018 |
| EP | 3485610 A1 | 5/2019 |
| WO | 2010028364 A1 | 3/2010 |
| WO | 2012113444 A1 | 8/2012 |
| WO | 2013152716 A1 | 10/2013 |
| WO | 2015054671 A2 | 4/2015 |
| WO | 2017003881 A1 | 1/2017 |
| WO | 2018044341 A1 | 3/2018 |

OTHER PUBLICATIONS

Author Unknown, "OpenFlow Switch Specification, Version 1.1.0 Implemented (Wire Protocol 0x02)," Feb. 28, 2011, 56 pages, Open Networking Foundation.
Berde, Pankaj, et al., "ONOS Open Network Operating System An Open-Souice Distributed SDN OS," Dec. 19, 2013, 34 pages.
Hanna, Jeremy, "How ZooKeeper Handles Failure Scenarios," http://.apache.org/hadoop/Zookeeper/Failurescenarios. Dec. 9, 2010, 1 page.
Heller, Brandon, et al., "The Controller Placement Problem," Hot Topics in Software Defined Networks, Aug. 13, 2012, 6 pages, Helsinki, Finland.
Krishnaswamy, Umesh, et al., "ONOS Open Network Operating System—An Experimental Open-Source Distributed SDN OS," Apr. 16, 2013, 24 pages.
Lebresne, Sylvain, "[Release] Apache Cassandra 1.2 released," Jan. 2, 2013, 1 page.
Mahalingham, Mallik, et al., "VXLAN: A Framework for Overlaying Virtualized Layer 2 Networks over Layer 3 Networks," draft-mahalingham-dutt-dcops-vxlan-02.txt Internet Draft, Aug. 22, 2012, 20 pages, Internet Engineering Task Force.
Mahalingham, Mallik, et al., "VXLAN: A Framework for Overlaying Virtualized Layer 2 Networks over Layer 3 Networks," draft-mahalingham-dutt-dcops-vxlan-00.txt Internet Draft, Aug. 26, 2011, 20 pages, Internet Engineering Task Force.
Non-Published Commonly Owned U.S. Appl. No. 16/888,851, filed Jun. 1, 2020, 72 pages, Nicira, Inc.
Non-Published Commonly Owned U.S. Appl. No. 16/906,889, filed Jun. 19, 2020, 125 pages, VMware, Inc.
Non-Published Commonly Owned U.S. Appl. No. 16/906,891, filed Jun. 19, 2020, 125 pages, VMware, Inc.
Non-Published Commonly Owned U.S. Appl. No. 16/906,893, filed Jun. 19, 2020, 126 pages, VMware, Inc.
Non-Published Commonly Owned U.S. Appl. No. 16/906,901, filed Jun. 19, 2020, 125 pages, VMware, Inc.
Non-Published Commonly Owned U.S. Appl. No. 16/906,902, filed Jun. 19, 2020, 126 pages, VMware, Inc.
Non-Published Commonly Owned U.S. Appl. No. 16/906,905, filed Jun. 19, 2020, 126 pages, VMware, Inc.
Non-Published Commonly Owned U.S. Appl. No. 16/906,908, filed Jun. 19, 2020, 125 pages, VMware, Inc.
Non-Published Commonly Owned U.S. Appl. No. 16/906,913, filed Jun. 19, 2020, 124 pages, VMware, Inc.
Non-Published Commonly Owned U.S. Appl. No. 16/906,921, filed Jun. 19, 2020, 43 pages, VMware, Inc.
Non-Published Commonly Owned U.S. Appl. No. 16/906,925, filed Jun. 19, 2020, 111 pages, VMware, Inc.

(56) References Cited

OTHER PUBLICATIONS

Non-Published Commonly Owned U.S. Appl. No. 16/906,929, filed Jun. 19, 2020, 113 pages, VMware, Inc.
Non-Published Commonly Owned U.S. Appl. No. 16/906,934, filed Jun. 19, 2020, 112 pages, VMware, Inc.
Non-Published Commonly Owned U.S. Appl. No. 16/906,942, filed Jun. 19, 2020, 127 pages, VMware, Inc.
Non-Published Commonly Owned U.S. Appl. No. 16/906,944, filed Jun. 19, 2020, 128 pages, VMware, Inc.
Non-Published Commonly Owned U.S. Appl. No. 16/906,950, filed Jun. 19, 2020, 128 pages, VMware, Inc.
Non-Published Commonly Owned U.S. Appl. No. 16/906,955, filed Jun. 19, 2020, 127 pages, VMware, Inc.
Non-Published Commonly Owned U.S. Appl. No. 16/906,960, filed Jun. 19, 2020, 128 pages, VMware, Inc.
Non-Published Commonly Owned U.S. Appl. No. 16/906,964, filed Jun. 19, 2020, 126 pages, VMware, Inc.
Non-Published Commonly Owned U.S. Appl. No. 16/906,966, filed Jun. 19, 2020, 128 pages, VMware, Inc.
Non-Published Commonly Owned Related International Patent Application PCT/US2021/015967 with similar specification, filed Jan. 31, 2021, 111 pages, VMware, Inc.
PCT International Search Report and Written Opinion of Commonly Owned International Patent Application PCT/US2021/015967, dated May 18, 2021, 13 pages, International Searching Authority (EP).
PCT International Search Report and Written Opinion of commonly owned International Patent Application PCT/US2021/015968, dated Apr. 23, 2021, 14 pages, International Searching Authority (EP).
PCT International Search Report and Written Opinion of Commonly Owned International Patent Application PCT/US2021/016118, dated Apr. 15, 2021, 11 pages, International Searching Authority (EP).

\* cited by examiner

| NSX-T | GMLondon Global Manager ⌄ | | | | ⌕ ◯ ⎘ ❓ ⌄ admin ⌄ |
|---|---|---|---|---|---|

Home  Networking  Security  Inventory  System

« | Tier-0 Gateways | | | | | ❓
---|---|---|---|---|---|---

△ Network Overview

Connectivity
★ Tier-0 Gateways
★ Tier-1 Gateways
▦ Segments

Network Services
⇅ NAT

IP Management
▦ DNS
▦ DHCP

Settings
▢ Networking Settings

<u>1805</u>

| ADD GATEWAY ⌄ | | | | COLLAPSE ALL | Filter by Name, Path and more |
|---|---|---|---|---|---|
| Tier-0 Gateway Name | HA Mode | Linked Tier-1 Gateways | Linked Segments | Status❓ | Alarms |
| ⋮ ⌄ ★ Tier0Gateway 1 | Active Active | 0 | 2 | Check Status | 0 |
| IP Address Management | Not Set | | | | VIEW DNS |
| | | | | | VIEW NAT |
| ⌄ Locations | | | | | |
| Location | Edge Cluster | Mode❓ | | | |
| London | EDGECLUSTER1 | Primary | | <u>2305</u> | |
| NewYork | EDGECLUSTER3 | Primary | | | |
| Paris | EDGECLUSTER2 | Primary | | | |
| ⌄ Additional Settings | | | | | VIEW GATEWAY FIREWALL |
| ⌄ Route Distinguisher for VRF Gateways | | | | | |
| Tags | 0 | | | | |
| ⌄ INTERFACES | | | | | |
| ⌄ ROUTING | | | | | |
| ⌄ BGP | | | | | |
| ⌄ ROUTE RE-DISTRIBUTION | | | | | |

⟳ REFRESH                                                                                                1 - 1 of 1 Tier-0 Gateways

| | | | | | |
|---|---|---|---|---|---|
| vm NSX-T Paris<br>IP:10.184.107.144 · On-Prem ⌄ | | | | | ♀ ◔ ⊡ ⌄ admin ⌄ |
| Home Networking Security Inventory Plan & Troubleshoot System | | | | | POLICY \| MANAGER |

⊹ Tier-0 Gateways

ADD GATEWAY ⌄      COLLAPSE ALL    Filter by Name, Path and more

| Tier-0 Gateway Name | HA Mode | Linked Tier-1 Gateways | Linked Segments | Status ⓘ | Alarms |
|---|---|---|---|---|---|
| ⌄ ▦ LocalT0 | Active Active | 0 | 2 | ● Uninitialized ⟳ | 0 |

IP Address Management   *Not Set*      VIEW DNS
Edge Cluster   EDGECLUSTER2      VIEW NAT > Additional Settings      VIEW GATEWAY FIREWALL
> Route Distinguisher for VRF Gateways
> EVPN Settings Tags   0

> INTERFACES
> ROUTING
> MULTICAST
> BGP
> ROUTE RE-DISTRIBUTION

2410

⟲ REFRESH      No Tier-0 Gateways

Sidebar:
《
▲ Network Overview
▦ Network Topology

Connectivity
✦ Tier-0 Gateways
✦ Tier-1 Gateways
▤ Segments

Network Services
◎ VPN
⇅ NAT
⚖ Load Balancing
◈ Forwarding Policies

IP Management
▦ DNS
▦ DHCP
▦ IP Address Pools

Settings
▢ Networking Settings

NETWORK CONTROLLER FOR MULTI-SITE LOGICAL NETWORK

BACKGROUND

As more networks move to the cloud, it is more common for one corporation or other entity to have networks spanning multiple sites. While logical networks that operate within a single site are well established, there are various challenges in having logical networks span multiple physical sites (e.g., datacenters). The sites should be self-contained, while also allowing for data to be sent from one site to another easily. Various solutions are required to solve these issues.

BRIEF SUMMARY

Some embodiments of the invention provide a network management system for managing a logical network spanning multiple federated sites (e.g., multiple datacenters). The network management system of some embodiments includes (i) a global network manager that manages the entire logical network spanning all of the sites, (ii) local network managers at each site that directly manage the logical network at their respective sites, and (iii) central controllers at each site for distributing logical network configuration data to computing devices at the site that implement the logical network. The global manager receives global logical network configuration data (e.g., from a network administrator), while the local network managers receive (i) global logical network configuration data for their respective sites from the global manager and (ii) local logical network configuration data (e.g., from a network administrator). In some embodiments, a network management application is provided that allows the network administrator to access the global manager as well as some or all of the local managers via the same user interface (UI).

In some embodiments, the global manager executes on a computing device at one of the sites spanned by the logical network, and each local manager also executes on a computing device at its respective site. In some embodiments, the global manager executes on the same computing device at one of the physical sites as the local manager for that site. The global manager and the local managers are in some embodiments separate modules of a single application, and share a database (e.g., a distributed database) stored at the site of the global manager. Some embodiments deploy each manager at a physical site as a cluster of machines (e.g., virtual machines (VMs)), with each machine executing on a different computing device at the same site.

Some embodiments employ a primary global manager and a secondary global manager, in an active-standby arrangement. The primary global manager is asynchronously synchronized with the secondary global manager as a standby for failover scenarios. The secondary global manager executes on a different computing device (or set of computing devices), located for resiliency at a different site than the primary global manager in some embodiments, and maintains an independent database. In some embodiments, both the primary and secondary global managers are deployed as clusters of machines, each executing alongside the local managers at their respective sites.

The global logical network configuration, in some embodiments, is received by the global manager as a desired configuration (e.g., intent-based configuration) that defines elements and policies of the global logical network. Specifically, in some embodiments, a network administrator (e.g., through the network management application) provides basic configuration intent (e.g., creation of logical forwarding elements and connections between them, definitions of security groups and policies, etc.) and the network management system converts this intent into the details of global logical network configuration.

In some embodiments, the desired global configuration of the logical network is expressed as a hierarchical tree (also referred to as a global policy tree) with nodes and connections between the nodes. Some embodiments define a root node for the global logical network (also referred to as a federation) and add nodes for both physical sites and logical network entities as child nodes of the root node. In some embodiments, a network administrator adds a physical site to the federation (e.g., by defining the physical site at the global manager and providing the global manager with the required networking and authentication information to access the site), and the global manager automatically discovers the physical network structure of the site. That is, upon receiving the necessary information, the global manager communicates with the local manager for the site to determine groups of computing devices at the site (e.g., zones of host computers and clusters of edge devices that will be configured to implement the logical network).

For logical network entities (e.g., logical network elements and/or policies), when the network administrator creates a new logical network entity, the global manager creates one or more nodes in the policy tree for the entity. In some embodiments, these logical network entities can include logical network elements that span one or more sites and logical network policies that apply to those elements, and the connections represent relationships between the nodes (e.g., parent-child relationships, logical network connections, etc.). The logical network elements include logical forwarding elements (e.g. logical routers, logical switches, etc.), as well as logical constructs (e.g., logical ports associated with the logical forwarding elements, logical groupings of one or more sites, and groups of logical network endpoints that share one or more attributes). Each logical network element is implemented in some embodiments by physical forwarding elements executing on computing devices at the sites that are spanned by that logical network element. The logical network policies include forwarding policies, service policies, and security policies, and are applied in some embodiments to govern the behavior of the logical forwarding elements. The policies can be child nodes of a logical network element node, in some embodiments (e.g., static routing policy configuration for a logical router).

As part of the logical network configuration, the global manager identifies a span for each logical network element (e.g., logical forwarding element, security group, etc.) and each policy (e.g., each rule) of the global logical network. The span for a particular element or policy may be based on an administrator directly or indirectly specifying a span for the particular element or policy, or the particular element or policy inheriting the span from another element (e.g., based on relationships in the global policy tree). In some embodiments, the global manager uses the span for each element or policy to determine to which local managers the configuration the element or policy should be provided. That is, some embodiments do not provide the entire global logical network configuration to each local manager, but instead only provide configuration for the elements and policies that pertain to that local manager's site (e.g., a subtree of the global policy tree, corresponding to the logical network elements implemented at that site).

The local manager at each site uses the relevant portion of the global desired configuration, received from the global manager, to manage the logical network at the site. In some embodiments, the local manager at a particular site (and/or a separate management plane at the site) uses the relevant portion of the global logical network configuration to generate and provide configuration data to the network controllers at the particular site. In some embodiments, these network controllers identify computing devices at the site (e.g., host computers, which execute physical forwarding elements) and distribute the configuration data to the identified computing devices. In some embodiments, local controllers that execute on one or more of the computing devices receive the configuration data from the network controllers and configure forwarding elements on the computing devices. The local controllers use the configuration data to configure the physical forwarding elements to implement the logical network elements. Each site's controller cluster also creates mappings between logical addresses (e.g., MAC addresses of logical network endpoints executing on the computing devices) and physical addresses (e.g., IP addresses of tunnel endpoints at the computing devices), and distributes these mappings to each computing device to which they are relevant, as well as to other controller clusters at other sites that require the data.

At least a subset of the computing devices that implement the logical network at each site host logical network endpoint data compute nodes (DCNs), such as virtual machines (VMs), containers, etc. In addition, some of these computing devices also execute service machines that perform services on logical network data traffic (e.g. firewalls, load balancers, etc.). Some of the computing devices are designated as edge gateways, and implement certain centralized logical forwarding elements (e.g., components of logical routers) for processing certain types of data traffic to and from the logical network endpoint DCNs.

To enable the network administrator(s) to configure the logical network at the global manager and/or the local managers, some embodiments provide a network management client application through which the administrator can access the network managers. This single network management application provides UIs for both accessing the global manager and any of the local managers in order to create and/or modify the logical network configuration. The application provides a first UI for accessing the global manager to configure the global logical network spanning the group of physical sites as well as additional UIs for accessing each local manager at each of the physical sites. The UI for accessing the local manager at a particular site allows the administrator to (i) modify the global logical network as implemented at the particular site and (ii) configure a local logical network at the site (which may be completely separate from or connected to the global logical network).

In some embodiments, the logical network components are the same for the global logical network and the local logical networks, and thus the UIs for the global manager and local managers appear as a single pane of glass with the same UI items and display areas. In addition, in some embodiments, within the UIs an item is provided to enable the user to toggle between the UIs for the different network managers.

The UIs, in some embodiments, provide sections for configuring logical forwarding elements (which are the same constructs for both the global and local logical networks) and for configuring network services. In some embodiments, for each network manager, a primary UI page provides display areas for each available type of logical forwarding element (e.g., logical switches, tier-0 (T0) logical routers for connecting the logical network to external networks, and tier-1 (T1) logical routers for connecting logical switches without requiring processing by the T0 logical routers and for providing stateful services for logical network endpoint DCNs connected to those logical switches). These display areas are selectable in order to access a separate UI page for each type of logical forwarding element providing additional information about the configured logical forwarding elements of that type and enabling creation/modification/deletion of these logical forwarding elements. Similarly, the primary UI page includes selectable display areas with information about different types of configured network services (e.g., network address translation (NAT), load balancing, firewall rules, etc.). These display areas are selectable to provide additional information about the respective services and allow configuration of these policies in some embodiments. As noted, the different UIs for the different network managers provide the same display areas for the same types of logical forwarding elements and logical network services (when those services are configured in the different logical networks).

In some embodiments, the application client directly accesses the global manager (so long as the administrator has provided proper authentication information for the global manager). To access local managers, the global manager acts as a proxy—that is, the application client accesses the local managers through the global manager in some embodiments.

This network management application allows the administrator to configure logical network elements and policies for a single site either through the global manager or through the local manager for that site. Through the global manager, the administrator can create site-specific logical network elements and policies that are part of the global logical network (and can thus be expanded later to other sites). In this case, the logical network element configuration data will be stored as part of the global policy tree and pushed to the site's local manager based on spanning to that site. In addition, the logical network element configuration data is backed up to the standby global manager when created at the global manager.

On the other hand, if created directly at the local manager as part of the local logical network, the logical network element configuration data and policies will only be part of a local policy tree stored at the local manager. While this local manager is a cluster in some embodiments, if the site goes down (due to, e.g., a natural disaster), the local logical network configuration data is not backed up at another site. However, a local network administrator that only has access to the local manager for that site (i.e., is not granted access to the global manager) can use the network management application to directly configure the logical network at that site.

In some cases, conflicts may occur between globally-defined logical network configuration and locally-defined logical network configuration. For instance, in the network configuration context, an IP address used for a local logical router might conflict with an IP address configured for a logical router spanning to the logical network. In the security context, a local administrator could configure a first firewall rule based on a first security group while a global administrator configures a second firewall rule based on a second security group. If a logical network endpoint DCN belongs to both of these security groups, then the two firewall rules may be in conflict. Some embodiments generally resolve security conflicts in favor of the globally-defined policy but resolve networking conflicts in favor of the locally-defined configuration (with the local manager reporting these overrides of the global configuration to the global manager for notification and/or validation).

As mentioned previously, the network controllers of some embodiments operate at each site to, among other functions, provide configuration data from the local manager at the site to the computing devices of the site. In some embodiments, a cluster of network controllers (also referred to as the central control plane) operate at each site.

In addition to providing the configuration data from the local managers to the computing devices (i.e., host computers and edge devices) at their particular site, the network controllers for a particular site generate certain logical network state data and provide this generated logical network state data to (i) the computing devices at the particular site and (ii) the network controllers at other sites. Furthermore, the network controllers at the particular site provide generated logical network state data to the network controllers at the other sites. As described in more detail below, this logical network state data in some embodiments includes logical network address to physical network address (physical location) mapping data as well as security group information (e.g., network addresses of logical network endpoint DCNs belonging to security groups).

The network controllers for a group of sites spanned by a logical network connect in a full mesh in some embodiments. In some embodiments, a site manager for the controller cluster at each site exchanges certificates and any other required authentication information with the other sites (e.g., with the site managers of the other sites). This site manager then provides the network controllers at its site with the information (e.g., IP address, certificate, etc.) so that each network controller at the site has connectivity with each network controller at each of the other sites.

In some embodiments, one controller from the cluster at each site is designated for sending logical network state data to each other site, and one controller from the cluster at each site is designated for receiving the logical network state data from each other site. That is, if there are three sites, the first site separately designates (i) a controller for sending data to the second site, (ii) a controller for sending data to the third site, (iii) a controller for receiving data from the second site, and (iv) a controller for receiving data from the third site. Each of these separately designated controllers may be a different controller in the cluster, or there may be overlap. For instance, different controllers could be designated for sending state data to different sites, and for the same remote site, different controllers could be designated for sending state data to the remote site and for receiving state data from the remote site. To make the selection, some embodiments use a slot-based sharding mechanism (e.g., by computing a hash value modulo the number of available controllers in the cluster). As an alternative or in addition to sharding based on sites, some embodiments shard the controller cluster based on logical network state (e.g., using one controller for sending security group data to a particular remote site and another controller for sending logical network to physical network mapping data to the particular remote site).

The logical network to physical network mappings, in some embodiments, comprises mappings of logical network layer 2 (e.g., MAC) addresses to physical network tunnel endpoint layer 3 (e.g., IP) addresses at which those logical network addresses can be reached. In some embodiments, when a logical network endpoint DCN is created on a host computer, that host computer reports the new DCN along with data about the DCN to one of the network controllers of the cluster. This data includes the MAC address of the DCN, which is mapped to a virtual tunnel endpoint (VTEP) of the host computer, as well as the logical switch with which the MAC address is associated. The controller cluster provides this logical MAC address to VTEP IP address mapping (in the context of the logical switch) to any other host computers in the same site that implement the logical switch, so that physical forwarding elements on these other host computers can transmit logical network data messages through the site's physical network to the logical network DCN.

The controller cluster for a particular site also provides the list of logical MAC addresses associated with a logical switch to each other site spanned by the logical switch. Logical network data messages within a site are sent via a tunnel between the VTEP on the host computer for the source logical network endpoint DCN and the VTEP on the host computer for the destination logical network endpoint DCN. To send a data message associated with a logical switch from a source host computer at a first site to a destination host computer at a second site, the source host computer tunnels the data message to a first edge device implementing a logical network gateway for the logical switch in the first site, which tunnels the data message to a second edge device implementing a logical network gateway for the logical switch in the second site, which in turn tunnels the data message to the destination host computer in the second site. As such, the controllers in the second site do not provide the logical MAC address to VTEP mappings for the logical switch to the controllers in the first site, but instead provide (i) the list of logical MAC addresses associated with the logical switch and located at the second site and (ii) remote tunnel endpoint (RTEP) IP addresses for reaching the logical network gateways at the second site. The controllers at the first site provide this logical network state data to the edge devices implementing the logical network gateways for the logical switch at the first site. In addition, to the host computers implementing the logical switch at the first site, the controllers provide the list of MAC addresses located at any of the sites (other than the first site), along with VTEP IP addresses at which edge devices implementing the logical network gateways for the logical switch at the first site can be reached.

In addition to the logical network to physical network mapping data, the network controllers of some embodiments generate and share between sites lists of logical network endpoint DCNs that belong to dynamic security groups. From the local manager, the controller cluster receives definitions of dynamic security groups (i.e., sets of criteria for belonging to the group). When a logical network endpoint DCN matches the set of criteria for a particular security group, the controller adds the logical network addresses (e.g., MAC and IP addresses) of the DCN to the security group. In some embodiments, the controllers use information received from a host computer when the DCN is created on the host computer to (i) identify to which groups the DCN belongs and (ii) identify the MAC and IP addresses to add to the lists for the identified groups. For each group spanning multiple sites, the controller clusters at those sites share the list of logical network addresses belonging to the group with each other. The controllers then provide the full list of addresses for each group to the host computers and/or edge devices that enforce policy rules using the security groups.

When providing updates to the logical network state data, in some embodiments the controllers do not re-send entire lists of MAC addresses for a given logical switch or entire lists of addresses for a particular security group between sites. Instead, some embodiments send each change to the current state as an atomic update specifying the change, thereby minimizing the amount of data that needs to be transferred between sites. The controllers at a particular site maintain a snapshot of the current logical network state (e.g., in a distributed database at the site), and whenever this state changes (e.g., due to creation or deletion of a DCN from a host computer in the site), each controller that handles sending that state to another site identifies the change and sends the change as an update to the other site. Because these changes can be derived by any of the controllers in the cluster at the sending site, this site does not persist the queue of updates in some embodiments. In some embodiments, the synchronization protocol is lossless, so once an update is sent from a first site to a second site it can be assumed that the second site will process that update (and will do so in the order that the updates are received). In addition, the controllers at the second site persist these updates in a distributed database.

If the connection from the first (sending) site to the second (receiving site) goes down, upon reconnection some embodiments compare (i) a snapshot of the persisted data at the second site and (ii) a snapshot of the state to be sent at the first site to identify the differences. The first site can thus only send these differences. In some embodiments, the receiving controller computes a cryptographic hash tree based on its snapshot and sends this hash tree to the sending controller. The sending controller computes a similar hash tree based on its snapshot and compares the two in order to identify the differences in the state. The sending controller then sends the updates to the receiving controller, in order to bring that site up to date.

In certain cases, such as when a logical network endpoint DCN moves from one site to another, conflicts may arise at a first site based on data received from two other sites. When a DCN is migrated from a second site to a third site, or crashes in the second site and is brought back up in the third site, in an ideal scenario (i) the controller at the second site is notified of the deletion of the DCN, updates its logical network state data accordingly, and shares this data with the first site, and (ii) the controller at the third site is notified of the DCN creation, updates its logical network state data accordingly, and shares this data with the first site. However, if there is a connection problem at the second site (e.g., between the host computer and the controller cluster or between the first and second sites), then the first site will not receive information about the deletion, and will thus end up with conflicting information (e.g., IP addresses in a security group) once the information from the third site is received. In some embodiments, the first site resolves these sorts of conflicts based on preferring the data from the site with a currently operational connection and, if both connections are operational, preferring the data with a more recent timestamp.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 23 illustrates a GUI page for T0 gateways in the global logical network.

FIG. 24 illustrates a GUI page for T0 gateways at a particular site.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a network management system for managing a logical network spanning multiple federated physical sites (e.g., multiple datacenters). The network management system of some embodiments includes (i) a global network manager that manages the entire logical network spanning all of the sites, (ii) local network managers at each site that directly manage the logical network at their respective sites, and (iii) central controllers at each site for distributing logical network configuration data to computing devices at the site that implement the logical network. The global manager receives global logical network configuration data (e.g., from a network administrator), while the local network managers receive (i) global logical network configuration data for their respective sites from the global manager and (ii) local logical network configuration data (e.g., from a network administrator). In some embodiments, a network management application is provided that allows the network administrator to access the global manager as well as some or all of the local managers via the same user interface (UI).

Figure 1:
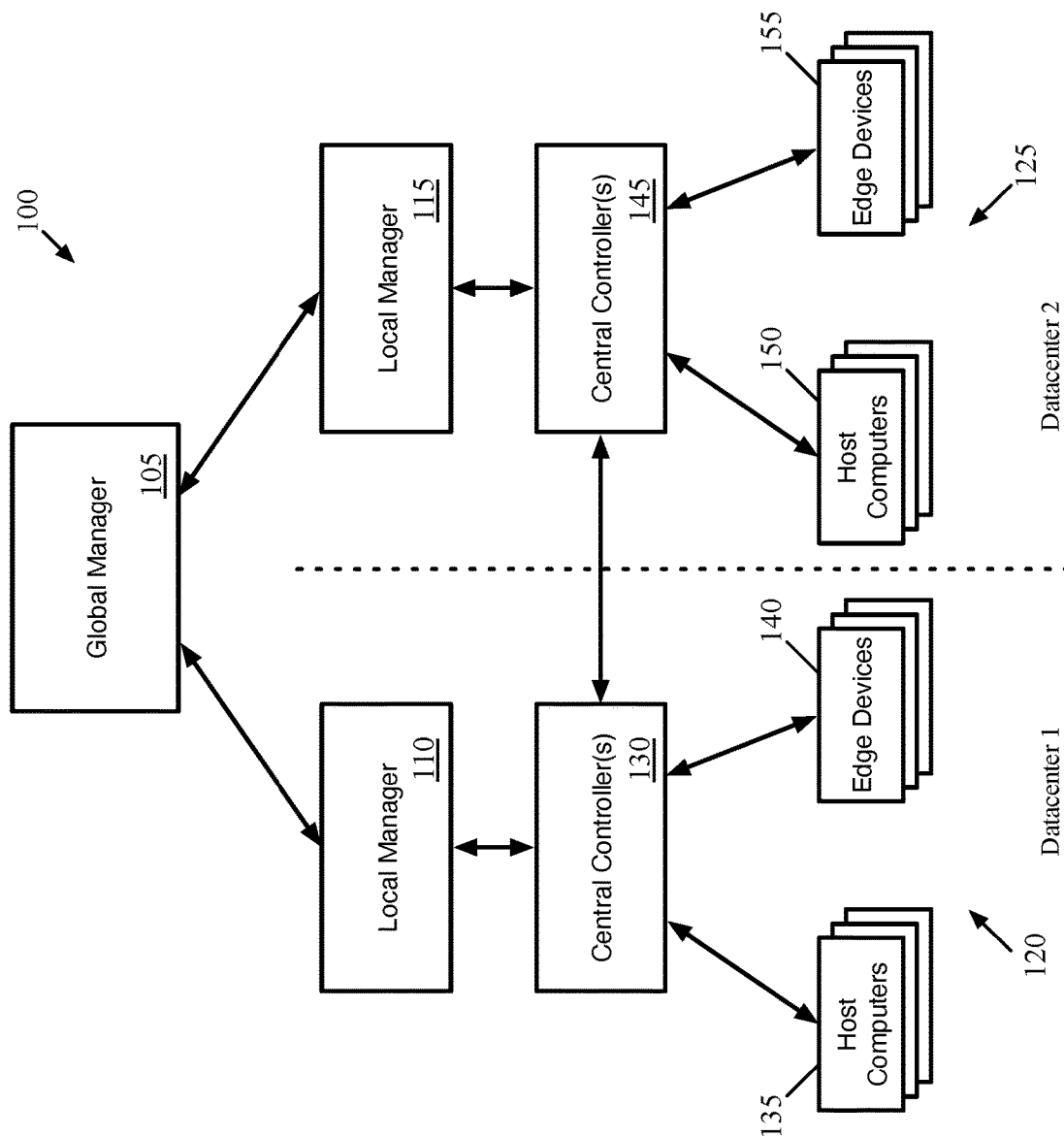
FIG. 1 conceptually illustrates a network management system of some embodiments.

The logical network, in some embodiments, is a conceptual network structure that a network administrator (or multiple network administrators) define through a set of network managers. Specifically, some embodiments include a global manager as well as local managers for each site. FIG. 1 conceptually illustrates such a network management system 100 of some embodiments. This network management system 100 includes a global manager 105 as well as local managers 110 and 115 at each of two datacenters 120 and 125 that are spanned by the logical network. The first datacenter 120 includes central controllers 130 as well as host computers 135 and edge devices 140 in addition to the local manager 110, while the second datacenter 125 includes central controllers 145 as well as host computers 150 and edge devices 155 in addition to the local manager 115.

In some embodiments, the network administrator(s) define the logical network to span a set of physical sites (in this case the two illustrated datacenters 120 and 125) through the global manager 105. In addition, any logical network constructs (such as logical forwarding elements) that span multiple datacenters are defined through the global manager 105. This global manager, in different embodiments, may operate at one of the datacenters (e.g., on the same machine or machines as the local manager at that site or on different machines than the local manager) or at a different site.

The global manager 105 provides data to the local managers at each of the sites spanned by the logical network (in this case, local managers 110 and 115). In some embodiments, the global manager identifies, for each logical network construct, the sites spanned by that construct, and only provides information regarding the construct to the identified sites. Thus, security groups, logical routers, etc. that only span the first datacenter 120 will be provided to the local manager 110 and not to the local manager 115. In addition, LFEs (and other logical network constructs) that are exclusive to a site may be defined by a network administrator directly through the local manager at that site. The logical network configuration and the global and local network managers are described in greater detail below.

The local manager 110 or 115 at a given site (or a management plane application, which may be separate from the local manager) uses the logical network configuration data received either from the global manager 105 or directly from a network administrator to generate configuration data for the host computers 135 and 150 and the edge devices 140 and 155 (referred to collectively in the following as computing devices), which implement the logical network. The local managers provide this data to the central controllers 130 and 145, which determine to which computing devices configuration data about each logical network construct should be provided. In some embodiments, different LFEs (and other constructs) span different computing devices, depending on which logical network endpoints operate on the host computers 135 and 150 as well as to which edge devices various LFE constructs are assigned (as described in greater detail below).

The central controllers 130 and 145, in addition to distributing configuration data to the computing devices, receive physical network to logical network mapping data from the computing devices in some embodiments and share this information across datacenters. For instance, in some embodiments, the central controllers 130 receive tunnel endpoint to logical network address mapping data from the host computers 135, and share this information (i) with the other host computers 135 and the edge devices 140 in the first datacenter 120 and (ii) with the central controllers 145 in the second site 125 (so that the central controllers 145 can share this data with the host computers 150 and/or the edge devices 155). Similarly, in some embodiments, the central controllers 130 identify members of security groups in the first datacenter 120 based on information from the host computers 135 and distribute this aggregated information about the security groups to at least the host computers 135 and to the central controllers in the second site 125. The central controller operations are described in greater detail below.

Figure 2:
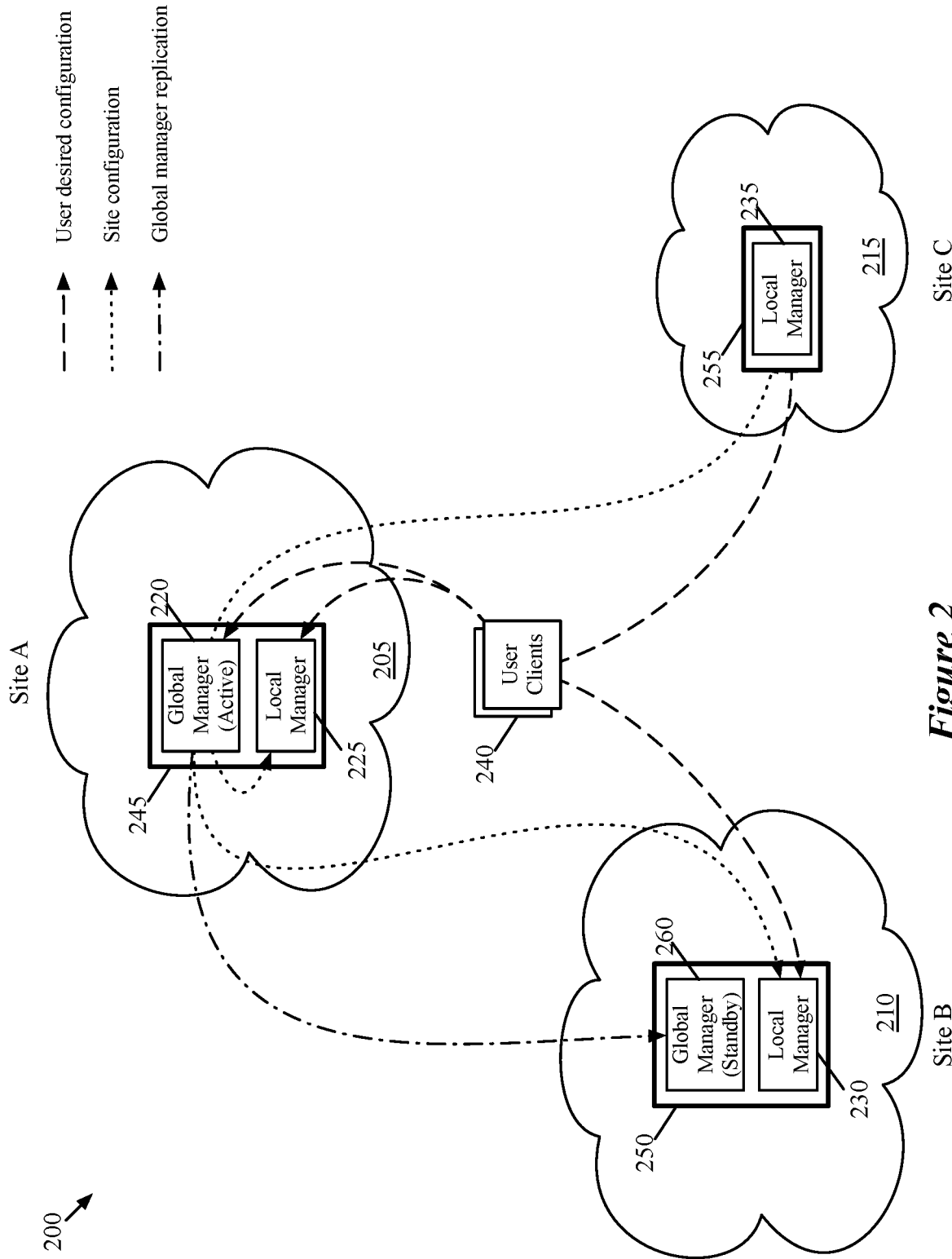
FIGS. 2-4 conceptually illustrate sets of network managers of a network management system of some embodiments for a logical network that spans three physical sites.
Figure 3:
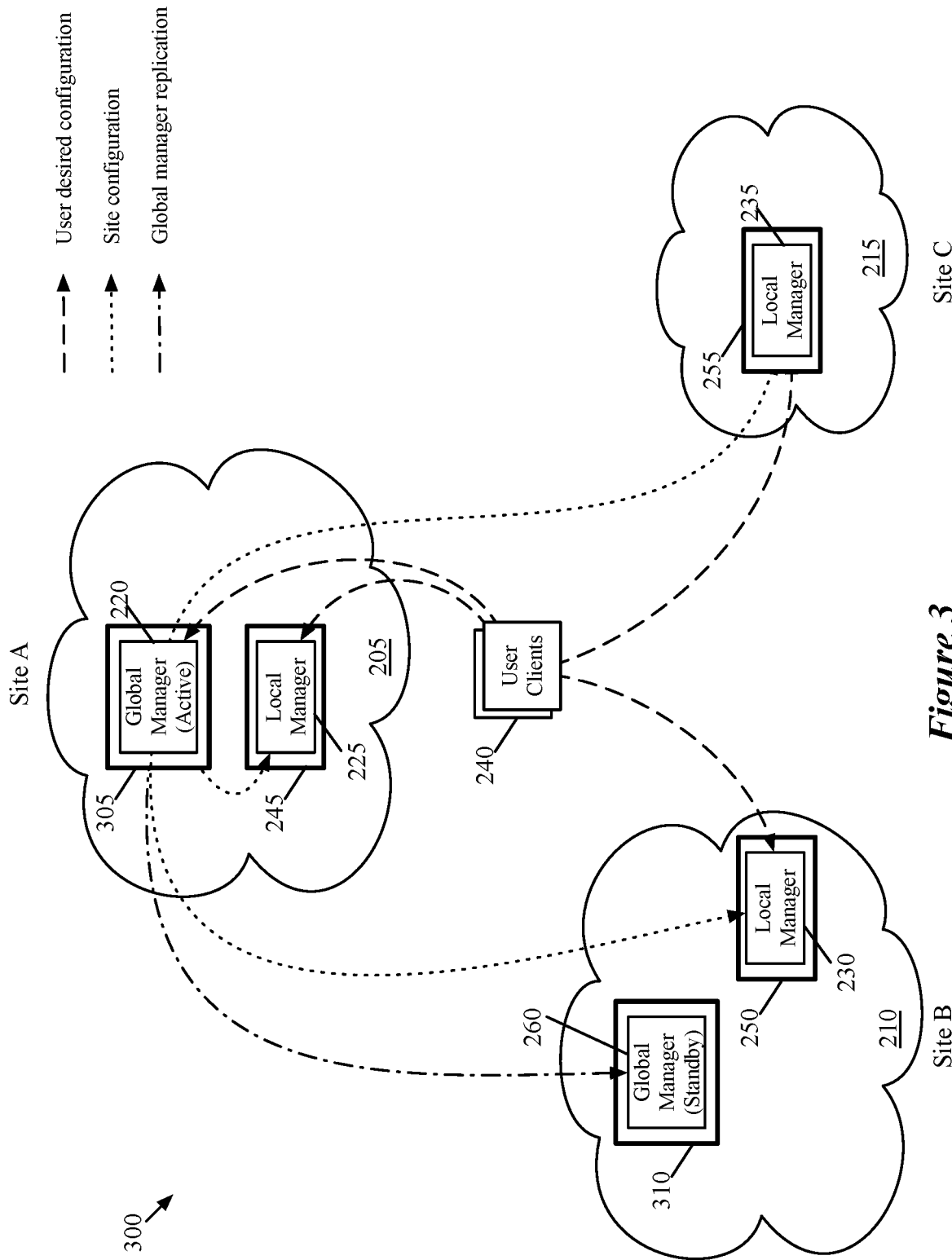
Figure 4:
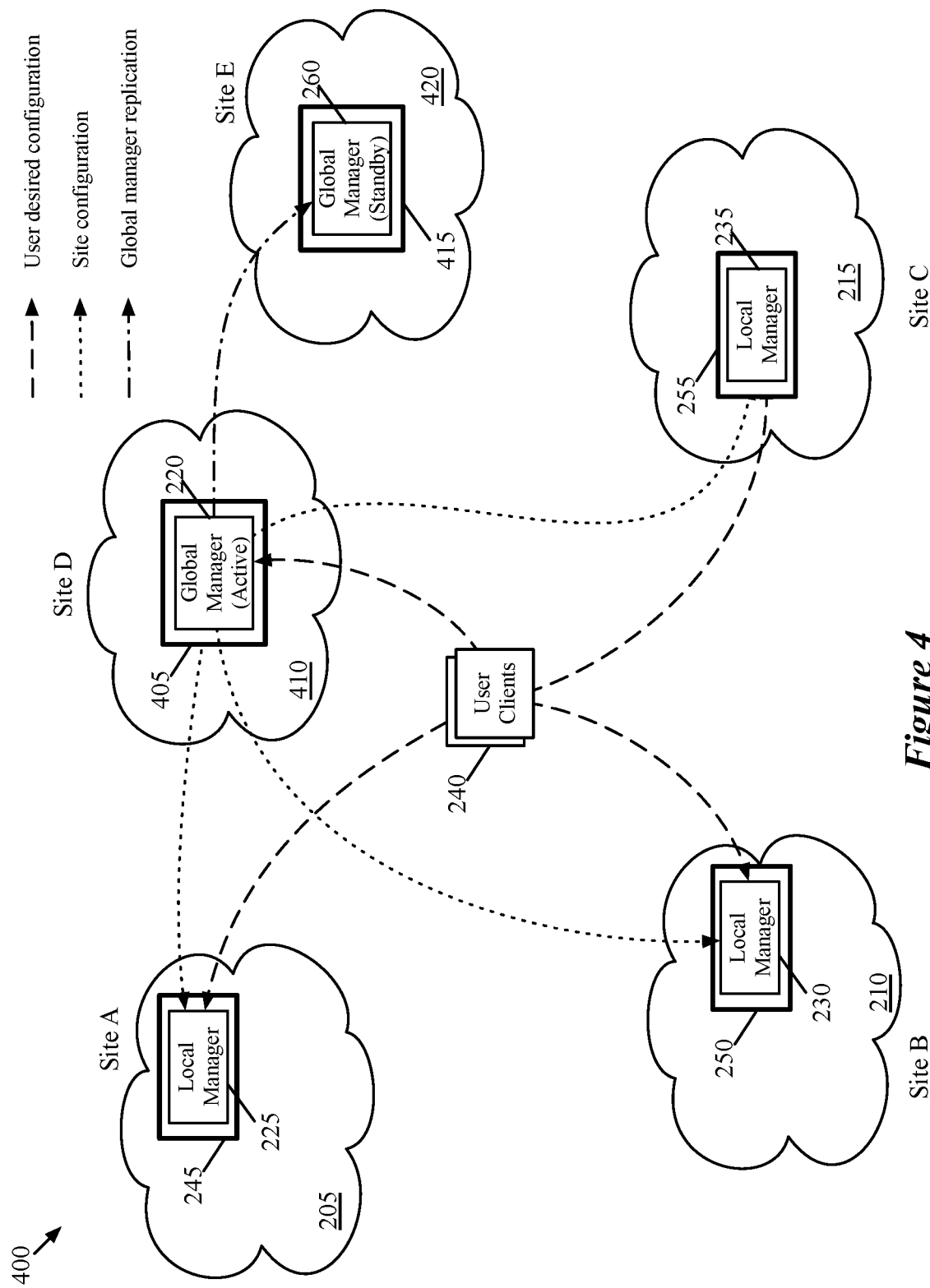

Regarding the global and local managers, FIGS. 2-4 conceptually illustrate sets of network managers of a network management system of some embodiments for a logical network that spans three physical sites 205-215. The network management system 200 shown in FIG. 2 includes (i) a global manager 220 that manages the entire logical network spanning all of the physical sites 205-215 as well as (ii) the local managers 225-235 for each of the sites that manage the logical network at their respective sites 205-215. Each physical site also includes central controllers, host computers, and edge devices (not shown) in addition to the local manager. In some embodiments, the global manager 220 executes on a computing device 245 at one of the sites 205 spanned by the logical network, and the local managers 225-235 also execute on computing devices 250-255 at their respective sites 210-215.

The global manager receives a global desired configuration for the logical network via one or more user clients 240. Each of the local managers 225-235 may also receive in some embodiments a (site-specific) desired configuration for the logical network via the user clients 240. The desired configuration is provided to the managers 220-235 from a user client 240 in some embodiments using a representational state transfer (REST) application programming interface (API), and is represented by dashed lines in FIG. 2. The global manager 220 also provides a site-specific portion of the global desired configuration to each of the local managers 225-235, as represented by dotted lines in FIG. 2.

In some embodiments, as illustrated in FIG. 2, the global manager 220 executes on the same computing device 245 at a given physical site 205 as the local manager 225 managing that site. The global manager and the local manager at the same site are in some embodiments separate modules of a single application, and share a database (e.g., a distributed database) stored at the site of the global manager. In other embodiments, as illustrated in FIG. 3, the global manager 220 executes on a computing device 305 at a given physical site 205 separately from any local manager 225 managing that site (though they may nevertheless share a distributed database). In still other embodiments, as illustrated in FIG. 4, the global manager 220 executes on a computing device 405 at a separate site 410 that is not spanned by the logical network, and therefore has no local managers for that logical network.

Some embodiments employ a secondary (standby) global manager 260, in an active-standby arrangement with the primary (active) global manager 220. The primary global manager 220 is asynchronously synchronized with the secondary global manager 260 as a standby for failover scenarios. This asynchronous replication is represented by a dot-dash line in FIG. 2. For resiliency, the secondary global manager 260 is located at a different physical site 210 than the site 205 where the active global manager 220 is located, and maintains an independent database from the primary global manager 220. This ensures that a failover scenario due to connectivity issues to the primary global manager's physical site does not also automatically affect the secondary global manager's physical site, and exploits the multisite architecture of the federated logical network.

The secondary global manager 260 executes in some embodiments on the same computing device 250 as a local manager 230 managing its site 210, as illustrated in FIG. 2. In other embodiments, as illustrated in FIG. 3, the secondary global manager 260 executes on a different computing device 310 at its physical site 210, separately from any local manager 230 managing that site. In still other embodiments, as illustrated in FIG. 4, the secondary global manager 260 executes on a computing device 415 at a separate site 420 that is not spanned by the logical network, and therefore has no local managers (but is nevertheless different than the location of the active global manager 220). Even though FIGS. 2-4 illustrate examples where the primary global manager 220 and the secondary global manager 260 have identical hosting arrangements, in some embodiments any combination or permutation of hosting may be employed as required. As just one example, the primary global manager 220 may be co-located with a local manager (as in FIG. 2), and the secondary global manager 260 may execute at a physical site that is not spanned by the logical network (as in FIG. 4).

The primary global manager 220, the secondary global manager 260, and the local managers 225-235 are in some embodiments separate modules of a single application, and in other embodiments are separate applications. These applications in some embodiments execute as one or more processes within machines that execute on host computers at each physical site. Some embodiments deploy one or more of the managers 220-235 and 260 as a cluster of machines at their physical site, with each machine executing on a different computing device at the same site, as described in further detail below with reference to FIG. 7.

It should be noted that while the above figures illustrate the user clients 240 directly connecting to the global manager 220 and the local managers 225-235, in other embodiments the user clients only directly access the global manager 220 (so long as the application has provided proper authentication information for the global manager). To access the local managers in such embodiments, the global manager acts as a proxy—that is, the application client accesses the local managers through the global manager in some embodiments.

Figure 5:
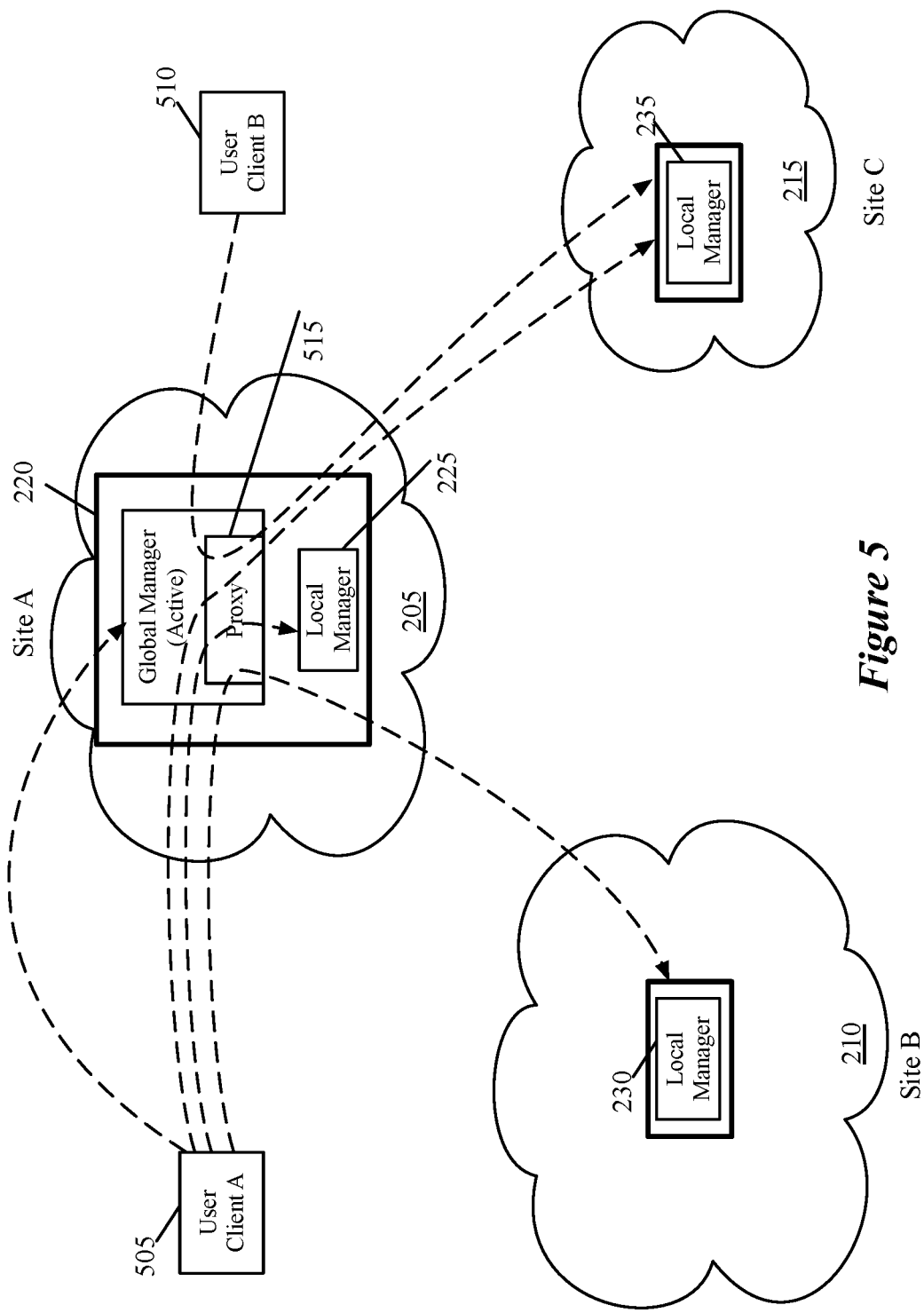
FIG. 5 conceptually illustrates two user clients that access the global manager and/or local managers via a proxy at the global manager.

FIG. 5 conceptually illustrates two user clients 505 and 510 that access the global manager 220 and/or local managers 225-235 via a proxy 515 at the global manager. In some embodiments, the proxy 515 is configured with the information needed to connect to each of the local managers 225-235 (e.g., IP address, authentication information, etc.). As shown, the first user client 505 has access to the global manager 220 as well as all three of the local managers 225-235. The second user client 510, on the other hand, only has access to the local manager 235 for the third site 215. In this example, the second user client might belong to a local administrator for that site, and thus this administrator is not granted privileges to access either global manager 220 or the other local managers 225-230. In different embodiments, enforcement of these different access privileges for the local managers may be at the proxy 515 (by validating access credentials) or at the separate local managers. In some embodiments of the latter case, the proxy 515 allows connections from any user client through to the local managers 225-235, which perform their own authentication procedures.

Figure 6:
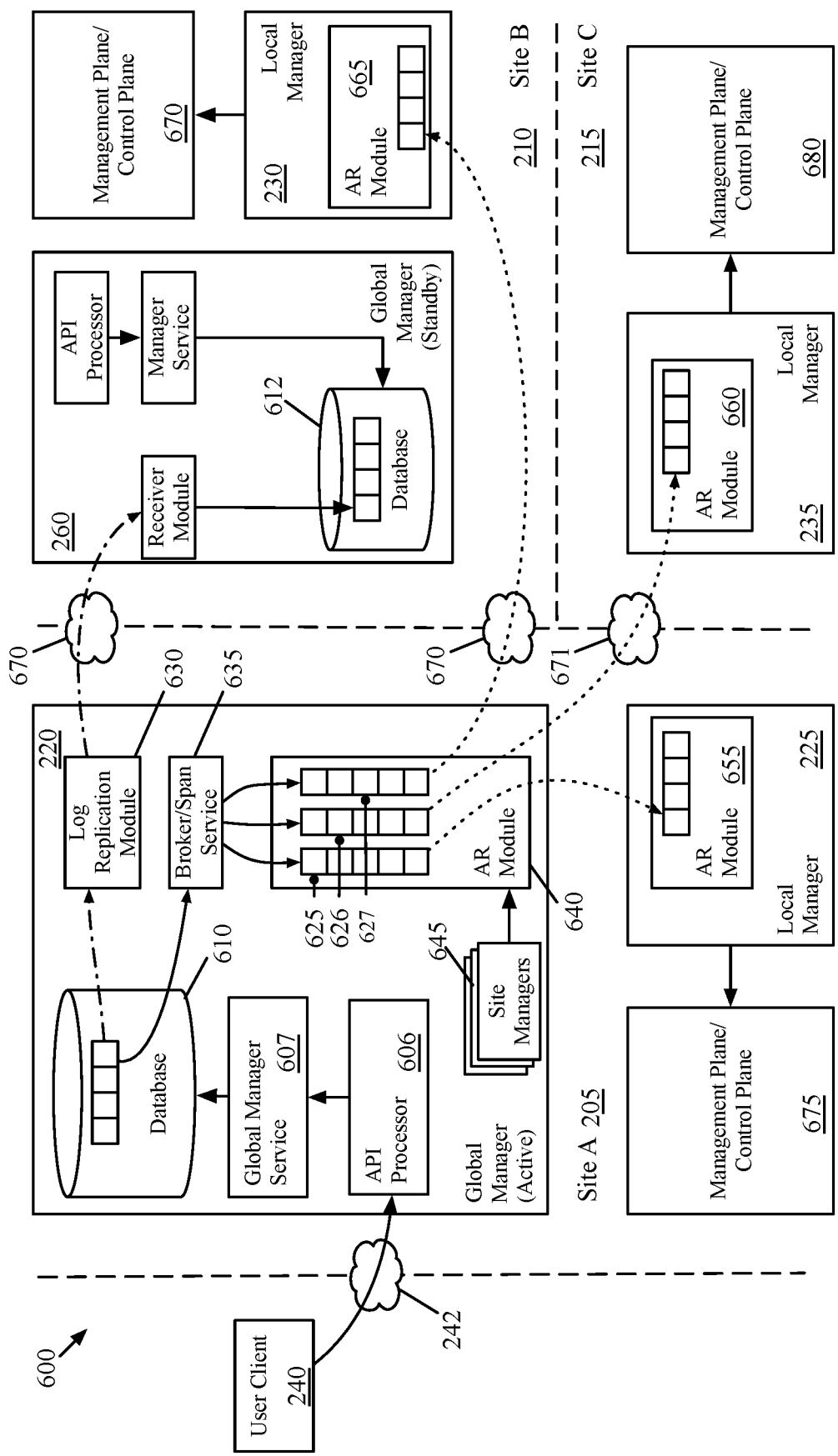
FIG. 6 conceptually illustrates in more detail different components of the network management system described in FIG. 2.

FIG. 6 conceptually illustrates in more detail different components of the network management system 200 described in FIG. 2. The desired configuration of the logical network is received by the primary global manager 220 from a user client 240 (e.g., over a wide area network 242 such as the Internet) and stored in a database 610 at the global manager 220. This desired configuration is replicated through a dedicated asynchronous channel to the secondary global manager 260 for storage in a separate database 612. A site-specific portion of the desired configuration is also provided to each of the local managers (via dedicated asynchronous channels) 225-235 for storage in their respective databases (not shown).

The global manager 220 also includes a number of additional modules, including an API processor 606 for receiving the user client input via a REST API, a core global manager service 607 that writes data to the database 610, a persistent work queue 611 in the database 610 to maintain causality for incoming create/update/delete (CUD) events, a log replication module 630 to replicate CUD events to the database 260 at the secondary global manager 260, a broker/span service 635 to perform span calculations on the CUD events (and the logical network elements referenced therein), an asynchronous replication (AR) module 640 which includes dedicated persistent queues 625-627 for disseminating CUD events to different local managers at different physical sites, and site managers 645 for maintaining connection parameters used by the AR module to establish channels to the other local managers. Each of these modules and their functionality are described in further detail below.

Figure 7:
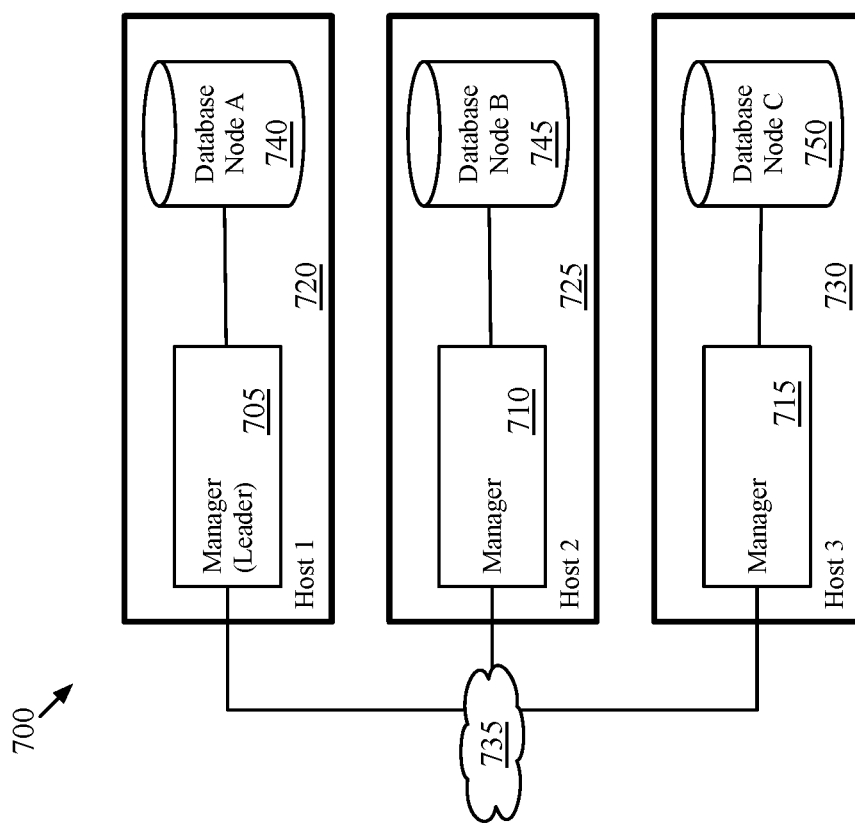
FIG. 7 conceptually illustrates a manager cluster and a distributed database system at a physical site spanned by the logical network.

In some embodiments, the databases 610 and 612 are distributed databases (e.g., a shared log) implemented across a set of storage devices at the managers' respective physical sites. In addition, in some embodiments, the global managers 220 and 260 are implemented as a cluster of machines executing on separate computing devices at its respective physical site. FIG. 7 conceptually illustrates a manager cluster and a distributed database system at a physical site spanned by the logical network. The manager cluster illustrated in this example may function in different embodiments as a primary global manager in active mode, as a secondary global manager in standby mode, or as a local manager. The manager is an application that runs on several manager machines 705-715 executing on separate host computers 720-730 at the physical site, which communicate with each other over a physical network 735 at the physical site (e.g., a datacenter network fabric). One of the manager machines 705 is assigned as the leader for the cluster in some embodiments, which shares tasks with the other manager machines in either active-active mode (e.g., using load balancing) or active-standby mode. The cluster of manager machines 705-715 appears as a single logical manager to other managers in the logical network.

In some embodiments, the manager application that runs on the machines 705-715 has separate modules for global manager and local manager, which can be enabled or disabled as required. Alternatively or conjunctively, in some embodiments, at least one of the machines 705-715 is a dedicated global manager machine, with a separate machine (not shown) for running an application for the local manager, executing on either the same host computers 720-730, or different host computers (as described above with reference to FIGS. 2-4).

The manager cluster stores desired configuration data in a distributed database system that is managed by one or more instances 740-750 of a database that execute on the host computers 720-730 in some embodiments. The database executes within the local manager machine on the host in some embodiments, though they are shown as separate in the figure for clarity. The database instances 740-750 communicate with each other over the physical network 735 at the physical site (e.g., the datacenter network fabric) that is used by the manager cluster. The database instances 740-750 collectively appear to the manager cluster as the single logical database 610. In some embodiments, the instances are shards or slices of the database. In other embodiments, each instance is a node with a full copy of the data (e.g., as illustrated in the example of FIG. 7). The redundancy allows for durability in case one of the hosts 720-730 fails.

In some embodiments, the database instances 740-750 are nodes of a distributed log that is stored on the host computers 720-730. Entries in the distributed log provide an ordered, persisted history of updates to the state of different logical network elements and logical network policies, which the manager cluster accesses via application programming interfaces (APIs) provided by the database instances 740-750. The distributed log and the database APIs are described in more detail by U.S. Pat. No. 10,540,119, which is incorporated herein by reference.

Returning to the example of FIG. 6, data describing the global desired configuration is received from the user client 240 and stored in the database 610 in some embodiments using a series of transactions, initiated through a series of REST API calls from the user client 240 to the primary global manager 220. These API calls are received and processed by an API processor module 606 in some embodiments, which then provides the received data to a manager service 607 that performs the core functions of the global manager 220. The manager service 607 stores the received data in the database 610. In some embodiments, the data is stored in the database in tables that store configuration parameters for the logical network elements of the logical network. In some such embodiments, the data in the tables is expressed as a hierarchical tree of user intent, as described below with reference to FIG. 12. Furthermore, in some embodiments, the manager service 607 also stores (e.g., duplicates) the incoming series of transactions in a work queue 611, to preserve their causality and order. The work queue is a persistent queue in the database 612 in some embodiments, and for redundancy is also replicated across the database nodes.

In some embodiments, the manager service 607 is the cluster of manager machines 705-715, as described above with reference to FIG. 7. As illustrated in FIG. 6, in some embodiments the secondary global manager also has a corresponding API processor and manager service, which are activated in a failover scenario when the primary global manager fails (e.g., becomes unreachable) and the secondary global manager becomes the active manager.

In some embodiments, the database 610 generates one or more update streams from the series of transactions. When data describing a desired configuration of the logical network is received (e.g., as create/update/delete (CUD) events received as a series of API transactions), this data is tagged using metadata associated with each transaction, such as timestamp information that can be used for data ordering and database status to prevent race conditions for access. In some embodiments, the update stream generated by the database 610 pushes newly-written CUD events to a log replication module 630 for replication to the secondary global manager 260.

In some embodiments, not all data stored by the global manager in the database is necessarily intended for replication. Data to be replicated in some embodiments includes policy tables, permissions, physical site information, and other data that the secondary global manager would require in order to assume active status in the event of failure of the primary global manager. Other database tables, such as those that pertain to managing the network in active mode, are not necessary for replication to the secondary global manager in standby mode. In addition, state information about the realization status of the logical network would not need to be replicated to the secondary global manager, since the realization status would be obsolete by the time a failover scenario occurred. Some embodiments distinguish data to be replicated from data that is not to be replicated by tagging the data for replication. As noted above, in some embodiments the database 610 is shared by the primary global manager 220 with a local manager 225 (e.g., on the same computing device 245, as illustrated in the example of FIG. 2). In such embodiments, the local manager also writes data corresponding to CUD events to the database, separate from the data written by the global manager. These local manager events are not replicated to the database of the secondary global manager.

The global manager 220 also includes an asynchronous replication (AR) module 640 in some embodiments, which has several persistent queues 625-627. Each of these persistent queues 625-627 is dedicated for dissemination of desired configuration data to one of the local managers 225-235 at each physical site 205-215. In some embodiments, the secondary global manager 260 also has an AR module (not shown) which includes analogous queues.

When the primary global manager 220 receives the global desired configuration for the logical network, the global manager stores various portions of the global configuration in the persistent queues 625-627, based on the relevance of the portions to the configuration of the logical network at the queue's corresponding physical site. In some embodiments, a broker service 635 of the global manager identifies the relevant portions the global desired configuration for each physical site, for example based on the span of the logical network elements, as described in further detail below. Span is determined in some embodiments by a span service, which in some embodiments is part of the broker service 635 (as depicted in FIG. 6) and in other embodiments is a standalone service.

In some embodiments, an asynchronous replicator (AR) module 640 at the global manager 220 maintains a set of asynchronous channels that connect the primary global manager 220 to the local managers 225-235. These channels are depicted as dotted lines from the persistent queues 625-627 to corresponding AR modules 655-665 at the local managers 225-235.

In some embodiments, the AR module maintains a dedicated asynchronous channel that connects the primary global manager 220 to the secondary global manager 260. In other embodiments, replication to the secondary global manager 260 is handled by a dedicated log replication module 630. The log replication module receives the data to be replicated from the work queue 611 in the database 612 as described above, and in some embodiments replicates the data, (as depicted by a dot-dash line) directly to the database 612 of the secondary global manager 260, bypassing the AR module. In some embodiments, the secondary global manager 260 also has a receiver module 642 for establishing the channel with the primary global manager, receiving the replicated data, and writing the data to the database 612. If the secondary global manager 260 becomes active (e.g., due to failover), then in some embodiments the receiving module 642 assumes the role of the replication module.

The AR modules 640 and 650-665 maintain the channels between the physical sites, and in some embodiments guarantee various connection parameters (e.g., the minimum bandwidth, the maximum roundtrip time, etc.) that are required for replication of data to the secondary global manager and dissemination of data to the local managers. In embodiments where the secondary global manager and/or the local managers are implemented as a cluster of machines, the channels also identify the leader machine for each manager cluster.

Some embodiments execute a set of site managers 645 at the primary global manager 220 that provide information (e.g., connectivity statistics, IP addresses, etc.) about the physical sites to the AR module 640 to use in maintaining the channels, each site manager corresponding to one of the physical sites 205-215. The site managers 645 execute separately from the AR module 640 in some embodiments (as depicted in FIG. 6) or run as a sub-module of the AR module in other embodiments. The secondary global manager 260 also executes a set of site managers in such embodiments (not shown), though these are not active until a failover scenario.

As noted above, the broker service 635 enqueues CUD events to the persistent queues 625-627 of the AR module 640. In some embodiments, the AR module 640 polls its persistent queues 625-627 to determine when there are new CUD events. If data (e.g., corresponding to CUD events) is found in a queue, the AR module 640 retrieves the data (i.e., dequeues the CUD events) and transmits the retrieved data over the channel corresponding to that queue to the AR module of the local manager at the corresponding site.

Figure 8:
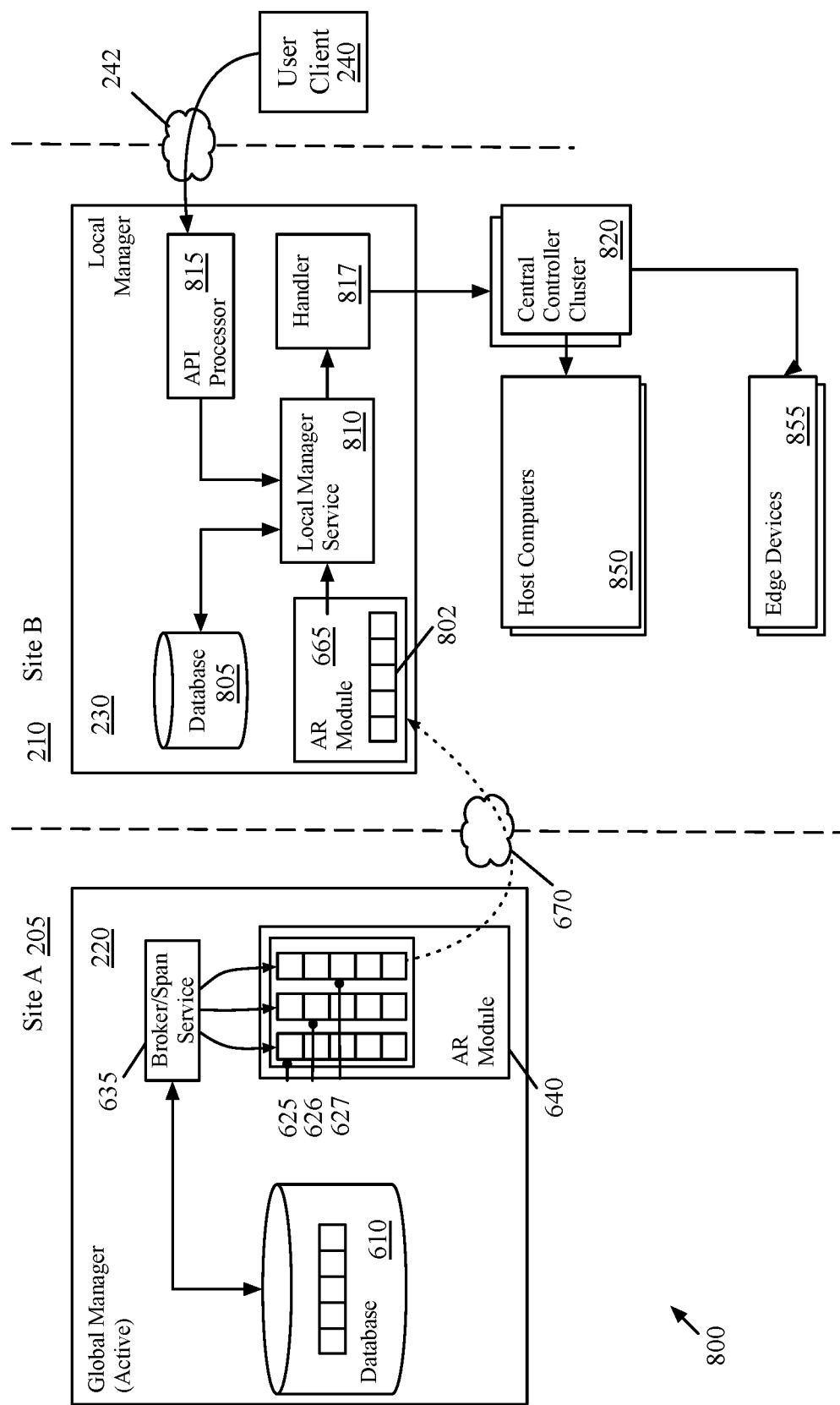
FIG. 8 conceptually illustrates the architecture of a local manager that receives data through a channel from the primary global manager.

FIG. 8 conceptually illustrates the architecture of a local manager receiving data through a channel from the primary global manager 220. The local manager 230 of some embodiments includes a number of modules, including a receiving AR module 665 for receiving the data from the global manager 220, an ingress queue 802 of the AR module for storing received events, a local manager service 810 that performs the core local manager functionality, and a database 805 (which is a distributed database in some embodiments, as described above with reference to FIG. 7). The local manager 230 also includes in some embodiments an API processor 815 to receive input via REST APIs from a user client 240, and a handler 817 to send configuration data to the control plane for realization of the desired logical network configuration. These modules and their functions are described in more detail below.

In the example of FIG. 8, the local manager 230 is at a different physical site than the primary global manager, so the data is received via a wide area network 670 (e.g., the Internet, a private network, etc.). In other embodiments, the local manager is at the same physical site (e.g., physical site 205), and the data is received through the local physical network (e.g., a datacenter fabric). As another example, if the local manager is co-located on the same host machine (e.g., as illustrated in FIG. 2), then the data is received in some embodiments through an inter-process communication method.

As described above, in some embodiments the broker service 635 retrieves new data from the database 610 and performs a span calculation to determine in which queues 625-627 the data should be stored. The AR module 640 of the global manager 220 then retrieves the new data from each queue and transmits the data through dedicated channels to the corresponding physical sites. Each channel connects the sending AR module 640 of the primary global manager 220 to one of the receiving AR modules 655-665 of the local managers 225-235.

Referring to the local manager 230, the AR module 665 receives data from the primary global manager 220 via a dedicated channel between the sending AR module 640 and the receiving AR module 665 of local manager 230. In some embodiments, the receiving AR module 665 maintains a persistent ingress queue 802 to store the received data, which in some such embodiments is stored in active memory. The received data corresponds in some embodiments to one or more CUD events that each reference one or more logical network elements that span one or more physical sites, including the physical site 210. The order and causality of the received data is preserved by the ingress queue 802 in some embodiments.

In some embodiments, the local manager service 810 performs validation to determine whether the CUD event associated with the received data is valid. The validation is based on whether there is any error or inconsistency in applying the CUD event to the configuration of the logical network at the physical site. In addition, other validations are rules in some embodiments that govern whether a logical network element can be updated to stretch its span to a new site. For example, prior to stretching an element to a new site, the security policies that affect the element must be stretched to the new site first. Otherwise, a loophole is created where the security policies applicable to the logical network element are not fully applied. In some embodiments, the validation is performed by the local manager service 810, which retrieves the CUD event from the ingress queue 802 and stores it in the database 805.

If the CUD event is invalid, then the local manager service generates a notification for the primary global manager of the failure to validate the CUD event. The notification in some embodiments is a notification event that is queued in an egress queue (not shown) of the AR module 665, to be sent back to the AR module 640 at the global manager 220 via the same asynchronous channel (e.g., the dotted line in FIG. 8). In other embodiments, the notification event is sent via an out-of-band notification channel. Notification events in the egress queue are retrieved and sent over the channel as part of the core functionality of the local manager service 810 in some embodiments. Some embodiments do not drop invalid events in some embodiments, but also persist these events in order to maintain causality. The invalid event is still accepted, and an intervention (e.g., by an administrator of the network) is required to resolve the invalidity.

In some embodiments, whether the event is valid or invalid, the event is applied to the local desired configuration of the logical network at the physical site. The desired configuration of the logical network is expressed as a policy tree in some embodiments, as described in further detail below. In the example of FIG. 8, the desired configuration of the logical network (e.g. the configuration of the logical network elements the span of which includes the physical site 210) is stored in the local database 805. The validated CUD event is applied to the desired configuration. For example, if the validated CUD event is a create event, then a logical network element defined by the event is created within the desired configuration stored in the database 805. If the validated CUD event is an update event, then the desired configuration of a logical network element referenced by the event is updated within the desired configuration stored in the database 805. If the validated CUD event is a delete event, then a logical network element referenced by the event is deleted within the desired configuration stored in the database 805.

The local manager uses the desired configuration of the logical network to generate and provide configuration data to the control plane of the logical network (e.g., a central controller or cluster of controllers at each site). In some embodiments, these controllers identify computing devices at the site that execute physical forwarding elements and distribute the configuration data to the identified computing devices. In some embodiments, different logical network elements span different computing devices (e.g., host computers, edge devices, etc.). Each logical network element is implemented in some embodiments by physical forwarding elements executing on the identified computing devices at the sites that are spanned by that logical network element. In other words, a logical network element is implemented by at least one physical forwarding element at each site which it spans. Some embodiments have local controllers (also referred to as chassis controllers) that execute on one or more of the computing devices alongside the physical forwarding elements, and which receive the configuration data from the controller cluster. The local controllers use the configuration data to configure the physical forwarding elements to implement the logical network elements at each computing device.

The local manager may also receive a CUD event directly from a user client 240 rather than from the global manager 220. This scenario occurs for example when a local administrator of the physical site (who may or may not be the same as the administrator of the global federated logical network as a whole) modifies the logical network's desired configuration as implemented at the local site (e.g. by specifying a series of create, update, or delete events for logical network elements whose span includes the local site), or modifies a local logical network at the site (which may connect to the global logical network). These local CUD events are stored in the database 610 in some embodiments using a series of transactions, initiated through a series of REST API calls from the user client to the primary global manager 220. The user client 240 is not at the same physical site in some embodiments, so the local CUD event is received by the local manager 230 over a wide-area network 242. As described above, in some embodiments the global manager acts as a proxy for the user client 240 accessing the local manager 230.

These API calls are received and processed by an API processor module 815 of the local manager 230 in some embodiments, which then provides the received data to the local manager service 810 that performs the core functions of the local manager 230. The local manager service 810, in some embodiments, determines whether the local CUD event conflicts with the desired configuration received from the global manager 220. When the local desired configuration of the logical network element conflicts with the globally-defined desired configuration, the local manager service 810 applies a set of priority rules to the CUD event to determine whether the CUD event overrides the globally-defined desired configuration. For example, some embodiments only allow overriding of the desired configuration by a local CUD event for networking-related configurations (e.g., message forwarding rules and policies). In such cases, the local CUD event would have priority. As another example, some embodiments prevent overrides of the desired configuration by a local CUD event for security-related configurations. In such cases, the globally-defined desired configuration would have priority.

If there is no conflict, or the local configuration has priority, then the local manager service 810 applies the CUD event to the local desired configuration of the logical network at the physical site that is locally stored in the database 805. For example, if the CUD event is a create event, then a logical network element defined by the event is created within the local desired configuration stored in the database 805. If the validated CUD event is an update event, then the desired configuration of a logical network element referenced by the event is updated within the local desired configuration stored in the database 805. If the validated CUD event is a delete event, then a logical network element referenced by the event is deleted within the local desired configuration stored in the database 805.

As noted above, the local manager 230 generates and provides configuration data from the desired configuration of the logical network stored in the local database 805. In the embodiment exemplified by FIG. 8, the local manager service 810 generates the configuration data from the stored desired configuration and provides the generated data to a handler module 817. The handler module 817 then distributes the configuration data to a central controller cluster 820 of one or more controllers. The controller cluster identifies host computers 850 and edge devices 855 to which to distribute the configuration data.

Before describing the global (and local) policy trees of some embodiments, the logical networks described by these policy trees, as well as their physical implementation across multiple sites, will be described further. The logical network of some embodiments may include both logical switches (to which logical network DCNs attach) and logical routers. Each LFE (e.g., logical switch or logical router) is implemented across one or more datacenters, depending on how the LFE is defined by the network administrator. In some embodiments, the LFEs are implemented within the datacenters by managed forwarding elements (MFEs) executing on host computers that also host DCNs of the logical network (e.g., with the MFEs executing in virtualization software of the host computers) and/or on edge devices within the datacenters. The edge devices, in some embodiments, are computing devices that may be bare metal machines executing a datapath and/or computers on which DCNs execute to a datapath. These datapaths, in some embodiments, perform various gateway operations (e.g., gateways for stretching logical switches across datacenters, gateways for executing centralized features of logical routers such as performing stateful services and/or connecting to external networks).

Figure 9:
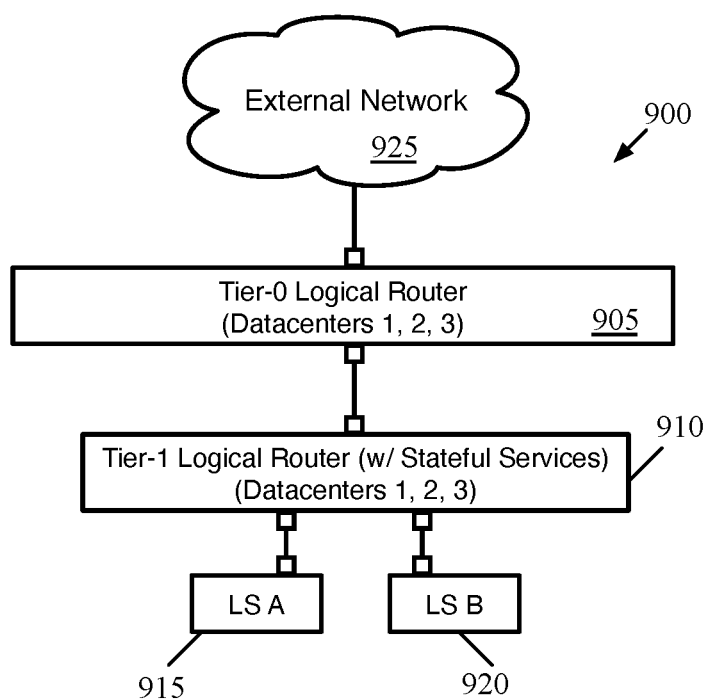
FIG. 9 conceptually illustrates a simple example of a logical network of some embodiments.

FIG. 9 conceptually illustrates a simple example of a logical network 900 of some embodiments. This logical network 900 includes a tier-0 (T0) logical router 905, a tier-1 (T1) logical router 910, and two logical switches 915 and 920. Though not shown, various logical network endpoints (e.g., VMs, containers, or other DCNs) attach to logical ports of the logical switches 915 and 920. These logical network endpoints execute on host computers in the datacenters spanned by the logical switches to which they attach. In this example, both the T0 logical router and the T1 logical router are defined to have a span including three datacenters. In some embodiments, the logical switches 915 and 920 inherit the span of the logical router 905 to which they connect.

As in this example, logical routers, in some embodiments, may include T0 logical routers (e.g., router 905) that connect directly to external networks and T1 logical routers (e.g., router 910) that segregate a set of logical switches from the rest of the logical network and may perform stateful services for endpoints connected to those logical switches. These logical routers, in some embodiments, are defined by the network managers to have one or more routing components, depending on how the logical router has been configured by the network administrator.

Figure 10:
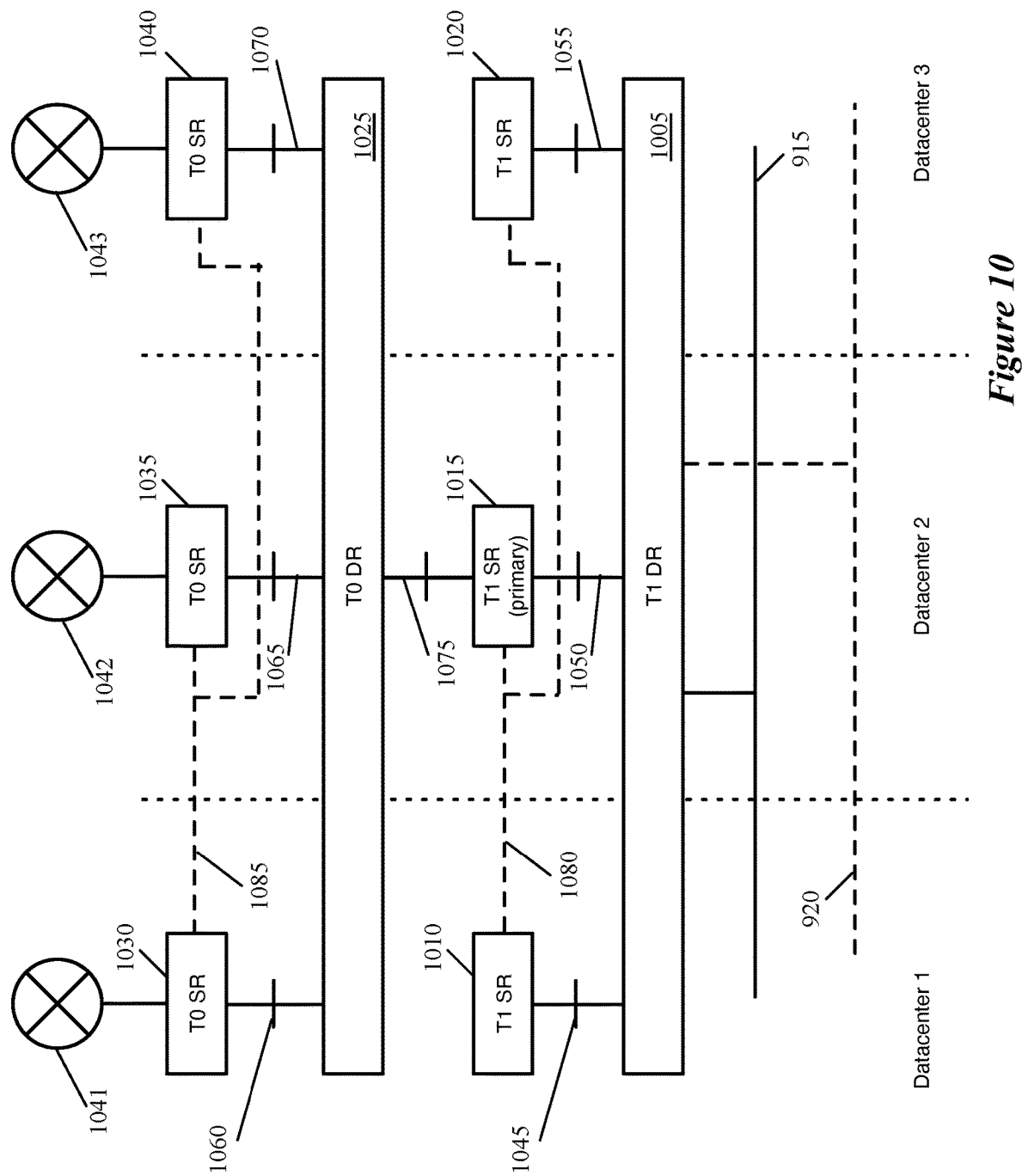
FIG. 10 conceptually illustrates the logical network of FIG. 9 showing the logical routing components of the logical routers as well as the various logical switches that connect to these logical components and that connect the logical components to each other.

FIG. 10 conceptually illustrates the logical network 900 showing the logical routing components of the logical routers 905 and 910 as well as the various logical switches that connect to these logical components and that connect the logical components to each other. As shown, the T1 logical router 910 includes a distributed routing component (DR) 1005 as well as a set of centralized routing components (also referred to as service routers, or SRs) 1010-1020. T1 logical routers, in some embodiments, may have only a DR, or may have both a DR as well as SRs. For T1 logical routers, SRs allow for centralized (e.g., stateful) services to be performed on data messages sent between (i) DCNs connected to logical switches that connect to the T1 logical router and (ii) DCNs connected to other logical switches that do not connect to the tier-1 logical router or from external network endpoints. In this example, data messages sent to or from DCNs connected to logical switches 915 and 920 will have stateful services applied by one of the SRs 1010-1020 of the T1 logical router 910 (specifically, by the primary SR 1015).

T1 logical routers may be connected to T0 logical routers in some embodiments (e.g., T1 logical router 910 connecting to T0 logical router 905). These T0 logical routers, as mentioned, handle data messages exchanged between the logical network DCNs and external network endpoints. As shown, the T0 logical router 905 includes a DR 1025 as well as a set of SRs 1030-1040. In some embodiments, T0 logical routers include an SR (or multiple SRs) operating in each datacenter spanned by the logical router. In some or all of these datacenters, the T0 SRs connect to external routers 1041-1043 (or to top of rack (TOR) switches that provide connections to external networks).

In addition to the logical switches 915 and 920 (which span all of the datacenters spanned by the T1 DR 1005), FIG. 10 also illustrates various automatically-defined logical switches. Within each datacenter, the T1 DR 1005 connects to its respective local T1 SR 1010-1020 via a respective transit logical switch 1045-1055. Similarly, within each datacenter, the T0 DR 1025 connects to its respective local T0 SR 1030-1040 via a respective transit logical switch 1060-1070. In addition, a router link logical switch 1075 connects the primary T1 SR 1015 (that performs the stateful services for the T1 logical router) to the T0 DR 1025. In some embodiments, similar router link logical switches are defined for each of the other datacenters but are marked as down.

Lastly, the network management system also defines backplane logical switches that connect each set of SRs. In this case, there is a backplane logical switch 1080 connecting the three T1 SRs 1010-1020 and a backplane logical switch 1085 connecting the three T0 SRs 1030-1040. These backplane logical switches, unlike the transit logical switches, are stretched across the datacenters spanned by their respective logical routers. When one SR for a particular logical router routes a data message to another SR for the same logical router, the data message is sent according to the appropriate backplane logical switch.

Figure 11:
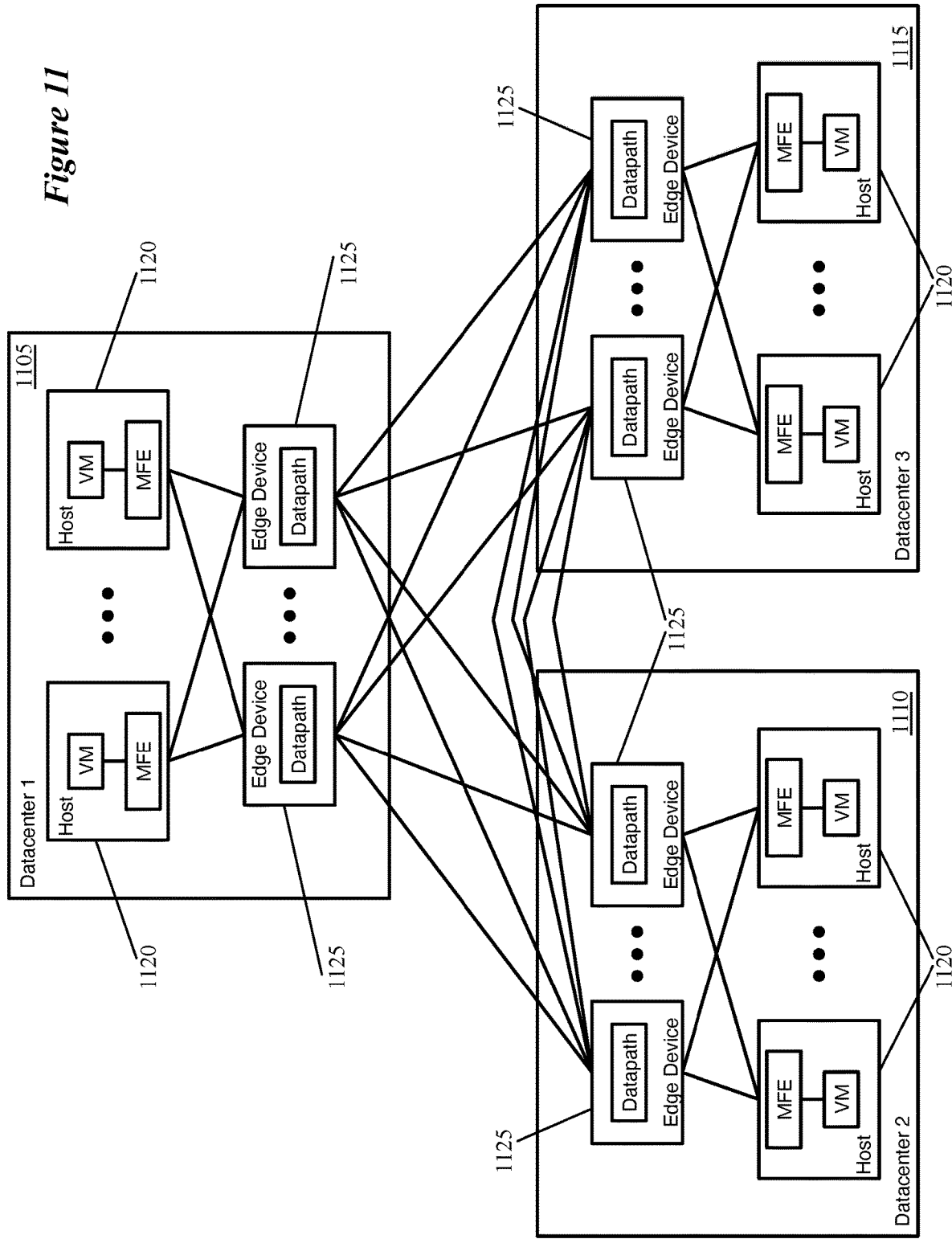
FIG. 11 conceptually illustrates three datacenters spanned by the logical network of FIG. 2 with the host computers and edge devices that implement the logical network.

As mentioned, the LFEs of a logical network may be implemented by MFEs executing on source host computers as well as by the edge devices. FIG. 11 conceptually illustrates the three datacenters 1105-1115 spanned by the logical network 900 with the host computers 1120 and edge devices 1125 that implement the logical network. VMs (in this example) or other logical network endpoint DCNs operate on the host computers 1120, which execute virtualization software for hosting these VMs. The virtualization software, in some embodiments, includes the MFEs such as virtual switches and/or virtual routers. In some embodiments, one MFE (e.g., a flow-based MFE) executes on each host computer 1120 to implement multiple LFEs, while in other embodiments multiple MFEs execute on each host computer 1120 (e.g., one or more virtual switches and/or virtual routers). In still other embodiments, different host computers execute different virtualization software with different types of MFEs. Within this application, "MFE" is used to represent the set of one or more MFEs that execute on a host computer to implement LFEs of one or more logical networks.

The edge devices 1125, in some embodiments, execute datapaths (e.g., data plane development kit (DPDK) datapaths) that implement one or more LFEs. In some embodiments, SRs of logical routers are assigned to edge devices and implemented by these edge devices (the SRs are centralized, and thus not distributed in the same manner as the DRs or logical switches). The datapaths of the edge devices 1125 may execute in the primary operating system of a bare metal computing device and/or execute within a VM or other DCN (that is not a logical network endpoint DCN) operating on the edge device, in different embodiments.

In some embodiments, as shown, the edge devices 1125 connect the datacenters to each other (and to external networks). In such embodiments, the host computers 1120 within a datacenter can send data messages directly to each other, but send data messages to host computers 1120 in other datacenters via the edge devices 1125. When a source DCN (e.g., a VM) in the first datacenter 1105 sends a data message to a destination DCN in the second datacenter 1110, this data message is first processed by the MFE executing on the same host computer 1120 as the source VM, then by an edge device 1125 in the first datacenter 1105, then an edge device 1125 in the second datacenter 1110, and then by the MFE in the same host computer 1120 as the destination DCN.

As mentioned, the global desired configuration of the logical network is expressed as a hierarchical tree (also referred to as a global policy tree) with nodes and connections between the nodes in some embodiments. Some embodiments define a root node for the global logical network (also referred to as a federation) and add nodes for both physical sites and logical network entities as child nodes of the root node.

For logical network entities (e.g., logical network elements and/or policies), when the network administrator creates a new logical network entity, the global manager creates one or more nodes in the policy tree for the entity. In some embodiments, these logical network entities can include logical network elements that span one or more sites and logical network policies that apply to those elements, and the connections represent relationships between the nodes (e.g., parent-child relationships, logical network connections, etc.). The logical network elements include logical forwarding elements (e.g. logical routers, logical switches, etc.), as well as logical constructs (e.g., logical ports associated with the logical forwarding elements, logical groupings of one or more sites, and groups of logical network endpoints that share one or more attributes). Each logical network element is implemented in some embodiments by physical forwarding elements executing on computing devices at the sites that are spanned by that logical network element. The logical network policies include forwarding policies, service policies, and security policies, and are applied in some embodiments to govern the behavior of the logical forwarding elements. The policies can be child nodes of a logical network element node, in some embodiments (e.g., static routing policy configuration for a logical router).

The primary global manager stores the global policy tree in its database, while the secondary global manager stores a replicated global policy tree in its own database. In some embodiments, the nodes represent logical network elements that span one or more sites and logical network policies that apply to those elements, and the connections represent relationships between the nodes (e.g., parent-child relationships, logical network connections, etc.). Cross-referencing between nodes is achieved by reference to a path through the tree's hierarchy which provides information about the span of each node.

Figure 12:
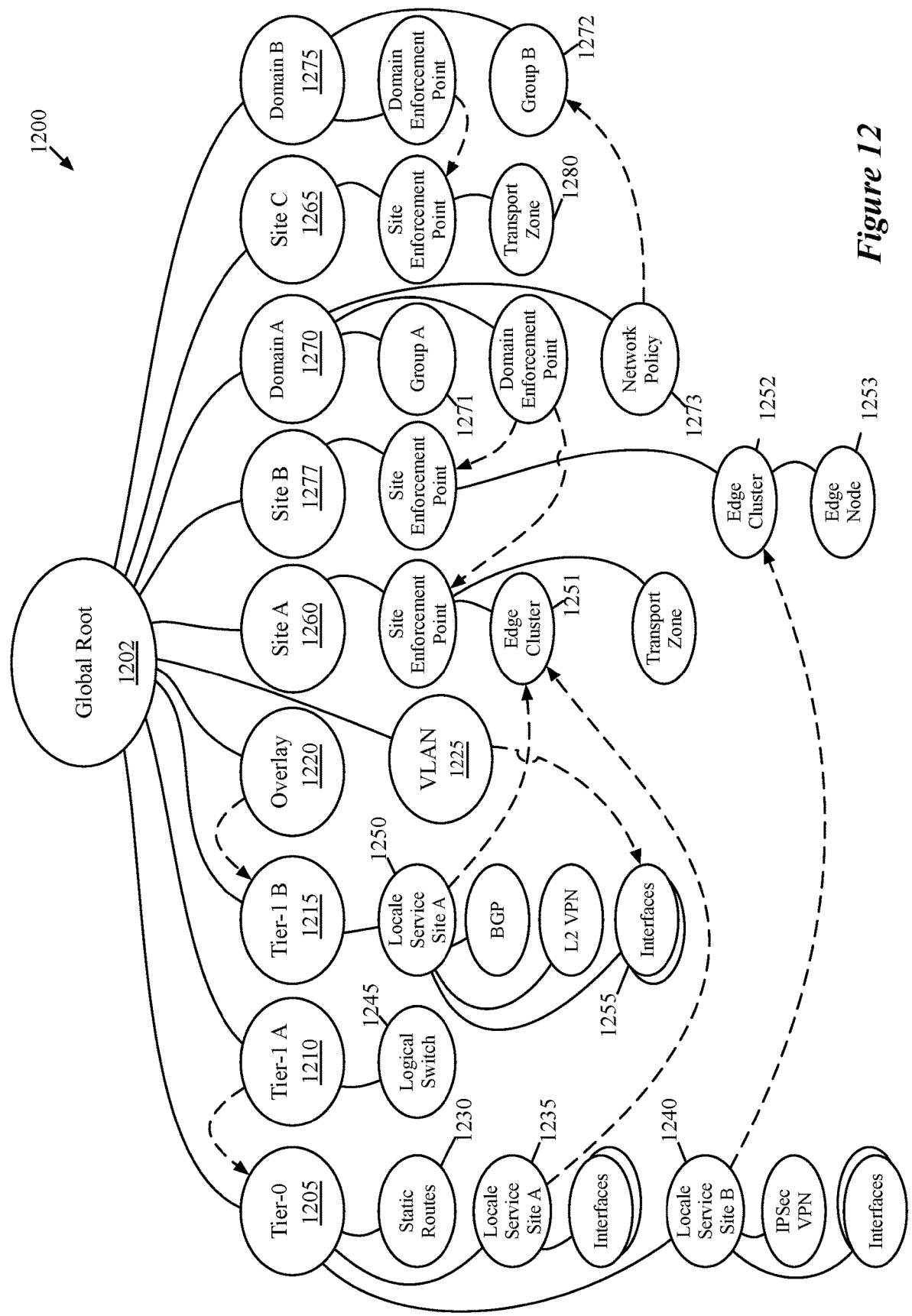
FIG. 12 conceptually illustrates an example of a global policy tree of some embodiments for a logical network that spans multiple physical sites.

FIG. 12 conceptually illustrates an example of such a global policy tree 1200 of some embodiments, for a logical network that spans multiple physical sites. In some embodiments, a global root node 1202 represents the overall federated logical network configuration. Portions of the global policy tree represent logical network element, including logical forwarding elements (e.g., logical routers, logical switches, etc.). For example, in FIG. 12, the global policy tree root 1202 connects a single Tier-0 logical router T0 1205, two Tier-1 logical routers T1A 1210 and T1B 1215, and two different types of network segments. These segments are an overlay network segment 1220 and a VLAN segment 1225. The node for router T0 1205 has a number of child nodes, including static route definitions 1230 and locale services 1235 and 1240 referencing physical sites A and B. In this example, the router T0 1205 also spans site C, but for the sake of simplicity the corresponding locale services referencing site C are not shown in the figure. The node for router T1A 1210 has a child node for a logical switch 1245. The node for router T1B 1215 has a child node for a locale service 1250 referencing physical site A.

The locale service nodes for the T0 router and the T1 routers define these routers' span. For example, router T0 1205 spans sites A, B, and C, while router T1B 1215 spans site A. As more locale services are added to a T0 or T1 router, the router is stretched to the corresponding sites. Unlike router T1B 1215, router T1A 1210 does not have a locale service child node, and instead has a reference (dashed line) to router T0 1205. Therefore, router T1A 1210 inherits the span of router T0 1205, i.e., router T1A spans sites A, B, and C. Certain child nodes also inherit that span automatically in some embodiments. Accordingly, the static route definitions 1230 under the T0 router also span sites A, B, and C. The logical switch 1245 inherits the span of its parent router T1A 1210, which in turn derives its span from the reference to router T0 1205. Therefore, logical switch 1245 also spans sites A, B, and C.

Each node in the global policy tree 1200 has multiple attributes that define configuration parameters, some of which are defined by the user and others of which are inherited. In some embodiments, span is not the only attribute that is inherited by a child node from a parent node. For example, certain T0 or T1 routers that span more than one site have one of the physical sites assigned as a primary site, with the other sites being secondary sites. If such a logical router has multiple service router (SR) components, then the SR component at the primary site takes precedence for certain operations. This configuration is specified (e.g., by an administrator of the network) for the router and is not part of the configuration of the locale services under the router.

The locale service nodes 1235, 1240, and 1250 have references (dashed lines) to edge clusters 1251 and 1252 at the respective sites A and B. As noted above, in this example the T0 router 1205 also spans site C, but the router's locale service for that site and therefore the corresponding reference to an edge cluster under the site C node 1265 are omitted for the sake of visual clarity. The locale service nodes are associated in some embodiments with the service routers described above with reference to FIG. 10. Edge clusters are described below with reference to site nodes. The local service nodes also have various types of child nodes in some embodiments, defining various different types of configuration information available at the respective site, including interfaces (e.g., logical ports), L2 VPNs, BGP services, and IPSec VPNs. Even though locale services are child nodes of other elements, they do not necessarily inherit the full span of those elements. A locale service node has the span of the single site in some embodiments (i.e., the site of the edge cluster node referenced by the local service node), so all child nodes only inherit the span of the single site to which the local service node refers.

The logical switch 1245 is shown as a child node under router T1A 1210. Such logical switches, also referred to as segments, are restricted to the parent router if they are connected as child nodes (as in FIG. 12). However, in some embodiments logical switches are also directly connected to the global root 1202. For example, overlay segment 1220 is directly connected to the global root 1202, and has a reference (dashed line) to router T1B 1215. This allows the overlay segment to be moved to a different router if desired, by simply changing the reference to another logical router at the top level below global root 1202. The overlay router 1220 inherits the span of router T1B 1215, e.g. site A, but the overlay router could be stretched automatically if another locale service were to be added to router T1B 1215.

Another type of segment in some embodiments is a VLAN-backed segment. These are defined with respect to a transport zone, which is a group of host devices at a single physical site. Therefore, the VLAN-backed segment can only span that single site where the transport zone is defined. In some embodiments, VLAN-backed segments are used as uplinks in some embodiments, to connect a logical router to an external physical router outside the logical network. In other words, the VLAN is between the T0 router and the external router. Since multiple T0 routers may connect to same external physical router, VLAN-based segments are used in some embodiments to distinguish their traffic. Typically, connecting a logical T0 router to physical router happens at a single physical site, since each site has its own connection to the wide-area network (e.g., the Internet) between the sites, i.e. a unique Internet Service Provider (ISP). Accordingly, VLAN backed segments provide a way of logically isolating traffic from different T0 routers to the same external router, even though the T0 routers may be stretched across multiple sites and overlap in their span.

In the example of FIG. 12, VLAN segment 1225 has a reference (dashed line) to an interface 1255 of the locale service 1250 under router T1B 1215. The interface 1255 is limited to the span of the locale service 1250, so by connecting the VLAN segment 1225 to the interface 1255, the span of the VLAN segment is limited to only site A as required. If another locale service were to be added under router T1B, then the span of router T1B would stretch to include the new site, but the span of VLAN segment 1225 would be unchanged since its reference is to the interface 1255 of the local service 1250.

Interfaces in some embodiments are uplinks or service ports. Interfaces connect to logical switches or segments, and then logical network endpoints (such as virtual machines, data compute nodes, or other types of workloads) are attached to those logical switches and segments. These endpoints also have their own services, such as DNS, TCP, etc.

In addition, the global policy tree 1200 include nodes for each physical site. For example, in FIG. 12, there are nodes for site A 1260, site B 1277, and site C 1265 under the global root 1202. Each site has an enforcement point child node, under which specific resources are assigned, such as edge clusters, transport zones, etc. In the example, site A's edge cluster 1251 has incoming references from locale services 1235 attached to router T0 1205 and from locale services 1250 attached to router T1B 1215. The edge cluster 1252 at site B has an incoming reference from the locale services 1240 attached to router T0 1205. In some embodiments, edge clusters also have children corresponding to specific edge nodes 1253, which actually implement the SRs and execute services such as firewalls, DHCP, etc.

Figure 13:
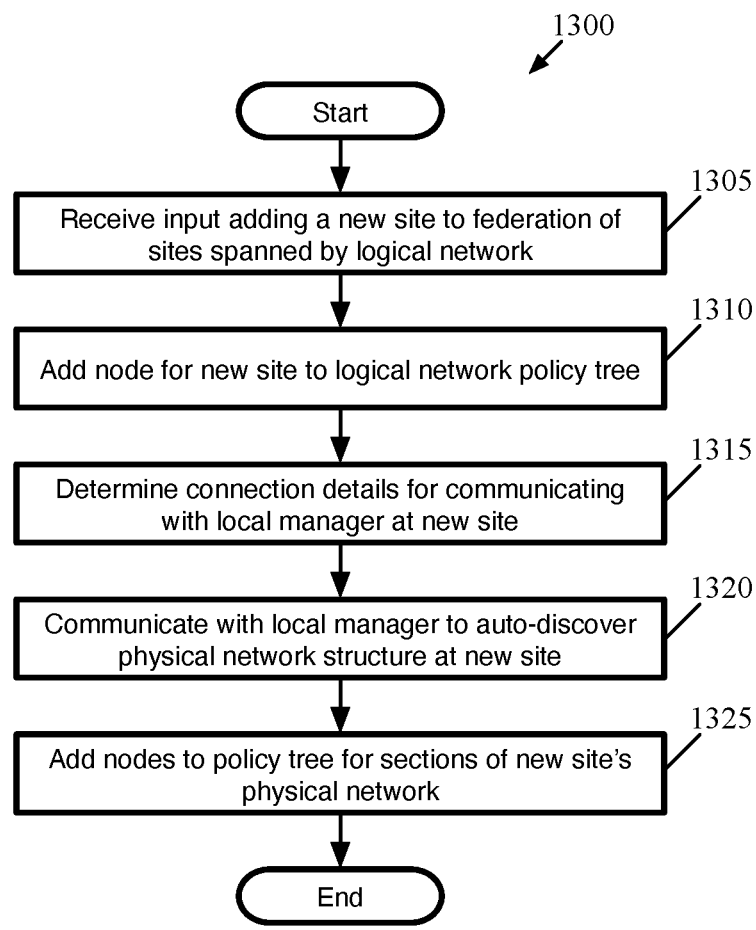
FIG. 13 conceptually illustrates a process of some embodiments for auto-discovering the physical structure (e.g., the edge clusters and the zones of host computers) of a physical site network.

In some embodiments, the global manager identifies the physical structure of a site (and therefore the structure of the child nodes for the site in the global policy tree 1200) via auto-discovery, when the site is added to the federation represented by the global root node 1202. FIG. 13 conceptually illustrates a process 1300 of some embodiments for auto-discovering the physical structure (e.g., the edge clusters and the zones of host computers) of a physical site network (e.g., a datacenter network).

As shown, the process 1300 begins by receiving (at 1305) input adding a new site to a federation of sites spanned by a logical network. At this point, the logical network could be defined for a group of sites, with the new site being added to this group of sites, or the administrator could be providing the initial group of sites to be spanned prior to defining the logical network elements. In some embodiments, a network administrator adds a physical site to the federation by defining the physical site at the global manager and providing the global manager with the required networking and authentication information to access the site (e.g., certificates and/or login information for the local manager).

The process 1300 adds (at 1310) a node for the new site to the global logical network policy tree. For instance, as shown in FIG. 12, when an administrator initially defines Site C, the global manager would create the node 1265 and add this as a child node of the global root node 1202 in the policy tree 1200.

Next, the process 1300 determines (at 1315) connection details for communicating with the local manager at the new site. These connection details may include, e.g., an IP address for an interface of the local manager that communicates with the global manager, authentication information, etc. As mentioned, in some embodiments the network administrator provides at least some of this information. In addition, based on these connection details provided by the network administrator, in some embodiments the global manager negotiates a secure connection with the local manager of the new site.

With the connection set up, the process 1300 communicates (at 1320) with the local manager to auto-discover the physical network structure at the new site. That is, the global manager communicates with the local manager for the new site to determine groups of computing devices at the site, such as edge clusters and transport zones of host computers. In some embodiments, edge clusters are groups of computing devices designated for performing edge gateway services (e.g., implementing SRs for T0 and/or T1 logical routes). Transport zones, in some embodiments, are sections of host computers in a physical site, such as racks of servers or groups of racks connected together. In some embodiments, the local manager already has this information about the physical network structure at its site. In other embodiments, the local manager queries the central controllers or otherwise inventories the physical network structure of the site.

Finally, the process 1300 adds (at 1325) nodes to the policy tree for the auto-discovered sections of the new site's physical network. The process 1300 then ends. For instance, by reference to FIG. 12, the global manager would communicate with the local manager at site C and add the transport zone node 1280. In some embodiments, the site enforcement point node (of which the edge cluster nodes and transport zone nodes are child nodes) is added automatically by the global manager.

The logical network elements also include logical constructs in some embodiments, such as domains that are logical groupings of one or more sites (e.g., geographic regions), and groups of logical network endpoints that share one or more attributes (e.g., operating system, region, etc.). Domains are defined and represented as nodes in the global policy tree 1200 beneath the global root 1202. The domains are defined in some embodiments at the global manager (e.g. by an administrator of the logical network). Unlike sites, which represent a physical construct, domains are a logical construct, which serve as an envelope to group different logical entities together (e.g., for security purposes). For example, firewall policies or other policy micro-segmentation applied to the domain will automatically be applied to all groups of logical endpoints defined within the domain in some embodiments.

In some embodiments, the logical network configuration (and therefore the global policy tree) includes different types of domains. For example, some domains are specific to a single physical site, and are referred to as locations. This type of domain acts as the container for all site-wide and site-specific configuration and policies. In some embodiments, a location domain is automatically created for each physical site in the federated logical network and cannot be modified by the user.

Other domains are logical groups of one or more sites and are referred to as regions. Regions can be assigned to geographic regions with multiple sites in some embodiments. For example, in the example of FIG. 6, physical site A 205 may be in Paris, physical site B 210 in London, and physical site C 215 in New York. These correspond to the site nodes A 1260, B 1277, and C 1265 in the example of FIG. 12, respectively. One region can then be defined (e.g., Europe), which includes physical sites A and B, and a different region defined (e.g., North America) which includes physical site C. This is useful for example in case there are different regulatory environments (e.g., the European Union's General Data Protection Regulation, or GDPR). Regions and locations, like all domains, are attached to global root 1202 and are not attached to other domains as child nodes. Some embodiments restrict each physical site to membership in a single location and a single region. In other words, a location may not have more than one physical site, and a physical site may not be a member of two regions.

In some embodiments, domains are only created as top-level nodes beneath the global root 1202 and cannot be children of other domains or inherit span from other domains. Instead, the span of a domain is manually defined in some embodiments at the global manager (e.g., by an administrator of the logical network) as the sites that are members of the domain. The span is represented in some embodiments by a domain enforcement point, which is configured to reference the site enforcement point for whichever sites the domain is intended to span. For example, in FIG. 12, the domain enforcement point for domain A 1270 references the site enforcement point of site A 1260 (e.g., Paris) and the site enforcement point of site B 1277 (e.g., London). Therefore, the domain A 1270 is a region (e.g., Europe) spanning sites A and B, as well as potentially other sites (e.g., Berlin) that are not shown in FIG. 12. In addition, the domain enforcement point for domain B 1275 references the site enforcement point of site C 1265 (e.g., New York). Therefore, the domain B 1275 spans site C. In this example, domain B 1275 is a region (e.g., North America) that may also span other physical sites (e.g., Chicago, Los Angeles, etc.) that are not shown in FIG. 12. Alternatively, domain B is a location that is specific to site C alone. For a given domain, the group of (one or more) site enforcement points that are referenced by the domain's enforcement point is also referred to as a domain deployment map in some embodiments.

In some embodiments, logical network endpoints at each site are logically organized into security groups which can span multiple sites. Service machines as well as managed forwarding elements executing on host computer apply logical network policies (such as network policy 1273) to the data messages exchanged between security groups of endpoints in some embodiments, based on policy rules that are defined in terms of these groups. Such security groups and network policies are defined at the global manager through the user client 240 (e.g., by an administrator of the logical network). In some embodiments, security groups and network policies are represented in the global policy tree 1200 as child nodes of domains, and accordingly inherit their parent domain's span. In some embodiments, the span of a network policy is defined not only by its parent domain, but also by sites and/or domains which are referenced by the policy.

For example, in FIG. 12, domain A 1270 has a child node corresponding to security group A 1271, which accordingly inherits a span of sites A and B (i.e., the span defined by the domain deployment map of domain A). In addition, domain B 1275 has a child node corresponding to security group B 1272, which accordingly inherits a span of site C (i.e., the span defined by the domain deployment map of domain B). Domain A 1270 also has a child node corresponding to a network policy 1273. The network policy is applicable to any groups defined under the same domain (e.g., group A 1271). In order to apply a policy to a security group, the span of the security group in some embodiments must include the span of the policy.

In some embodiments, network policies may also refer to security groups that are not in the same domain. For example, the network policy 1273 also references security group B 1272, which is in domain B 1275, even though the domain deployment map for the parent domain A 1270 does not include domain B.

In some embodiments, the global manager parses the global policy tree to identify the span of each node in order to generate a policy subtree for each physical site. The global manager identifies the span of each node in the global policy tree, then parses the global policy tree using the identified span for each node to generate the policy subtree for each site. The local manager at each site (or a management plane application, which may be separate from the local manager)

uses the relevant portion of the global desired configuration, received from the global manager, along with any desired configuration received directly by the local manager itself, to manage the logical network at the site.

Figure 14:
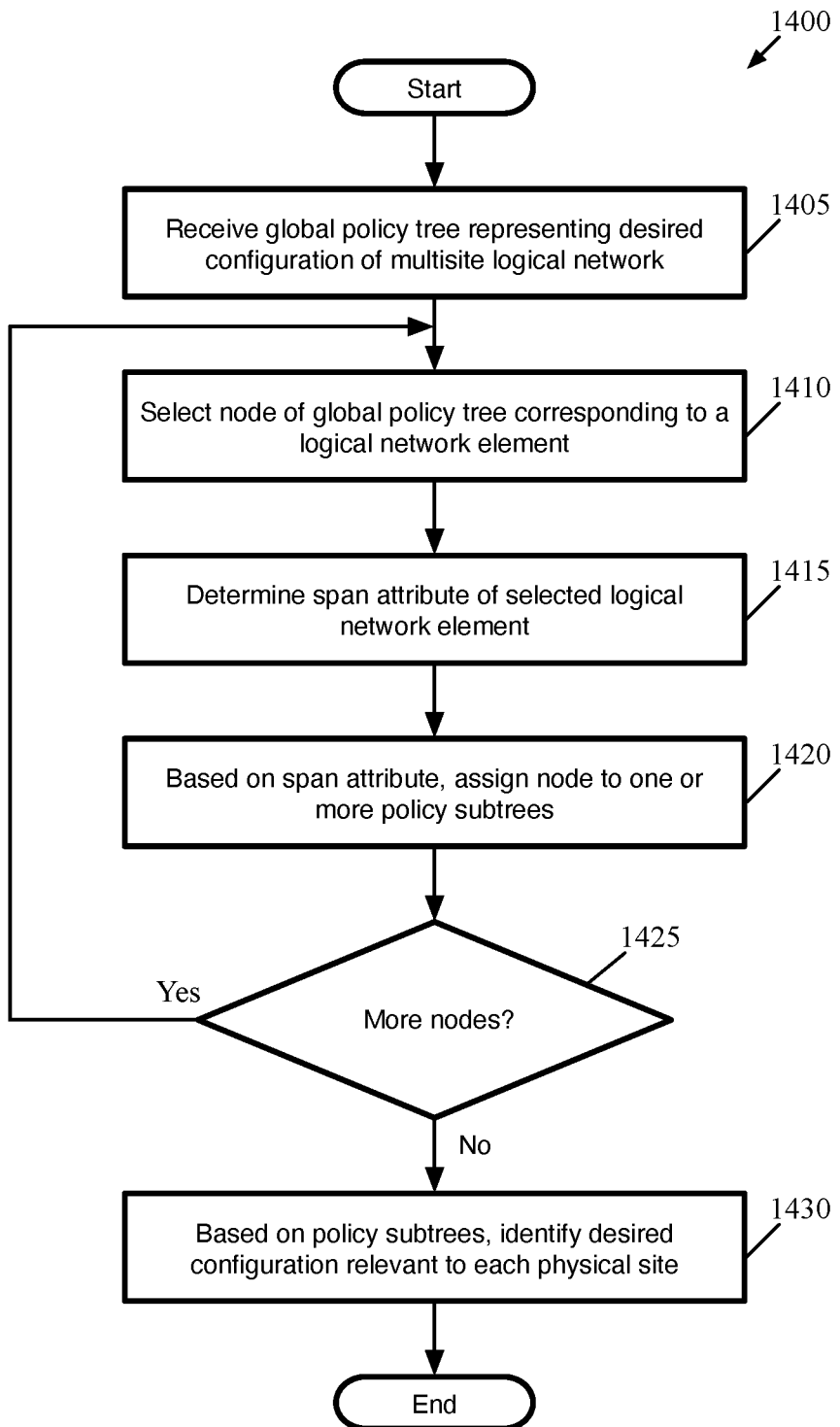
FIG. 14 conceptually illustrates a process of some embodiments for generating policy subtrees from a global policy tree.

FIG. 14 conceptually illustrates a process 1400 of some embodiments for generating policy subtrees from a global policy tree. This process 1400 is performed by a global manager (e.g., the policy broker of a global manager) in some embodiments. The process 1400 is described in part by reference to FIG. 15, which conceptually illustrates an example of a policy subtree for a single site based on the global policy tree 1200 shown in FIG. 12.

As shown, the process 1400 begins by receiving (at 1405) a global policy tree (e.g., the global policy tree 1200) that represents the desired configuration of the multi-site logical network. It should be noted that the process 1400 is described in terms of determining the span of nodes through an entire global policy tree, as would be performed if a new site is added to a federation of sites, and therefore the global manager needs to provide the entire global logical network to be implemented at the new site. In some embodiments, when new configuration data is received creating a new element, modifying an existing element, or deleting an element, the global manager performs a similar process for just the new/modified/deleted nodes of the global policy tree.

The process 1400 selects (at 1410) one of the nodes of the global policy tree corresponding to one of the logical network elements. In some embodiments, the nodes are selected in an iterative fashion over the hierarchy of the global tree, starting with the top-level nodes under the global root 1202 (e.g., logical routers, logical switches and segments, domains, etc.). Other embodiments traverse the global policy tree differently.

The process determines (at 1415) the span attribute for the selected node. In some embodiments, the span attribute is determined by a span calculation performed by the broker service of the global manager. In some embodiments, the span calculation is based on the relationships between the nodes in the global policy tree. For example, when the relationship between two nodes is a parent-child relationship, the child node may inherit its span from the parent node. In other cases, however, a child node does not inherit the entire span of its parent node. As another example, when the relationship between two nodes is a dependence of one node on another node, expressed as a reference from one node to the other, the span of the dependent node will depend on the referenced node. Some logical network elements also have a pre-defined span in some embodiments, e.g. defined by an administrator of the network, which is stored in the global manager database. For these logical network elements, the policy broker retrieves the span attributes from the database.

Based on the span attribute, the process 1400 assigns (at 1420) the selected node to a policy subtree for each physical site that is spanned by the node. These policy subtrees are stored in some embodiments in the database 610. In some embodiments, the policy subtrees are associated with the dedicated persistent queues that correspond to each of the physical sites.

The process 1400 determines (at 1425) if any additional nodes remain in the global policy tree. If there are additional nodes, then the process returns to 1410, which was described above. If there are no additional nodes, then the process continues to 1430. At 1430, the process uses the generated policy subtrees to generate relevant desired configuration for each physical site. In some embodiments, the process generates the relevant configuration from the policy subtrees by identifying portions of the global desired configuration. The process 1400 then ends.

Figure 15:
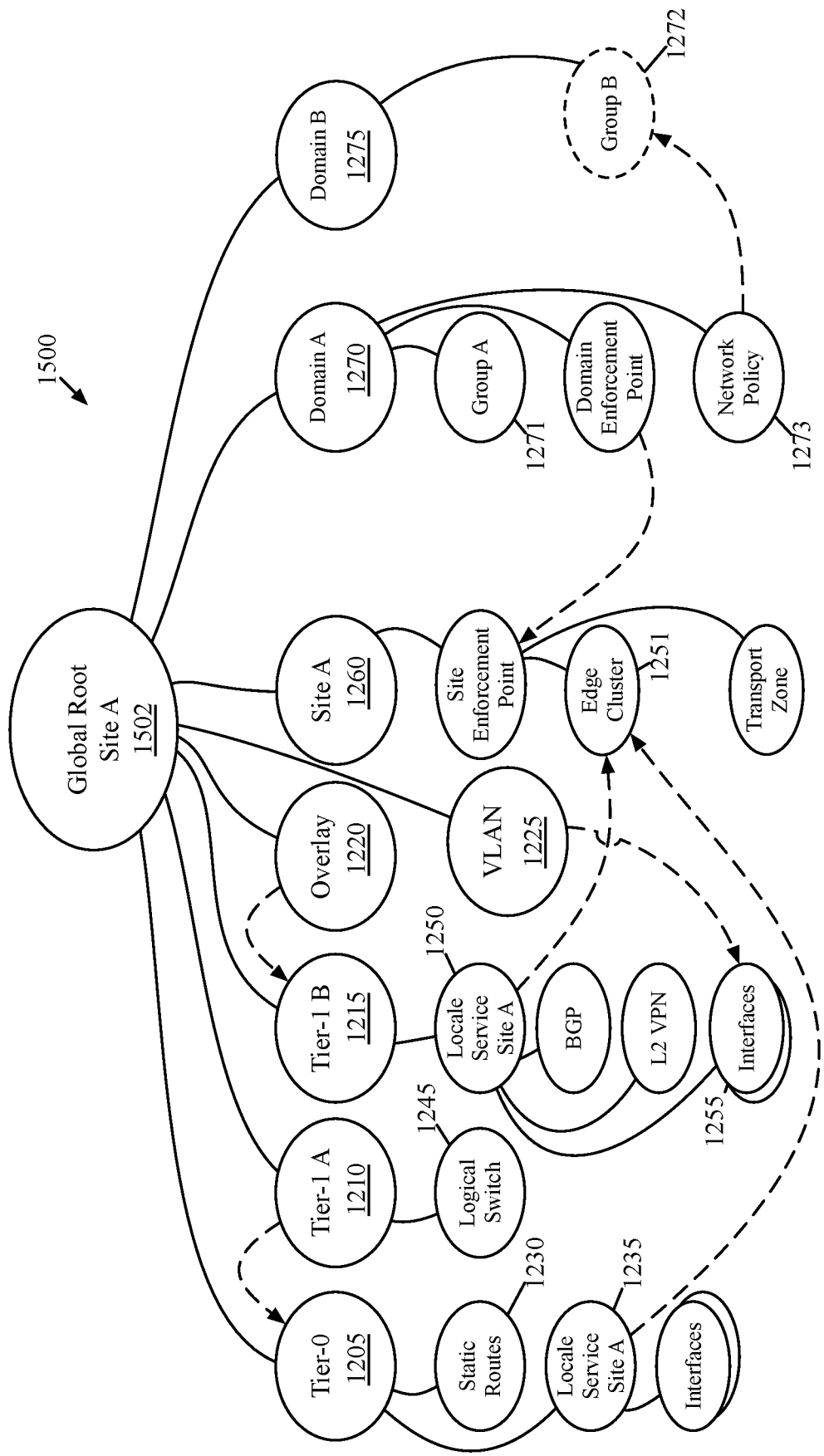
FIG. 15 illustrates a global policy subtree for a physical site based on the global policy tree and stored at the database for local manager for the site.

FIG. 15 illustrates a global policy subtree 1500 for the physical site A, based on the global policy tree 1200, and stored at the database for local manager for site A. Since the subtree 1500 is specific to site A, all top-level nodes below global root 1502 with span that includes site A are preserved, while top-level nodes that are only relevant to sites B and/or C are omitted. For example, the top-level node for site B 1277, the top-level node for site C 1265, and the top-level node for domain B 1275 are all omitted, as are all their respective child nodes. In addition, for router T0 1205, the locale services node for site B 1240 is also omitted. Router T0 1205 still spans sites A and B in some embodiments, since its span attribute is associated with its definition at the global manager 220, not the local manager 225.

Network policy 1273 is also preserved in the global policy subtree 1500. This policy is defined under domain A 1270, so in some embodiments it has a span of site A and site B, even though this subtree is specific to site A. In addition, as noted above with reference to FIG. 12, network policy 1273 also references group B 1272. As a result, the span of the policy also includes site C, even though that site is in a different domain. This reference to group B 1272 is also preserved in the policy subtree 1500. In some embodiments, domain nodes (e.g., the node for domain B 1275) are pushed to the local managers at all sites, or at least all sites at which nodes underneath those domain nodes are required (as is node 1272 in this case).

In some embodiments, a local manager also stores a separate policy tree, that is generated based on desired configuration received directly at the local manager instead of from the global manager 220. This local desired configuration is received from a network administrator to define a logical network that is confined to that site (i.e., the span of all of the logical network elements is only the single site). In some embodiments, the logical network elements that an administrator can define for the local logical network are of the same type as the logical network elements that the administrator can define for the global logical network. As described below, this allows the network management application via which the administrator access the global and local managers to provide the same UI for the different network managers. The global policy tree is stored in the primary global manager database, and a replica of the global policy tree is also stored in the secondary global manager database. The local policy tree, meanwhile, is not replicated to a different site in some embodiments.

Figure 16:
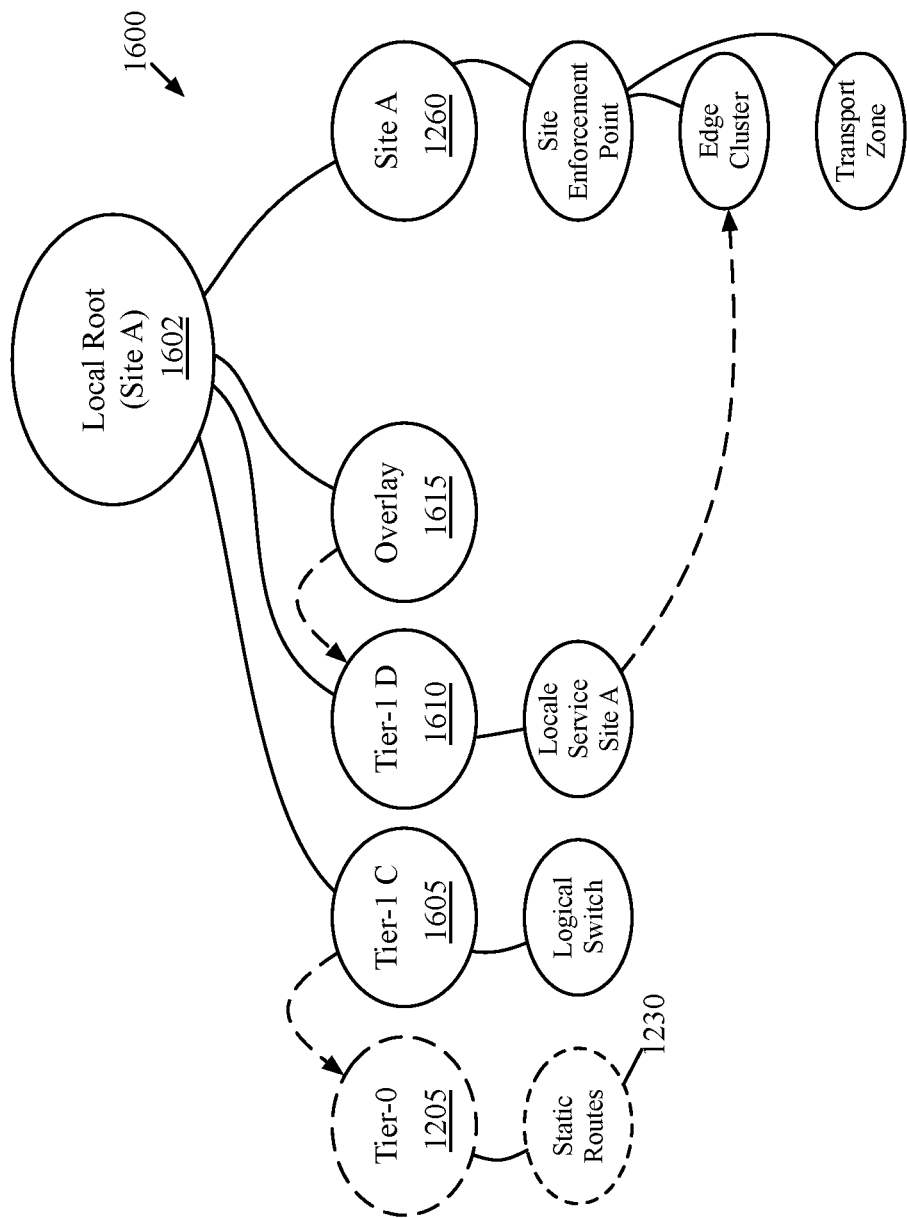
FIG. 16 conceptually illustrates a local policy tree for a site that is distinct from the global policy subtree received from the global manager in some embodiments.

FIG. 16 conceptually illustrates a local policy tree 1600 for site A. This local policy tree is distinct from the global policy subtree 1500 received from the global manager in some embodiments. In this example, the local root 1602 of the local policy tree 1600 connects a site node for site A, two Tier-1 logical routers T1C 1605 and T1D 1610, as well as an overlay segment 1615. The overlay segment 1615 includes a reference to the router T1D 1610, which has a locale service corresponding to site A.

In some embodiments, logical network elements defined in the local policy tree 1600 may reference logical network elements defined in the global policy tree 1200. For example, the node for the router T1C 1605 references the node for the router T0 1205 that was defined from the global manager 220. As a result, data messages sent to the logical router T1C 1605 can be sent to the SRs for the T0 router 1205 (e.g., to reach external networks).

As noted above, in some embodiments the nodes also represent logical network policies that apply to the logical network elements. The logical network policies include forwarding policies, service policies, and security policies, and are applied in some embodiments to govern the behavior of the logical forwarding elements (e.g., by governing the behavior of the physical forwarding elements that implement the logical forwarding elements).

Policies are defined in some embodiments at the global manager through a user client, e.g. by an administrator of the logical network. In some embodiments, policies are one or more service rules which are enforced at the sites on data message flows based on a set of flow attributes. The global manager in some embodiments distributes the service rules to local managers at the sites at which the policy is to be enforced (i.e., the policy's span). The policies are defined in some embodiments by reference to groups of logical network endpoints that span one or more sites (e.g., security groups, which are defined in some embodiments at the global manager). The service rules refer to these groups in some embodiments by using a group identifier that is assigned at the global manager when the groups are defined. The definitions of these groups are distributed to the sites spanned by the policies.

Through the global manager, the administrator can create site-specific logical network elements and policies that are part of the global logical network (and can thus be expanded later to other sites). In this case, the logical network element configuration data will be stored as part of the global policy tree and pushed to the site's local manager based on spanning to that site. In addition, the logical network element configuration data is backed up to the standby global manager when created at the global manager.

On the other hand, if created directly at the local manager as part of the local logical network, the logical network element configuration data and policies will only be part of a local policy tree stored at the local manager. While this local manager is a cluster in some embodiments, if the site goes down (due to, e.g., a natural disaster), the local logical network configuration data is not backed up at another site. However, a local network administrator that only has access to the local manager for that site (i.e., is not granted access to the global manager) can use the network management application to directly configure the logical network at that site.

In some cases, conflicts may occur between globally-defined logical network configuration and locally-defined logical network configuration. For instance, in the network configuration context, an IP address used for a local logical router might conflict with an IP address configured for a logical router spanning to the logical network. In the security context, a local administrator could configure a first firewall rule based on a first security group while a global administrator configures a second firewall rule based on a second security group. If a logical network endpoint DCN belongs to both of these security groups, then the two firewall rules may be in conflict. Some embodiments generally resolve security conflicts in favor of the globally-defined policy but resolve networking conflicts in favor of the locally-defined configuration (with the local manager reporting these overrides of the global configuration to the global manager for notification and/or validation).

Figure 17:
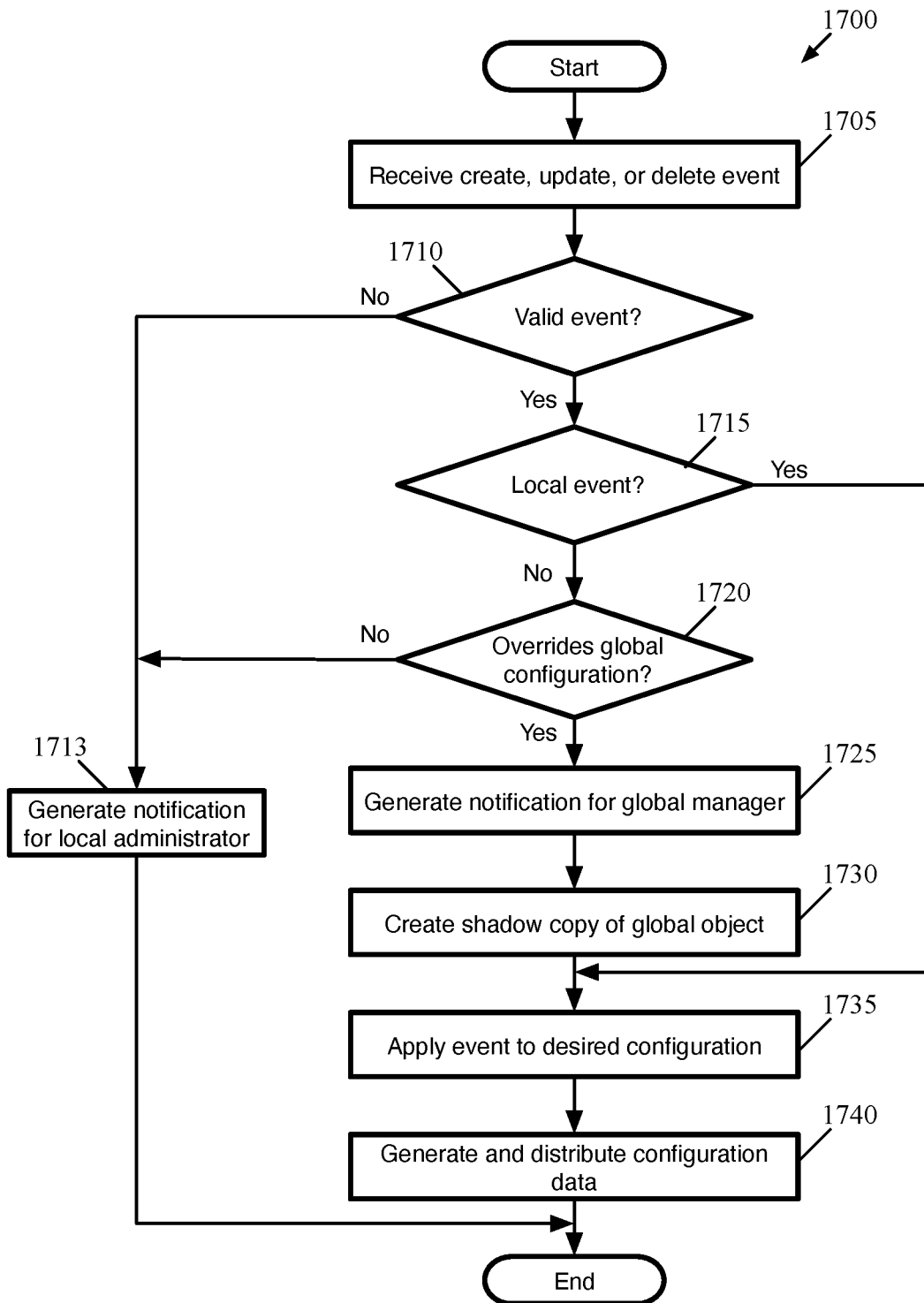
FIG. 17 conceptually illustrates a process of some embodiments for handling a CUD event received from a user client directly at the local manager.

FIG. 17 conceptually illustrates a process 1700 of some embodiments for handling a CUD event received from a user client directly at the local manager (rather than from the global manager). This scenario occurs for example when a local admin of the physical site (who may or may not be the same as the administrator of the global federated logical network as a whole) modifies the logical network's desired configuration as implemented at the local site (e.g. by specifying a series of create, update, or delete events for logical network elements whose span includes the local site).

The process 1700 begins by receiving (at 1705) a CUD event directly from a user client. For example, as illustrated in FIG. 8, data describing the CUD event is received from a user client 240 and stored directly in the database 610 in some embodiments using a series of transactions, initiated through a series of REST API calls from the user client. The user client may not be located at the same physical site in some embodiments, so the CUD event is received by the local manager 230 over a wide-area network 242 (e.g., the Internet). As described above, in some embodiments the API calls are received via a proxy at the global manager. These API calls are received and processed by an API processor module of the local manager in some embodiments, which then provides the received data to the local manager service that performs the core functions of the local manager.

The process 1700 then determines (at 1710) whether the CUD event (or events) is valid. The validation is based on whether there is any error or inconsistency in applying the CUD event to the configuration of the logical network at the physical site. In some embodiments, the validation is performed by the local manager service, either directly upon receipt from the API processor or after retrieving the event from the database of the local manager. If the CUD event is invalid, then the process 1700 generates (at 1713) a notification for the failure to validate the CUD event. The notification in some embodiments is a notification event provided to the user client for intervention (e.g., by an administrator of the network). The process 1700 then ends.

If the CUD event is valid, then the process 1700 determines (at 1715) whether the event is a local event. In other words, the local manager determines whether the CUD event only references logical network elements defined at the local site. These elements, if defined through the local manager, have no span beyond the physical site, and are not known to the global manager. If the CUD event is a local event, then the process 1700 continues to 1735, which is described below.

If the CUD event is not a local event (i.e. the event references a logical network element that was defined at the global manager), then the process 1700 determines (at 1720) whether the event overrides the globally-defined desired configuration of the logical network element. This determination is made in some embodiments by applying a set of priority rules to the CUD event to determine whether the CUD event is allowed to override the globally-defined desired configuration. For example, some embodiments only allow overriding of the desired configuration by a local CUD event for networking-related configurations (e.g., message forwarding rules and policies) or configuration profiles (timers, etc. which are affected by the local site's parameters, such as latency). In such cases, the local CUD event would have priority.

As another example, some embodiments prevent overrides of the desired configuration by a local CUD event for security-related configurations. In such cases, the globally-defined desired configuration would have priority. In addition, in some cases the event is an emergency-related event, which is only recognized by the local manager and therefore does override any related global configuration. If the event does not have priority to override the global configuration (e.g., according to the priority rules), then the process continues to 1717, which was defined above.

If the the CUD event does have priority to override the globally-defined desired configuration, then the process 1700 generates (at 1725) a notification for the primary global manager of the override event. The notification in some embodiments is a notification event that is queued in an egress queue (not shown) of the AR module to be sent back to the AR module at the global manager via the same asynchronous channel (e.g., the dotted line shown in FIG. 8). In other embodiments, the notification event is sent via an out-of-band notification channel. Notification events in the egress queue are retrieved and sent over the channel as part of the core functionality of the local manager service 810 in some embodiments.

Next, the process 1700 creates (at 1730) a local copy of the logical network element the configuration of which is to be overridden by the CUD event. The original logical network element from the global manager remains as a read-only object in the local manager's database in some embodiments, while the local copy (also referred to as a shadow object) is the target of the CUD event instead of the original copy.

The process 1700 then applies (at 1735) the CUD event to the local desired configuration of the logical network at the physical site. If the event is an override, then the process applies the CUD event to the shadow copy of the object instead of the original object received from the global manager. The desired configuration of the logical network is expressed as a policy tree in some embodiments, which is described in further detail above. In the example of FIG. 8, the desired configuration of the logical network (e.g. the configuration of the logical network elements the span of which includes the physical site 210) is locally stored in the database 805. The CUD event is applied to the local desired configuration.

For example, if the CUD event is a create event, then a logical network element defined by the event is created within the local desired configuration stored in the database. If the validated CUD event is an update event, then the desired configuration of a logical network element referenced by the event is updated within the local desired configuration stored in the database. If the validated CUD event is a delete event, then a logical network element referenced by the event is deleted within the local desired configuration stored in the database. Finally, the process 1700 generates and distributes (at 1740) configuration data to the control plane of the logical network (e.g., a central controller or cluster of controllers at each site). The process 1700 then ends.

As described above, to enable the network administrator(s) to provide a desired configuration for the logical network at the global manager and/or the local managers, some embodiments provide a network management client application through which the administrator can access the network managers. This single network management application provides UIs for both accessing the global manager and any of the local managers in order to create and/or modify the logical network configuration. The application provides a first UI for accessing the global manager to configure the global logical network spanning the group of physical sites as well as additional UIs for accessing each local manager at each of the physical sites. The UI for accessing the local manager at a particular site allows the administrator to (i) modify the global logical network as implemented at the particular site and (ii) configure a local logical network at the site (which may be completely separate from or connected to the global logical network).

In some embodiments, the logical network components are the same for the global logical network and the local logical networks, and thus the UIs for the global manager and local managers appear as a single pane of glass with the same UI items and display areas. In addition, in some embodiments, within the UIs an item is provided to enable the user to toggle between the UIs for the different network managers.

Figure 18:
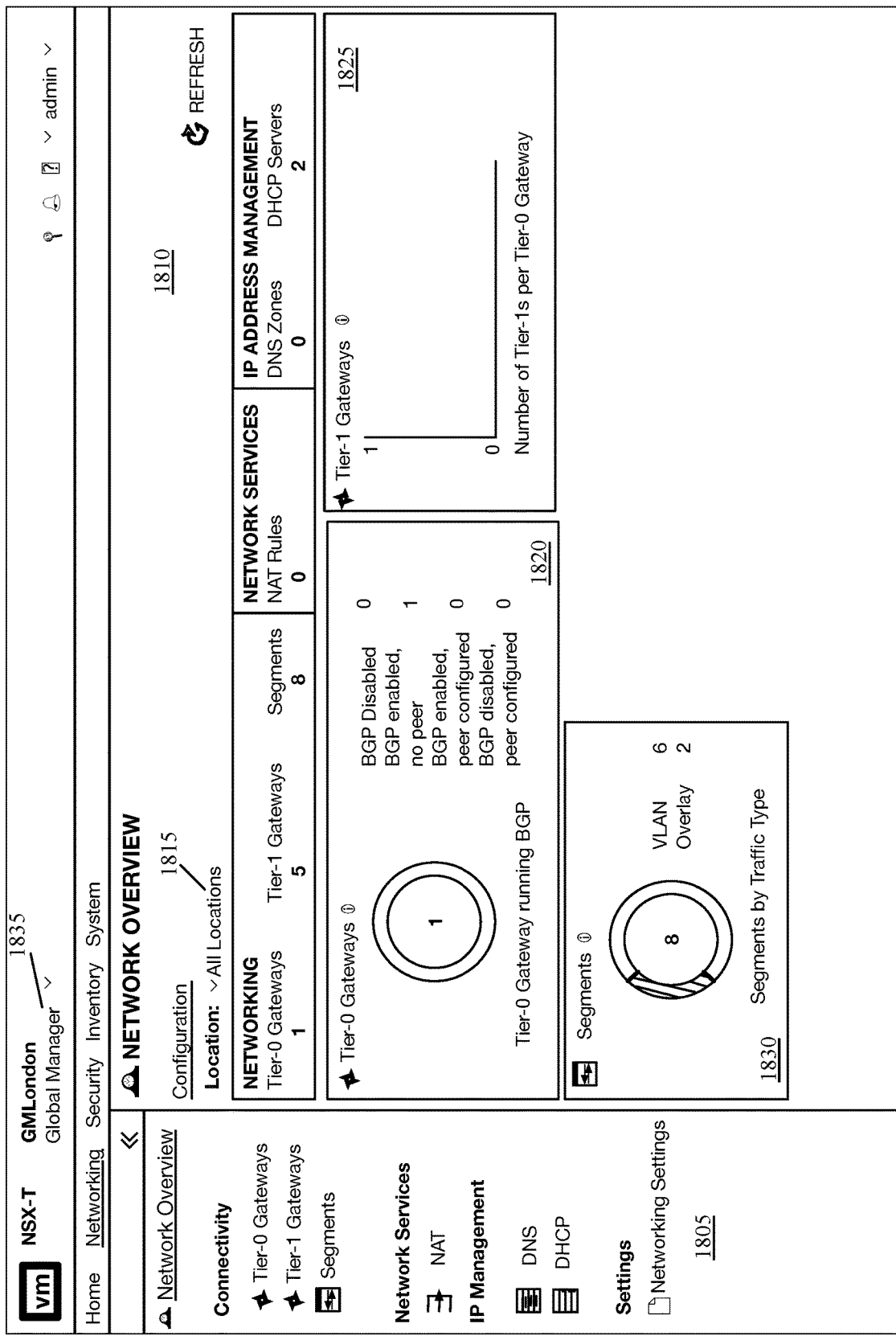
FIG. 18 illustrates an example of a GUI page for viewing and modifying the global logical network configuration at a global manager.

FIG. 18 illustrates an example of a GUI page 1800 for viewing and modifying the global logical network configuration at a global manager. The GUI for the global manager (and for the local managers), in some embodiments, provides sections for configuring logical forwarding elements and for configuring network services. The GUI page 1800 is a primary GUI page for the global manager that provides a navigation area 1805 and a network overview section 1810, as well as display areas for each available type of logical forwarding element and/or service.

The navigation area 1805 includes selectable items grouped by type of logical network construct in some embodiments. As shown, this navigation area 1805 includes a "connectivity" section with different types of logical forwarding elements (e.g., logical switches (segments), T0 logical routers for connecting the logical network to external networks, and T1 logical routers for connecting logical switches without requiring processing by the T0 logical routers and for providing stateful services for logical network endpoint DCNs connected to those logical switches). In some embodiments, each of these items is selectable to cause the application to access configuration information at the global manager about these different types of logical forwarding element.

In addition, the navigation area 1805 includes a "network services" section which may include information about various different types of network services. These services may be configured to be performed at the edge devices (e.g., as part of SR processing), at the host computers as part of distributed logical forwarding element processing, by service DCNs on host computers at the sites, or by third-party service machines in different networks. In this case, only NAT services are configured, but (as shown below), some embodiments may include VPN services, load balancing services, forwarding policies such as firewall services or policy-based routing, etc. The navigation area 1805 also includes an "IP management" section with selectable items related to IP address management (e.g., DNS, DHCP, IP address pools, etc.) as well as a generic "settings" section with selectable items for modifying settings (such as the illustrated networking settings).

The GUI page 1800, as mentioned, also includes a network overview section 1810 that provides overview statistics for the global logical network configuration. As shown, this network overview section 1810 indicates the number of T0 gateways (i.e., T0 logical routers), T1 gateways (i.e., T1 logical routers), and segments (i.e., logical switches). In some embodiments, this section 1810 also indicates statistics for the configured network services (e.g., the number of NAT rules configured for the logical network) and IP address management (e.g., the number of configured DNS zones and DHCP servers).

Figure 19:
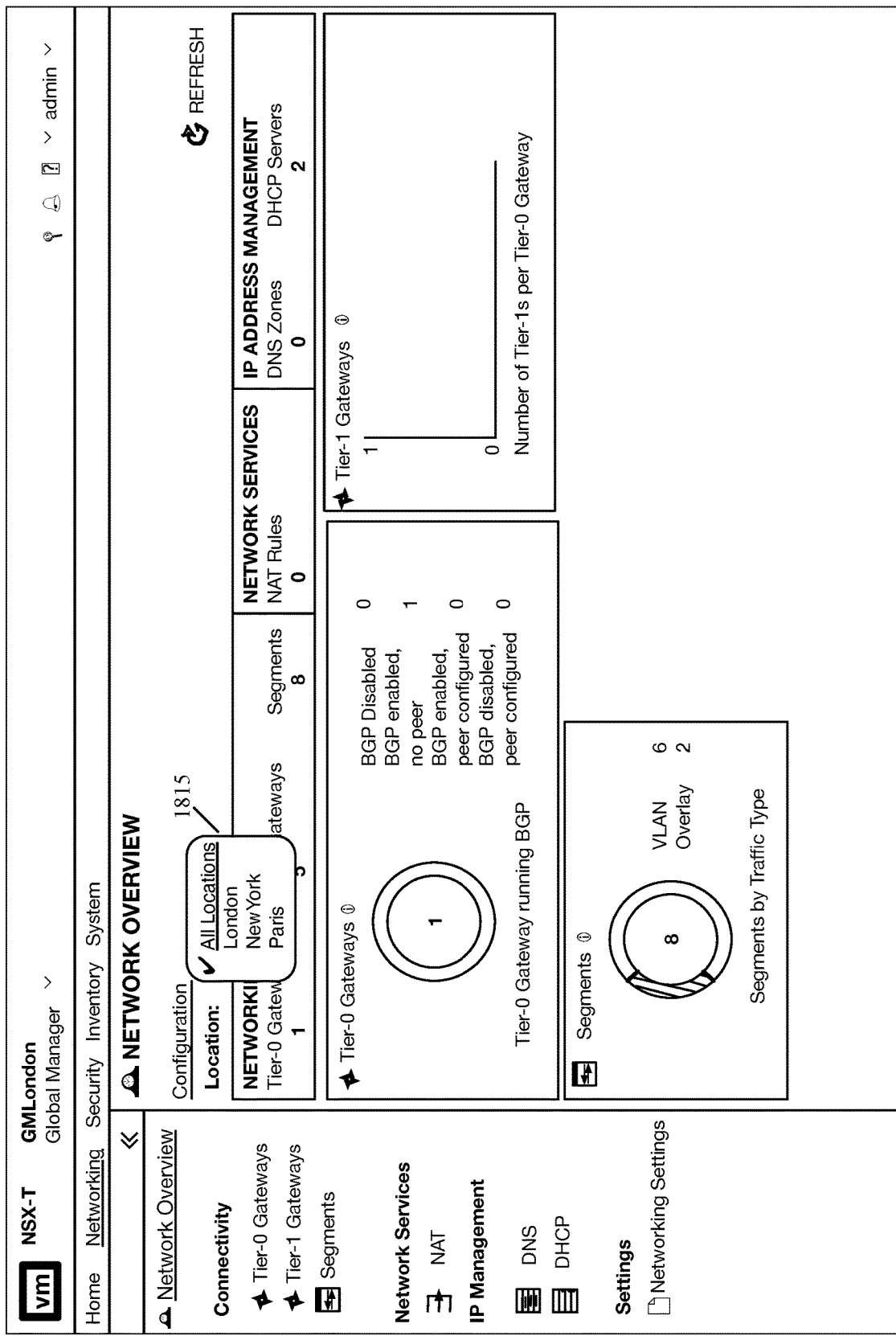
FIG. 19 illustrates the selection of a location selector item in the GUI page of FIG. 18.
Figure 20:
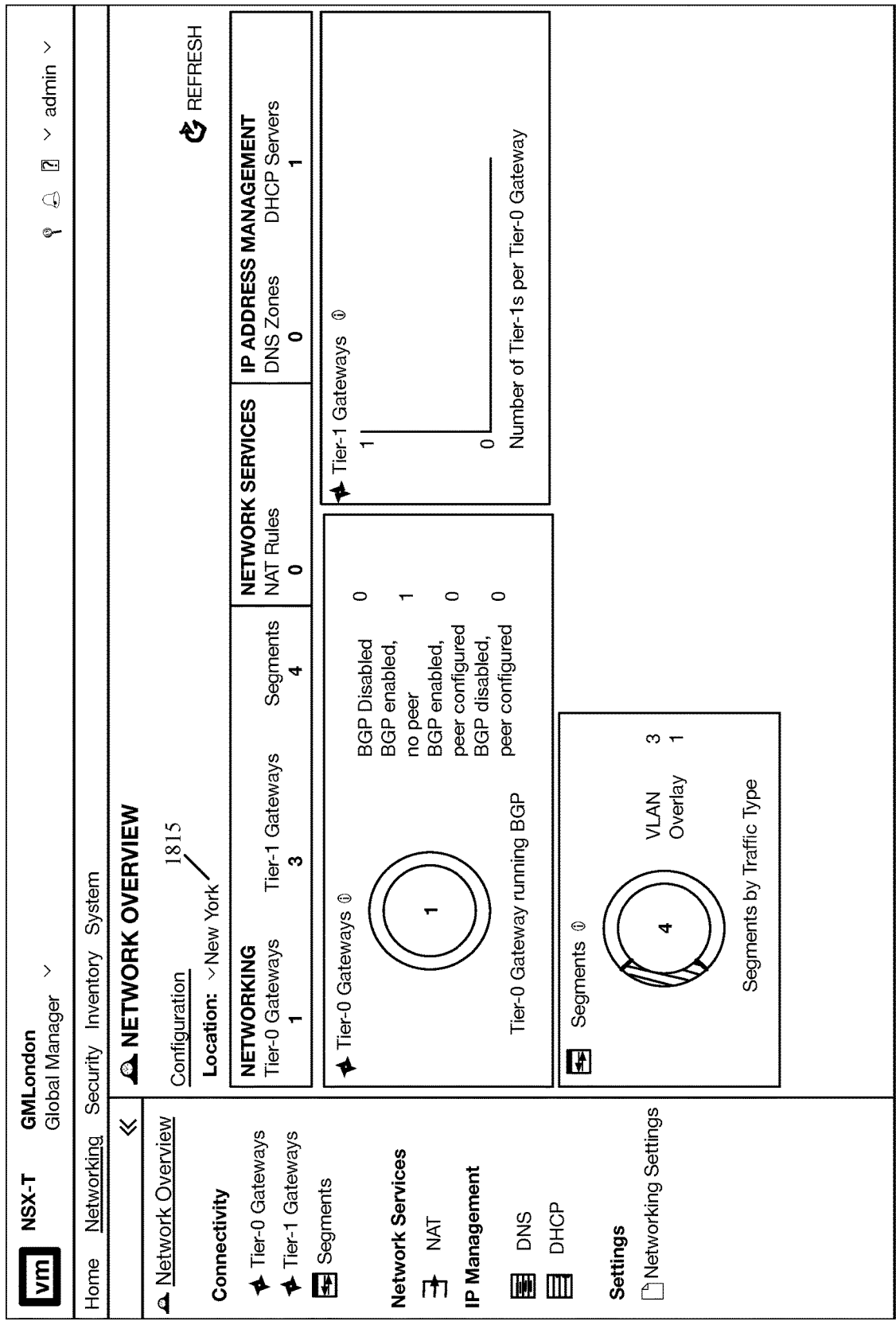
FIG. 20 illustrates that the same primary UI page of FIG. 18 only shows statistics for one site when this option has been selected through the location selector item.

The network overview section 1810 in the global manager primary UI page 1800 also includes a location selector item 1815 that enables the user to select whether the application shows network overview statistics for the entire federation of sites (i.e., the entire logical network) or only for a single one of the sites. FIG. 19 illustrates the selection of this location selector item 1815, which allows the user to choose from "All Locations" or one of the individual physical sites spanned by the logical network (London, New York, or Paris). FIG. 20 illustrates that the same primary UI page 1800 only shows statistics for the New York site when this option has been selected through the location selector item 1815. Specifically, the number of T1 gateways, segments, and DHCP servers has been reduced for the New York site.

Returning to FIG. 18, the primary GUI page 1800 for the global manager also includes selectable display areas for each type of logical forwarding element configured for the global logical network. In this case, the display areas include a T0 gateways display area 1820, a T1 gateways display area 1825, and a segments display area 1830. In some embodiments, each of these respective display areas provides additional details about the logical forwarding elements of the respective type configured for the logical network, and may provide visualizations of some of these details. For example, the T0 gateways display area 1820 indicates how many of the T0 gateways are currently running BGP (e.g., to exchange routes with external networks) and provides additional information about the use of BGP on the gateways. The T1 gateways display area 1825 provides statistics regarding the number of T1 logical routers per T1 gateway, and the segments display area 1830 provides a breakdown between VLAN segments (e.g., for connecting T0 SRs to external networks) and overlay segments (e.g., logical switches that may be stretched between sites). Though not shown in this figure, the primary UI page 1800 may also include selectable display areas with information about different types of configured network services (e.g., NAT, load balancing, firewall rules, etc.). In some embodiments, each of these items is selectable to cause the application to access configuration information at the global manager about these different types of logical forwarding elements and/or network services.

Figure 21:
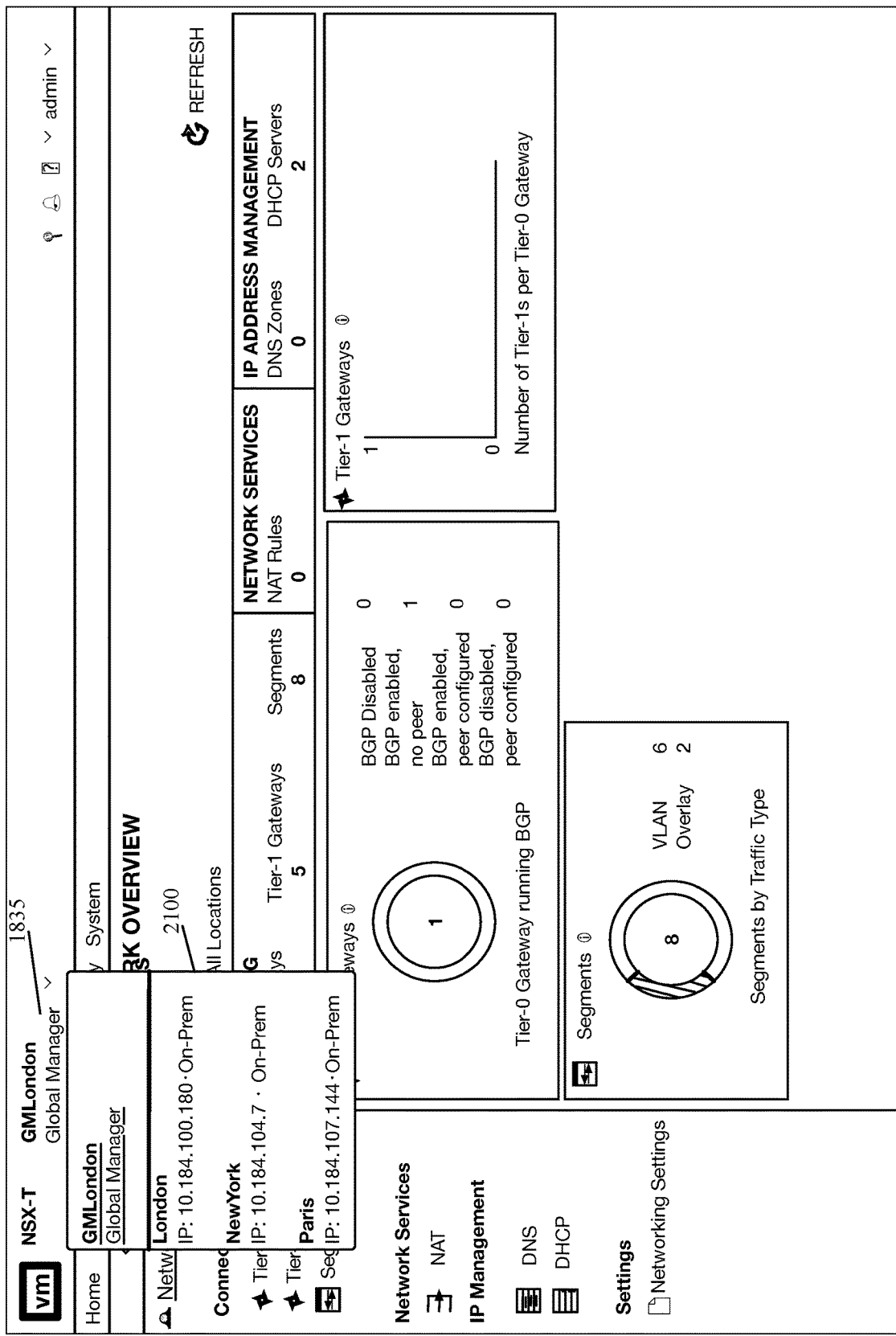
FIG. 21 illustrates the selection of this network manager selector item in the GUI page of FIG. 18.

Lastly, the GUI page 1800 includes a network manager selector item 1835. In some embodiments, this allows the user to quickly access other network managers (e.g., any of the local managers) through the same network management application client and be presented with an equivalent (similar) GUI page. FIG. 21 illustrates the selection of this network manager selector item 1835. As shown, when selected, the network manager selector item 1835 displays a drop-down menu 2100 showing the global manager (which is located in London, and is currently selected) as well as each of the local managers for London, New York, and Paris (also indicating their IP addresses, and that they are located at those sites). In some embodiments, this drop-down menu 2100 is only available if the user is authenticated for all of the local managers (and the global manager). If the user is only allowed to access, e.g., one of the local managers, then only information retrieved from that is shown in the GUI, and the selector item 1835 cannot be used to access other network managers.

Figure 22:
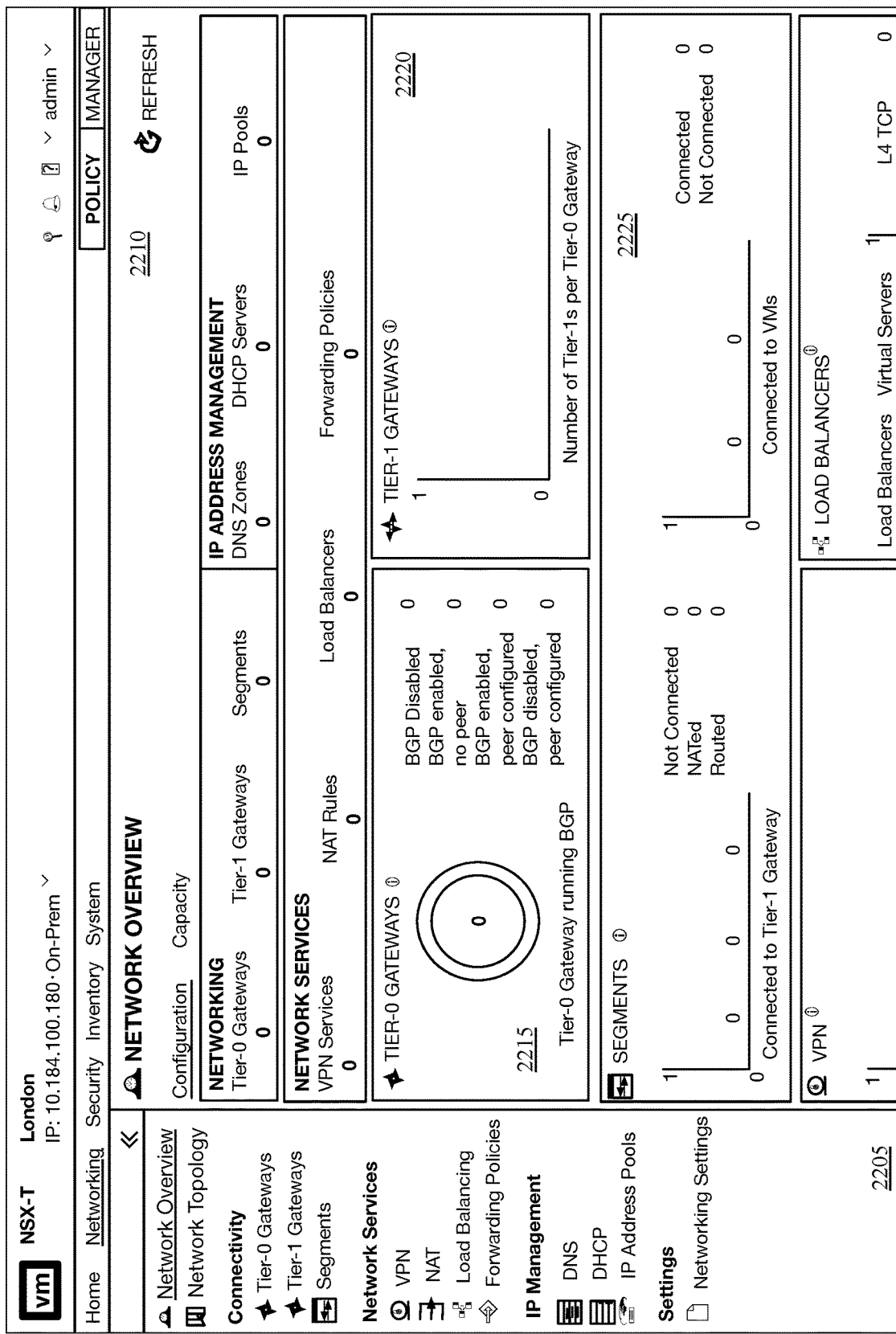
FIG. 22 illustrates a primary GUI page for a local manager.

When the user selects one of the local managers from the drop-down menu, the application client accesses that local manager to retrieve desired state configuration pushed to the local manager and displays a primary GUI page for the local manager. FIG. 22 illustrates a primary GUI page 2200 for the London local manager. As shown, the GUI page 2200 is laid out in the same manner as the global manager GUI page 1800 (i.e., the GUIs appear through the client application as a single pane of glass).

The GUI page 2200 includes a navigation area 2205, a network overview section 2210, as well as display areas for each available type of logical forwarding element and/or service. The navigation area 2205, as with the navigation area 1805 in the global manager GUI page 1800, includes selectable items grouped by type of logical network construct in some embodiments. As shown, this navigation area 2205 includes a "connectivity" section with different types of logical forwarding elements (e.g., segments, T0 logical routers, and T1 logical routers), a "network services" section, an "IP management" section, and a "settings" section. Similar to the navigation area for the global manager, these items are selectable in some embodiments to navigate to GUI pages specific to the type of logical network construct selected, in this case for providing information specific to the current local site (London).

The network overview section 2210 provides overview statistics for the local logical network configuration in the same manner that the network overview section 2210 in the global manager GUI page 1800 provides statistics for the global logical network configuration. In this case, the administrator has provided input to enable many types of network services (VPN, NAT, load balancers, forwarding policies) at the network, but has not yet created such services, rules, policies, etc. Similarly, the global logical forwarding elements (T0 gateways, T1 gateways, etc.) have not yet been stretched to the London site, so the statistics show none of these yet either. It should also be noted that, unlike the global manager page, the network overview section 2210 does not include a location selector item because only information about the particular site is available through the local manager for that particular site.

Furthermore, the GUIs for the different network managers provide the same display areas for the same types of logical forwarding elements and logical network services (when those services are configured in the different logical networks). Thus, the GUI page 2200 includes a T0 gateways display area 2215, a T1 gateways display area 2220, and a segments display area 2225. In some cases, the local manager GUI page 2200 provides the same visualization and information as does the global manager GUI page 1800 (e.g., BGP information for the T0 logical routers, number of T1 gateways per T0 logical gateways). On the other hand, for the segments, the GUI page 2200 provides information about segments connected to T1 gateways and/or VMs (e.g., for the overlay segments) rather than a breakdown between overlay segments and VLAN segments.

Returning to FIG. 18, if the user selects a particular type of logical forwarding element (or logical network service) in the navigation area 1805 or a selectable display area for a particular type of logical forwarding element, the client application requests information from the global manager about the logical network elements of the selected type and displays a GUI page specific to that type of logical network element.

FIG. 23 illustrates a GUI page 2300 for T0 gateways in the global logical network. A shown, this GUI page 2300 includes the navigation area 1805 as well as a T0 gateways display section 2305, which provides more detailed information about the T0 logical routers configured for the logical network. In some embodiments, this section 2305 lists all of the T0 logical routers, providing their administrator-defined name, the high-availability configuration mode (e.g., active-active or active-standby), the number of T1 logical routers linked to the T0 logical router, the number of segments (e.g., overlay and/or VLAN segments) linked to the T0 logical router, the status, and any alarms that have been raised (e.g., due to a failure to setup a T0 SR at a particular site). The status, in some embodiments, is only provided if the user requests it, in which case the global manager identifies the sites spanned by the T0 router and sends requests to the local managers at those sites to determine whether the desired state has been realized correctly at those sites.

In this case, there is one T0 logical router configured, and the user has selected to view additional information about the logical router. As shown, this additional information corresponds in some embodiments to various aspects of the desired state configuration shown in the policy tree described above, such as the locations (indicating at which edge cluster in the various sites the T0 SR is implemented), interfaces, routing information (e.g., static routes, IP prefix lists, route maps, etc.), BGP information (e.g., the BGP settings for each SR), and route redistribution settings (e.g., how to redistribute routes learned at one SR to the other SRs). Each of these subsections is selectable in some embodiments to provide additional information about the T0 gateway. In this figure, the location item has been selected to provide additional information about the SRs at each different site (London, New York, and Paris). Specifically, this display indicates to which edge cluster the SR is assigned in each site, and the mode for the SR (because the HA mode is active-active, all of the SRs are primary in this case). The other items are also expandable to provide additional information in some embodiments.

FIG. 24 illustrates a GUI page 2400 for T0 gateways at a particular one of the sites (Paris). This GUI page may be reached either via the navigation area in the primary page for the local manager of the site or via the network manager selector item on a GUI page for T0 gateways at a different manager (e.g., the global manager or a different local manager). Just as the primary GUI page 2200 for a local manager mirrors the primary GUI page 1800 for the global manager, the T0 gateways GUI page 2400 for a local manager mirrors the T0 gateways GUI page 2300 for the global manager. Thus, the GUI page 2400 includes a navigation area 2405 as well as a T0 gateways display section 2410, which provides more detailed information about the T0 logical routers configured for the logical network and spanning to the particular site. These may include T0 logical routers that span multiple sites and that are configured via the global manager, as well as T0 logical routers configured through the local manager of the particular site. In some embodiments, keeping in concert with providing similar or the same GUIs for the global manager and for the local managers, the sections of the T0 gateways display section 2410 are similar as to those sections in the global manager GUI page 2300. However, rather than providing information about multiple locations, the display section 2410 only indicates the edge cluster at the local manager to which the T0 SR is assigned.

As mentioned previously, the network controllers of some embodiments operate at each site to, among other functions, provide configuration data from the local manager at the site to the computing devices of the site. In some embodiments, a cluster of network controllers (also referred to as the central control plane) operate at each site. The network controllers for a group of sites spanned by a logical network connect in a full mesh in some embodiments.

Figure 25:
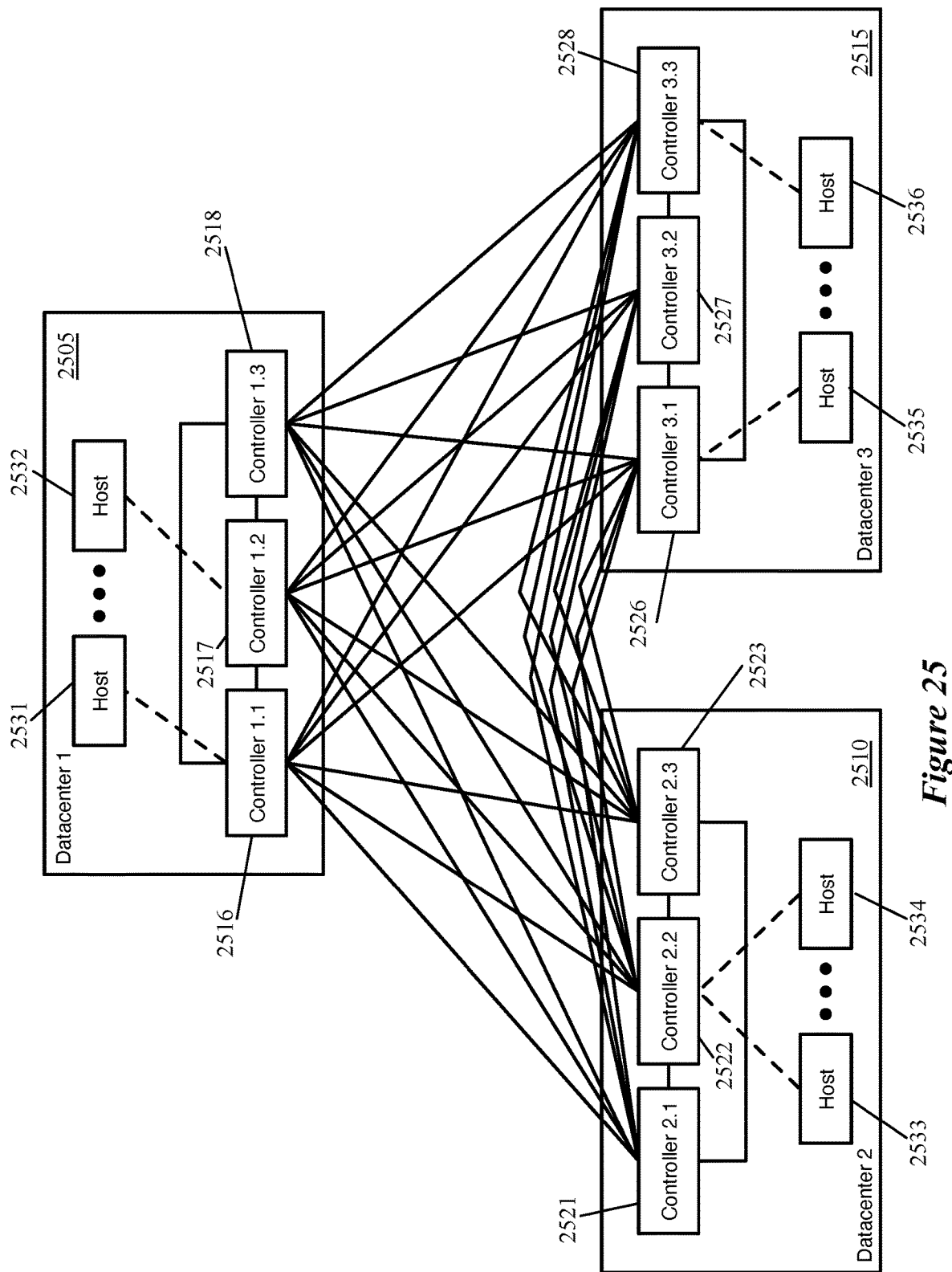
FIG. 25 conceptually illustrates a full mesh of network controllers across three sites (e.g., datacenters) in some embodiments.

FIG. 25 conceptually illustrates a full mesh of network controllers across three sites (e.g., datacenters) 2505-2515 in some embodiments. As shown, each of the sites 2505-2515 includes a cluster of three controllers, each of which communicates with the other controllers in the cluster. That is, at the first site 2505, the three controllers 2516-2518 communicate with each other; at the second site 2510, the three controllers 2521-2523 communicate with each other; and at the third site 2515, the three controllers 2526-2528 communicate with each other.

Each of the sites 2505-2515 also includes host computers (and edge devices, which are not shown in the figure) that receive configuration data from the controllers 2516-2528. In some embodiments, each computing device (e.g., each host computer and/or edge device) has a master network controller that is responsible for providing configuration data to that computing device, as well as receiving any runtime state changes from the computing device (e.g., the creation and/or deletion of logical network endpoint DCNs on the computing device). For example, in the first site 2505, host computer 2531 has controller 2516 as its master controller and host computer 2532 has controller 2517 as its master. In the second site 2510, both illustrated host computers 2533 and 2534 have controller 2522 as their master controller. In the third site 2515, host computer 2535 has controller 2526 as its master controller and host computer 2536 has controller 2528 as its master controller.

In addition, each controller at each of the sites communicates with each controller at each of the other sites. As shown in the figure, each of the controllers 2516-2518 at the first site 2505 has a connection to each of the controllers 2521-2523 at the second site 2510 and each of the controllers 2526-2528 at the third site 2515. Similarly, each of the controllers 2521-2523 at the second site 2510 has a connection to each of the controllers 2526-2528 at the third site 2515. Each of these connections is a bidirectional connection in some embodiments. However, as described below, not all of the connections are used in all cases (and some connections may be unidirectional for the provision of logical network state).

Figure 26:
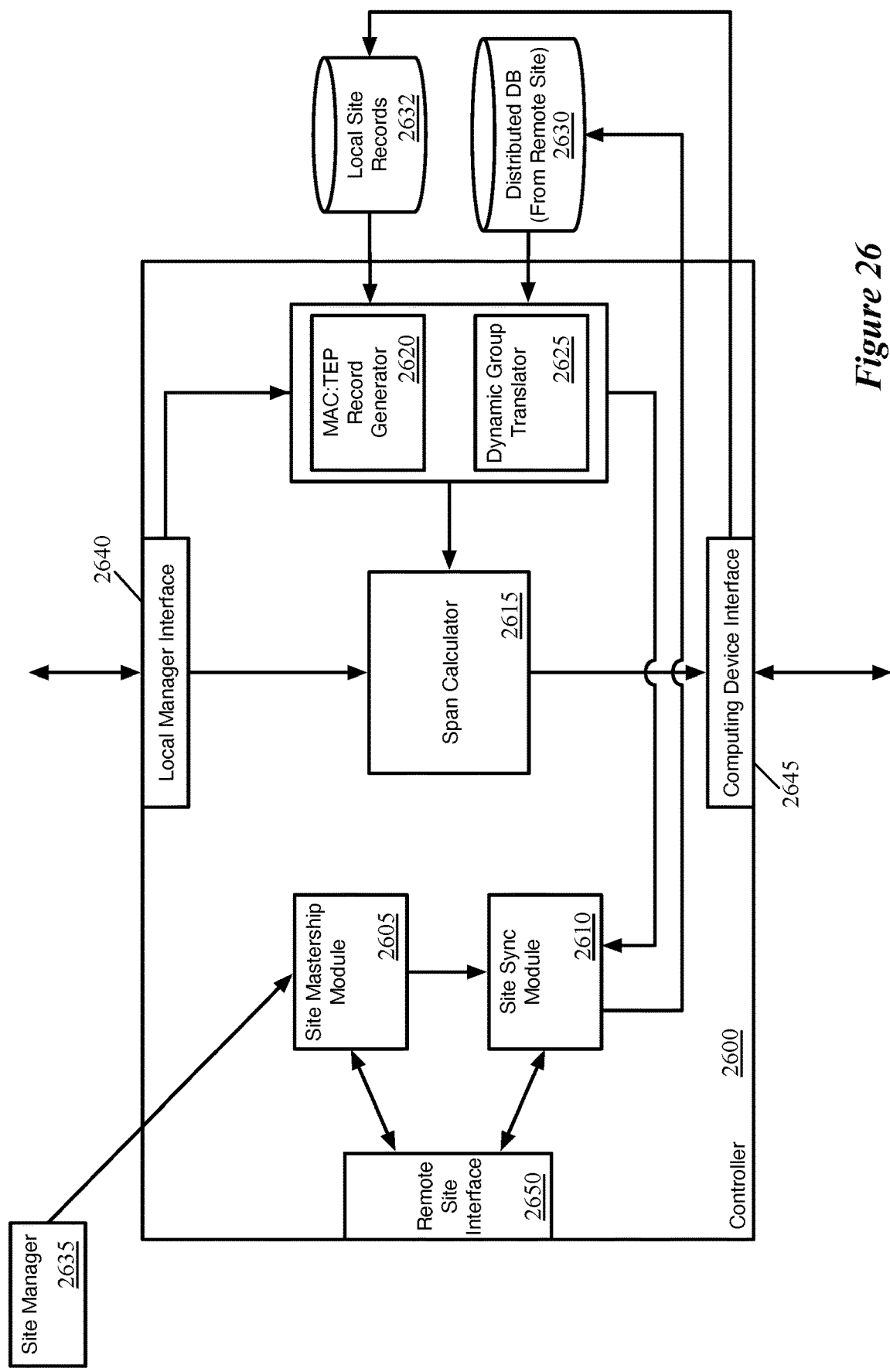
FIG. 26 conceptually illustrates the architecture of a network controller of some embodiments.

FIG. 26 conceptually illustrates the architecture of a network controller 2600 of some embodiments. In some embodiments, the network controller is an application operating on a computing device (e.g., executing within a VM or container, or on a bare metal operating system). The network controller 2600 includes a site mastership module 2605, a site sync module 2610, a span calculator 2615, a MAC:TEP record generator 2620, and a dynamic group translator 2625. The network controller also accesses a distributed database 2630 for storing data received from controllers at remote sites as well as a storage 2632 (e.g., another distributed database) for storing records of data for the local site. In some embodiments, the network controller 2600 has a separate distributed database (or separate database partition) for data from each remote site the controllers of which provide data to the network controller 2600 (or other controllers in the local cluster). Similar to the distributed database described above by reference to FIG. 7, in some embodiments the distributed database 2630 and/or the local site records storage 2632 is stored on each of the computing devices on which the members of the network controller cluster operate. Each of the network controllers in the cluster therefore has access to the entire distributed database 2630 and the entire set of local site records 2632.

In some embodiments, a site manager 2635 for the controller cluster at each site exchanges certificates and any other required authentication information with the other sites (e.g., with the site managers of the other sites). This site manager 2635 then provides the network controllers at its site with the information (e.g., IP address, certificate, etc.) so that each network controller at the site has connectivity with each network controller at each of the other sites.

In some embodiments, the site mastership module 2605 receives this information from the site manager 2635 whenever a new site is added to the logical network. The site manager gathers the required authentication information and provides this information to the site mastership module 2605. In some embodiments, one controller from the cluster at each site is designated for sending logical network state data to each other site, and one controller from the cluster at each site is designated for receiving the logical network state data from each other site. To make the selection, the site mastership module 2605 of some embodiments uses a slot-based sharding mechanism (e.g., by computing a hash value modulo the number of available controllers in the cluster). In some embodiments, the sharding mechanism is deterministic (e.g., based on controller and/or site identifiers), and the site mastership module 2605 at each of the controllers in the cluster performs the same computations to determine the sender controller and receiver controller for communication with each other site. This process is described in further detail below by reference to FIG. 27. As an alternative or in addition to sharding based on sites, some embodiments shard the controller cluster based on logical network state (e.g., using one controller for sending security group data to a particular remote site and another controller for sending logical network to physical network mapping data to the particular remote site).

When the site mastership module 2605 determines that the network controller 2600 is the sender controller for a particular other site, the site sync module 2610 is responsible for communicating with that particular other site to provide logical network state data to the particular site via the remote site interface 2650. As described below, in some embodiments the MAC: TEP record generator 2620 and dynamic group translator 2625 retrieve the local site records 2632 and generate data to be provided to the remote sites (e.g., lists of MAC addresses located at the local site for logical switches spanning the local site and the particular remote site, lists of IP and MAC addresses for DCNs at the site belonging to various security groups). These sets of data are then provided to the site sync module 2610 to be provided to the remote site.

Similarly, when the site mastership module 2605 determines that the network controller 2600 is the receiver controller for a particular remote site, the site sync module 2610 is responsible for communicating with that particular remote site to receive logical network state data from the remote site via the remote site interface 2650. In some embodiments, the site sync module 2610 stores the logical network state data received from the controllers at other sites in the distributed database 2630 (e.g., in the specific database or database partition for that particular remote site).

In some embodiments, the network controller 2600 receives logical network configuration data from the local manager for the site via the local manager interface 2640 and stores this data in the distributed database 2630. The span calculator 2615 receives this network configuration data from the local manager interface 2640 (or from another controller in the cluster for the local site, if that other controller received the data from the local manager and stored the data in another shared database), and determines the computing devices to which the data should be distributed. At the global manager level, the span of a logical network element specifies the physical sites to which the configuration data for the logical network element is distributed. At the controller level for a particular site, the span specifies the computing devices (e.g., edge devices and/or host computers) in that particular site that require the configuration data for the logical network element. The span calculator 2615 identifies which logical network configuration data goes to which computing devices for which the network controller 2600 is the master controller, and sends this data to these computing devices (e.g., to local controllers on the devices) via the computing device interface 2645.

In addition to providing the configuration data from the local managers to the computing devices (i.e., host computers and edge devices) at their particular site, the network controllers for a particular site generate certain logical network state data and provide this generated logical network state data to (i) the computing devices at the particular site and (ii) the network controllers at other sites. In some embodiments, the network controller 2600 receives data from the computing devices at its site via the computing device interface 2645, and stores this data in the local site records storage 2632. This information includes information about logical network endpoint DCNs executing on the particular computing devices (e.g., MAC and IP addresses, DCN tags, etc.) as well as information about the computing devices themselves (e.g., tunnel endpoint (TEP) IP addresses).

In some embodiments, the MAC:TEP record generator 2620 generates logical network address to physical network address (physical location) mapping data based on the data stored in the local site records 2632 and data from the remote site(s) stored in the distributed database 2630. These records can include records for computing devices at the local site as well as records to be provided to the remote site. In some embodiments, the dynamic group translator 2625 generates security group information, such as network addresses of logical network endpoint DCNs belonging to security groups.

The dynamic group translator 2625 receives security group definitions from the local manager and endpoint DCN information from the local site records 2632 and combines this information to generate the lists of network addresses (e.g., MAC and IP addresses) for different security groups. In some embodiments, the dynamic group translator 2625 also combines this data with lists of network addresses for the security groups received from the remote site and stored in the distributed database 2630. These logical network state generation and distribution operations are described in further detail below.

The span calculator 2615 receives generated logical network state data from the MAC:TEP record generator 2620 and/or the dynamic group translator 2625 and determines to which computing devices at the local site this logical network state data should be provided (e.g., based on the logical switch and/or security group to which the logical network state data pertains).

Figure 27:
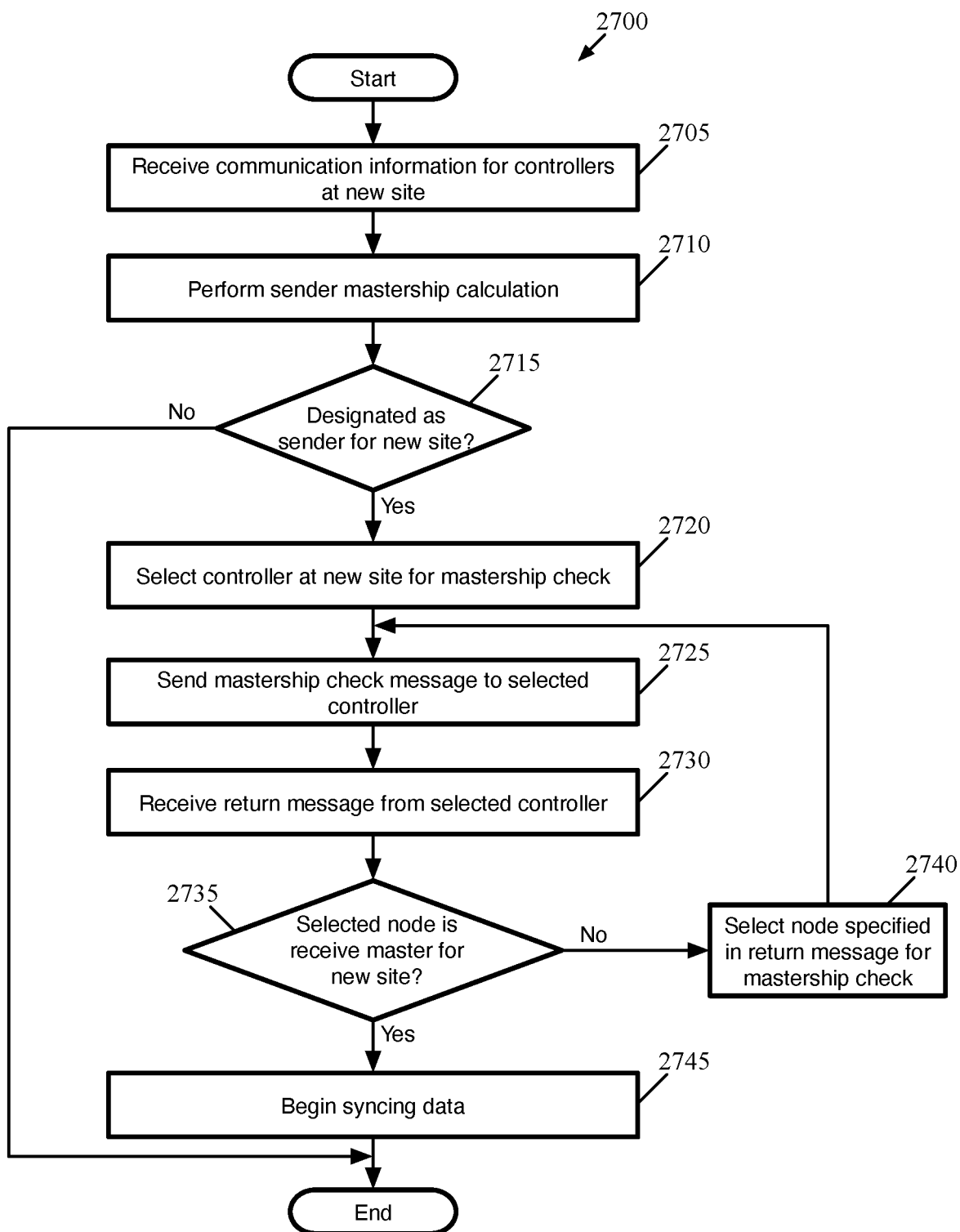
FIG. 27 conceptually illustrates a process of some embodiments for setting up logical network state data exchange with another site.

In order to exchange logical network state data with controllers at other sites, as mentioned, the site mastership module 2605 on a network controller identifies whether that network controller is the sending and/or receiving master for a particular other site. FIG. 27 conceptually illustrates a process 2700 of some embodiments for setting up logical network state data exchange with another site. In some embodiments, the process 2700 is performed by each controller at a particular site when another site joins the same federation of sites spanned by a logical network as the particular site. This process 2700 would also be performed by the controllers at the new site, because while the logical network state data exchange is bidirectional, mastership for each direction is handled separately in some embodiments.

As shown, the process 2700 begins by receiving (at 2705) communication information for controllers at the new site. In some embodiments, the site manager at the particular site exchanges certificates and any other required authentication information with the new site, and provides the network controller at its site with this information (e.g., IP address, certificate, etc.) so that the network controller has connectivity with each network controller at the new site.

The process 2700 then performs (at 2710) a sender mastership calculation. In some embodiments, the controller uses a slot-based sharding mechanism such that (i) different controllers in the cluster will be the master sender for different other sites and (ii) each controller in the cluster will perform the same calculation to determine the master. For instance, some embodiments compute a hash value based on information about both controller clusters (i.e., the controllers for the particular site and the new site), such as using controller identifiers, controller IP addresses, etc. While this process shards the responsibility for sending (and receiving) logical network state data based on sites, some embodiments instead shard this responsibility based on logical network state. For example, some embodiments have different controllers in a cluster responsible for sending and/or receiving translated network addresses for different security groups, or logical network to physical network mapping records for different logical switches.

Next, the process 2700 determines (at 2715) whether it (i.e., the controller performing the process 2700) is designated as the sender for the new site (i.e., whether the mastership calculation has designated itself as the master for sending logical network state data to the new site). If not, the process 2700 ends, as a different network controller in the cluster is the master (and therefore will be performing the remaining operations of the process 2700).

If this controller is the master, the process selects (at 2720) a controller at the new site with which to perform a mastership check. In some embodiments, the controller performing the process 2700 selects the controller at the other site randomly. In other embodiments, the controller performing the process 2700 uses a round-robin selection mechanism to select the controller at the other site. Still other embodiments may use other selection mechanisms.

The process 2700 then sends (at 2725) a mastership check message to the selected controller. This mastership check message, in some embodiments, (i) specifies that the controller sending the message is designated as the master for sending logical network state data to the new site and (ii) requests that the controller to which the message is sent determine whether it is designated as the master for receiving logical network state data from the site sending the message.

This causes the controller at the new site that receives the mastership check message (the recipient controller) to perform a mastership calculation (for receiving rather than for sending). Based on this mastership calculation, the recipient controller sends a return message to the sending controller. As such, the process 2700 receives (at 2730) this return message from the selected (recipient) controller. In some embodiments, this return message either (i) indicates that the selected controller is designated as the receive master for the new site vis-à-vis the existing site at which the process 2700 executes or (ii) indicates that the selected controller is not designated as the receive master, but specifies which controller in its cluster is designated as the receive master.

The process 2700 determines (at 2735) whether the selected controller node is the receive master for the new site, based on this return message. If the previously selected controller (that sent the return message) is not the designated receive master, then the process selects (at 2740) the controller node specified in the return message as the receive master for the mastership check, and returns to 2725 to send the mastership check message with this newly selected controller node.

This newly selected controller at the new site will receive the mastership check message, perform the same deterministic calculation to determine receive mastership, and presumably identify itself as the receive master. The new recipient controller sends a return message indicating that it is the receive master to the sending controller performing the process 2700. Once the receive master is identified (whether on the first or subsequent attempt), the process 2700 begins (at 2745) syncing logical network state data by identifying the state data for the new site and transmitting this data to the identified receive master controller. The process 2700 then ends.

The result of this process (and the corresponding receive mastership check) being performed at each site is that one controller from the cluster at each site is designated for sending logical network state data to each other site, and one controller from the cluster at each site is designated for receiving the logical network state data from each other site. That is, if there are three sites, the first site separately designates (i) a controller for sending data to the second site, (ii) a controller for sending data to the third site, (iii) a controller for receiving data from the second site, and (iv) a controller for receiving data from the third site. Each of these separately designated controllers may be a different controller in the cluster, or there may be overlap. For instance, different controllers could be designated for sending state data to different sites, and for the same remote site, different controllers could be designated for sending state data to the remote site and for receiving state data from the remote site.

Figure 28:
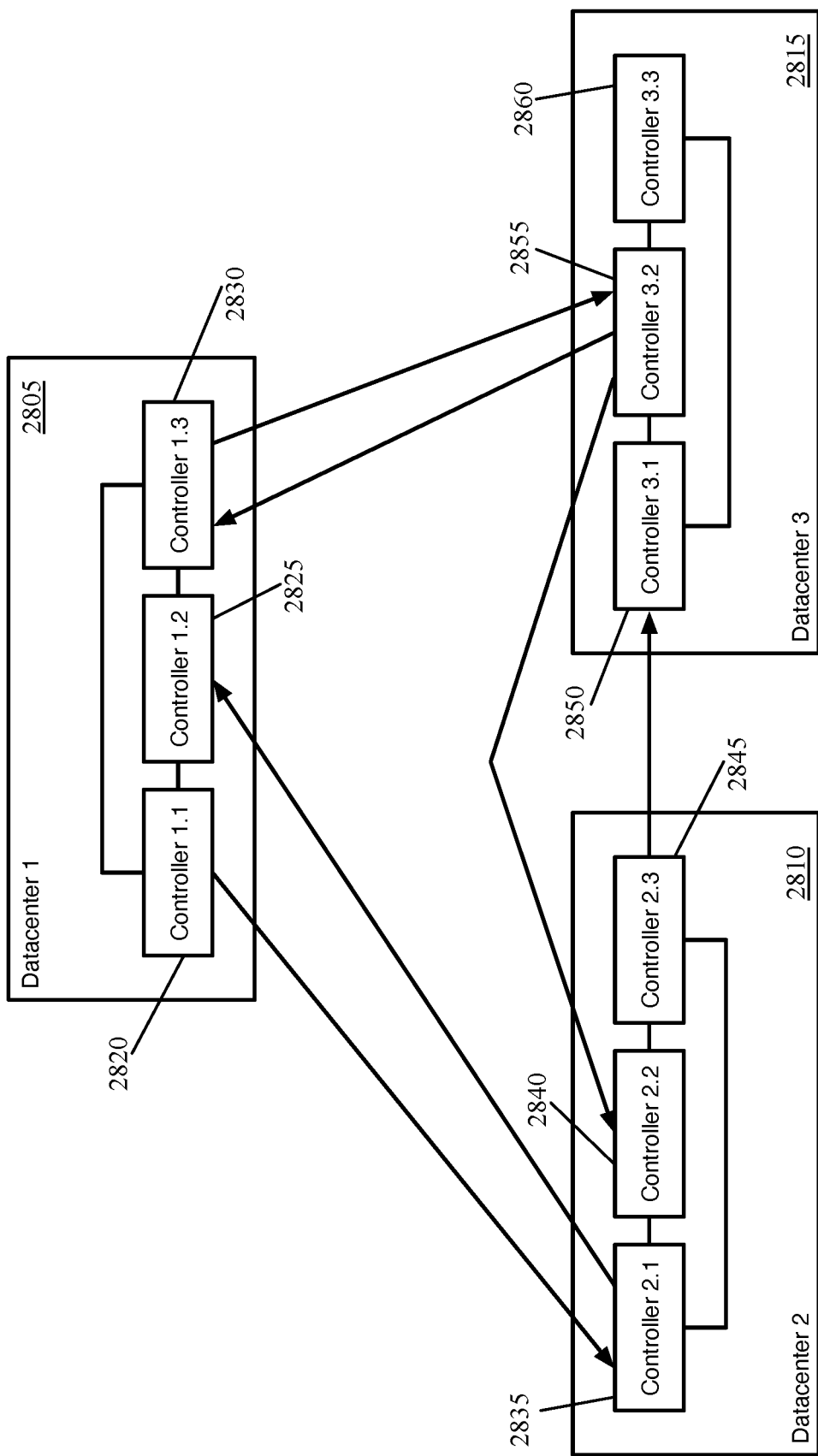
FIG. 28 conceptually illustrates an example showing the flow of logical network state data between designated sender and receiver masters at three sites.

FIG. 28 conceptually illustrates such an example showing the flow of logical network state data between designated sender and receiver masters at three sites 2805-2815. As shown, the controller cluster at each site includes three controllers. The first site 2805 includes controllers 2820-2830, the second site 2810 includes controllers 2835-2845, and the third site 2815 includes controllers 2850-2860.

In this example, the controllers at the first site have designated the first controller 2820 as the master for sending logical network state data to the second site 2810 and the third controller 2830 as the master for sending logical network state data to the third site 2815. In addition, the second controller 2825 is designated as the master for receiving logical network state data from the second site 2810 and the third controller 2830 is designated as the master for receiving logical network state data from the third site 2815. Thus, at the first site, different controllers are the sender and recipient masters with respect to the second site 2810, but the same controller 2830 is both the sender and recipient master with respect to the third site 2815.

The controllers at the second site have designated the first controller 2835 as the master for sending logical network state data to the first site 2805 and the third controller 2845 as the master for sending logical network state data to the third site 2815. In addition, the first controller 2835 is designated as the master for receiving logical network state data from the first site 2805 and the second controller 2840 is designated as the master for receiving logical network state data from the third site 2815. The same controller 2835 is the sender and recipient master with respect to the first site 2805, though these logical network data exchanges are with two different controllers at the first site.

The controllers at the third site have designated the second controller 2855 as the master for sending logical network state data to the first site 2805 and as the master for sending logical network state data to the second site 2810. In addition, this second controller 2855 is designated as the master for receiving logical network state data from the first site 2805, while the first controller 2850 is designated as the master for receiving logical network state data from the second site 2810. Thus, the logical network data exchange between the first site 2805 and the third site 2815 is bidirectional, in that the same controllers 2830 and 2855 are both sender and recipient masters at both sites.

In some embodiments, the logical network state data in some embodiments includes logical network address to physical network address (physical location) mapping data as well as security group information (e.g., network addresses of logical network endpoint DCNs belonging to security groups). The logical network to physical network mappings, in some embodiments, comprises mappings of logical network layer 2 (e.g., MAC) addresses to physical network tunnel endpoint layer 3 (e.g., IP) addresses at which those logical network addresses can be reached.

Figure 29:
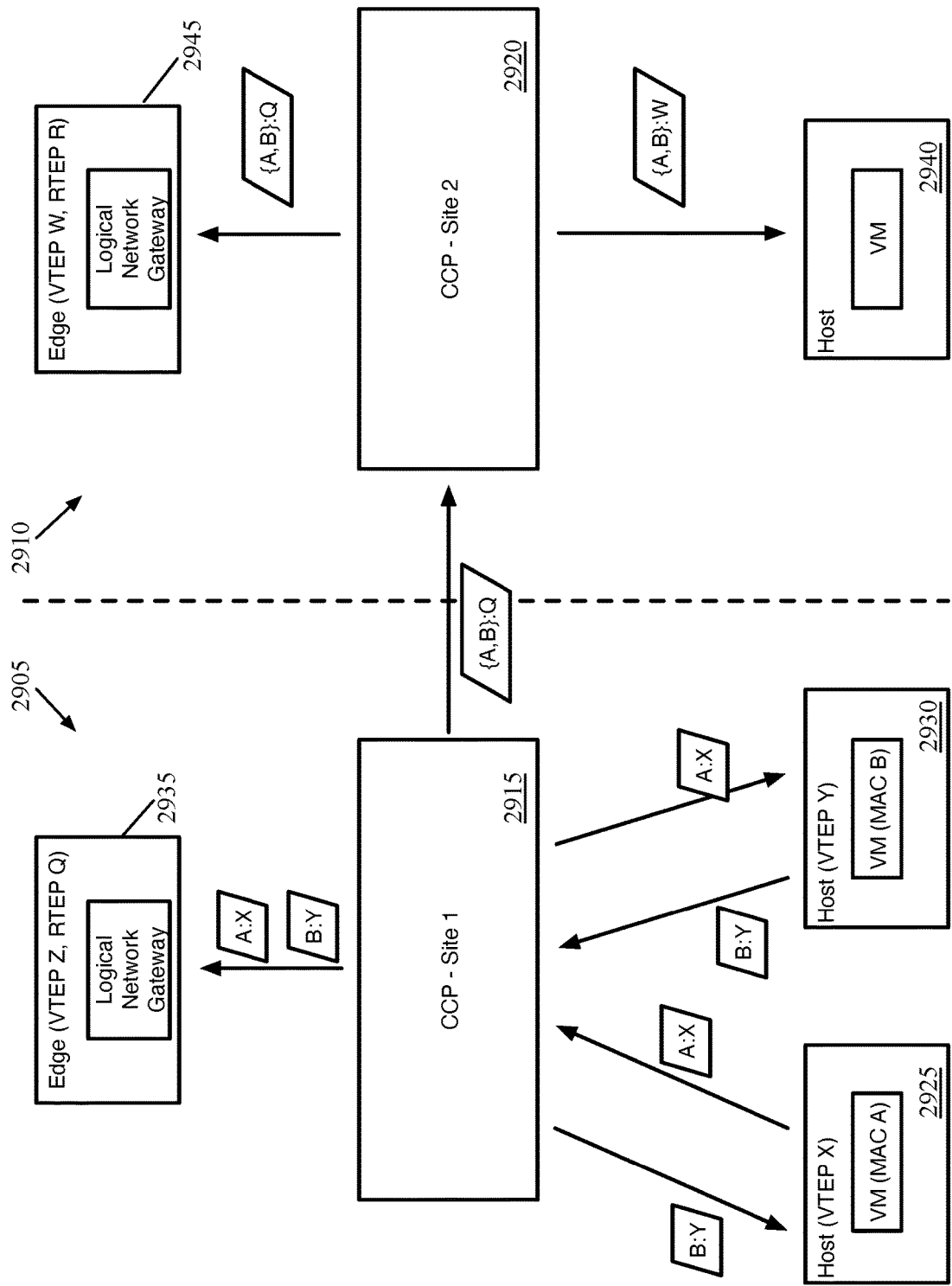
FIG. 29 conceptually illustrates the generation and transmission of logical network to physical network mapping data both within a site and between sites.

FIG. 29 conceptually illustrates the generation and transmission of this logical network to physical network mapping data both within a site and between sites. In this example, a logical switch is stretched between two sites 2905 and 2910, with central control plane (CCP) 2915 at the first site 2905 and CCP 2920 at the second site 2910. In this figure, the CCP at each site represents the entire controller cluster at the site, including the distributed database and local site records. That is, this figure does not show any of the (potential) internal data transactions between different nodes of the controller cluster, or the segregation of data between information received from the computing devices at the local site and information received from remote sites.

The first site 2905 also includes two host computers 2925 and 2930, each of which host VMs attached to the stretched logical switch (with logical MAC addresses A and B, respectively). The first host computer 2925 has a virtual tunnel endpoint (VTEP) interface with IP address X and the second host computer 2930 has a VTEP interface with IP address Y for encapsulated data messages within the first site 2905. In addition, the first site includes an edge device 2935 that implements a logical network gateway for the stretched logical switch. The logical network gateway is used for processing data messages transmitted between sites according to the stretched logical switch. The edge device 2935 has a VTEP interface with IP address Z for sending data messages to and receiving data messages from host computers within the site 2905 as well as a remote tunnel endpoint (RTEP) interface with IP address Q for sending data messages to and receiving data messages from edge devices implementing logical network gateways for the stretched logical switch at other sites. Logical network gateways and the use of VTEP and RTEP IP addresses for intra-site and inter-site data traffic is described in more detail in U.S. patent application Ser. No. 16/906,891, filed Jun. 19, 2020, entitled "Architecture for Stretching Logical Switches Between Multiple Datacenters", which is incorporated herein by reference.

The second site 2910 also includes a host computer 2940 that hosts a VM. This VM is not attached to the same stretched logical switch, but is attached to a different logical switch such that, e.g., the VM on the host computer 2940 can communicate with the VMs attached to the stretched logical switch via a T1 logical router. As such, the span of the stretched logical switch includes the host computer 2940 (i.e., the host computer receives logical network state data regarding the stretched logical switch). In addition, the second site includes an edge device 2945 that implements a logical network gateway for the stretched logical switch. This edge device 2945 has a VTEP interface with IP address W for sending data messages to and receiving data messages from host computers within the site 2910 as well as an RTEP interface with IP address R for sending data messages to and receiving data messages from edge devices implementing logical network gateways for the stretched logical switch at other sites (e.g., the edge device 2935).

In some embodiments, when a logical network endpoint DCN (e.g., the VMs on the host computers 2925 and 2930) is created on a host computer, that host computer reports the new DCN along with data about the DCN to one of the network controllers of the cluster. This data includes the MAC address of the DCN, which is mapped to a virtual tunnel endpoint (VTEP) of the host computer, as well as the logical switch with which the MAC address is associated. As shown, the host computer 2925 reports to the CCP 2915 the mapping of logical MAC address A to VTEP IP address X (i.e., that MAC address A on the stretched logical switch is located at VTEP IP address X) and the host computer 2930 reports to the CCP 2915 the mapping of logical MAC address B to VTEP IP address Y (i.e., that MAC address B on the stretched logical switch is located at VTEP IP address Y).

The controller cluster provides this logical MAC address to VTEP IP address mapping (in the context of the logical switch) to any other host computers in the same site that implement the logical switch, so that physical forwarding elements on these other host computers can transmit logical network data messages through the site's physical network to the logical network DCN. Thus, the CCP 2915 at the first site 2905 provides the mapping of MAC B to VTEP Y to the host computer 2925 and provides the mapping of MAC A to VTEP X to the host computer 2930 (both of these sets of data also including the logical switch context). Logical network data messages within a site are sent via a tunnel between the VTEP on the host computer for the source logical network endpoint DCN and the VTEP on the host computer for the destination logical network endpoint DCN, so this allows the MFEs at host computers 2925 and 2930 to transmit data messages between the two VMs to each other through the site's network. In addition, the CCP 2915 provides both of these mappings to the edge device 2935 so that the logical network gateway can transmit any data messages for either of the two VMs that it receives from other logical network gateways for the stretched logical switch at other datacenters to the correct host computer.

The controller cluster for a particular site also provides the list of logical MAC addresses associated with a logical switch to each other site spanned by the logical switch. To send a data message associated with a logical switch from a source host computer at one site to a destination host computer at another site (e.g., from host computer 2940 to host computer 2925), the source host computer (e.g., host computer 2940) tunnels the data message to a first edge device implementing a logical network gateway for the logical switch in the source site (e.g., edge device 2945), which tunnels the data message to a second edge device implementing a logical network gateway for the logical switch in the destination site (e.g., edge device 2935), which in turn tunnels the data message to the destination host computer in the second site (e.g., host computer 2925).

As such, the CCP 2915 in the first site 2905 does not provide the logical MAC address to VTEP mappings for the logical switch to the controllers in the first site, but instead provides a mapping of the list of logical MAC addresses associated with the logical switch and located at the second site to RTEP IP addresses for reaching the logical network gateways at the second site. In this case, that data maps logical MAC addresses A and B to the RTEP Q. It should be noted that in some embodiments, rather than a single RTEP IP address, this is provided as an RTEP group record with multiple RTEP IP addresses, as there are at least two edge devices implementing logical network gateways at the site for the stretched logical switch (e.g., in active-standby configuration).

The controllers at the first site provide this logical network state data to the edge devices implementing the logical network gateways for the logical switch at the first site. That is, the CCP 2920 provides the edge device 2945 with the mapping information for sending data messages with destination MAC addresses A or B (and in the context of the stretched logical switch) to the correct edge device 2935 (e.g., via an inter-site network).

In addition, to the host computers implementing the logical switch at the first site, the controllers provide the list of MAC addresses located at any of the sites (other than the first site), along with VTEP IP addresses at which edge devices implementing the logical network gateways for the logical switch at the first site can be reached. In this example, the host computer 2940 receives data mapping MAC addresses A and B to VTEP W for edge device 2945 (if the logical switch was stretched to a third site, any MAC addresses attached to the logical switch at that third site would be included in the same record). As with the RTEP groups, in some embodiments these records are actually for VTEP groups that include the different VTEP IP addresses of all logical network gateways for the stretched logical switch in the site 2910.

While this figure illustrates only data being sent from the first site 2905 to the second site 2910, if any logical network endpoint DCNs attached to the stretched logical switch were hosted at the second site 2910, then the logical network state data for these DCNs would be sent in the opposite direction. In addition, in the context of the logical switch to which the VM on host computer 2940 was attached, the CCP 2920 provides this information to the CCP 2915 so that host computers and edge devices in the site 2905 can transmit data messages to the second site 2910 for this VM.

In addition to the logical network to physical network mapping data, the network controllers of some embodiments generate and share between sites lists of logical network endpoint DCNs that belong to dynamic security groups. Specifically, in some embodiments the controllers receive definitions of dynamic security groups and use information received from the host computers at their site to determine the network addresses (e.g., MAC and IP addresses) for each dynamic security group that spans to the site.

Figure 30A:
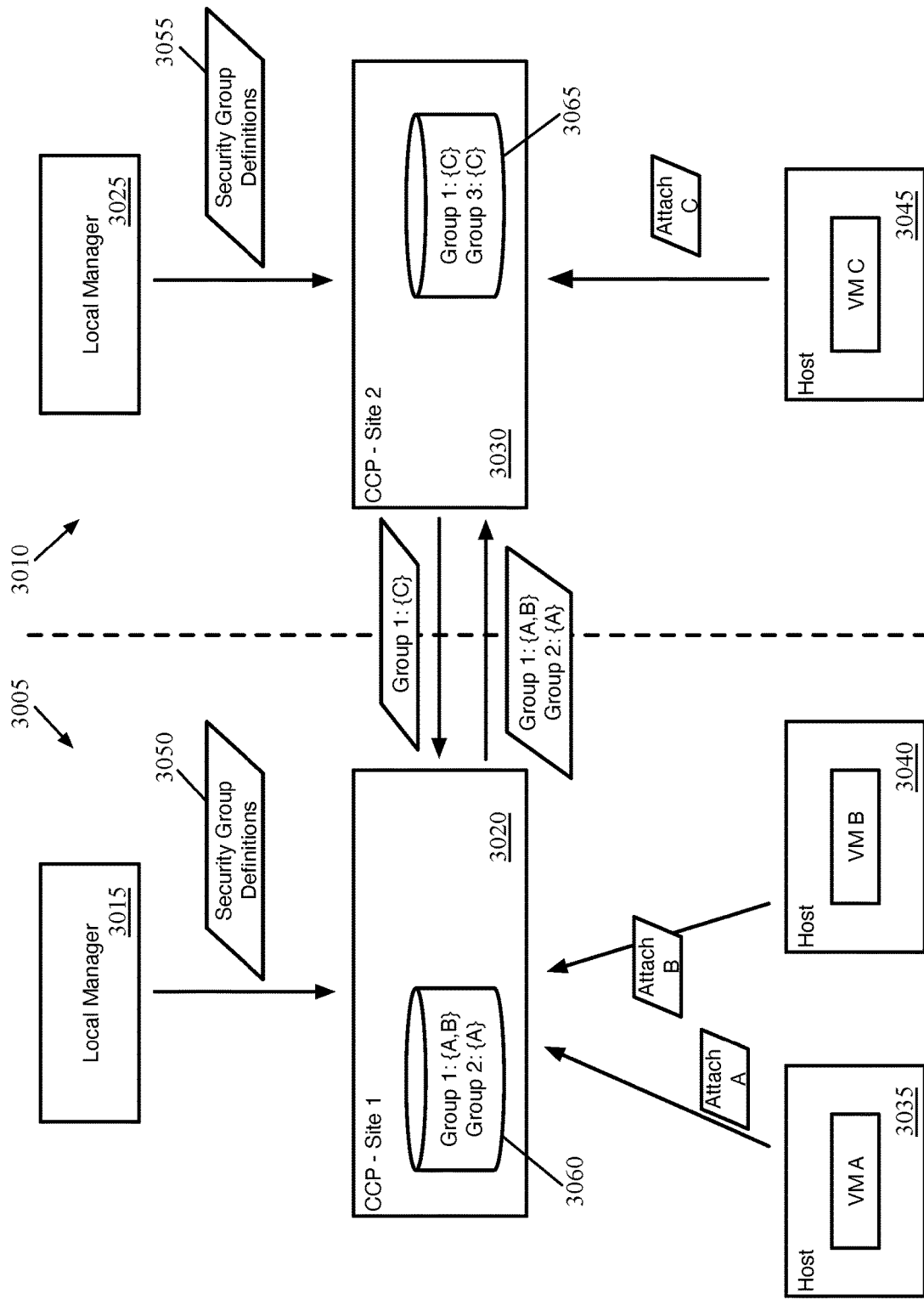
FIGS. 30A-B conceptually illustrate the generation and transmission of lists of logical network addresses for dynamic security groups both within a site and between sites.
Figure 30B:
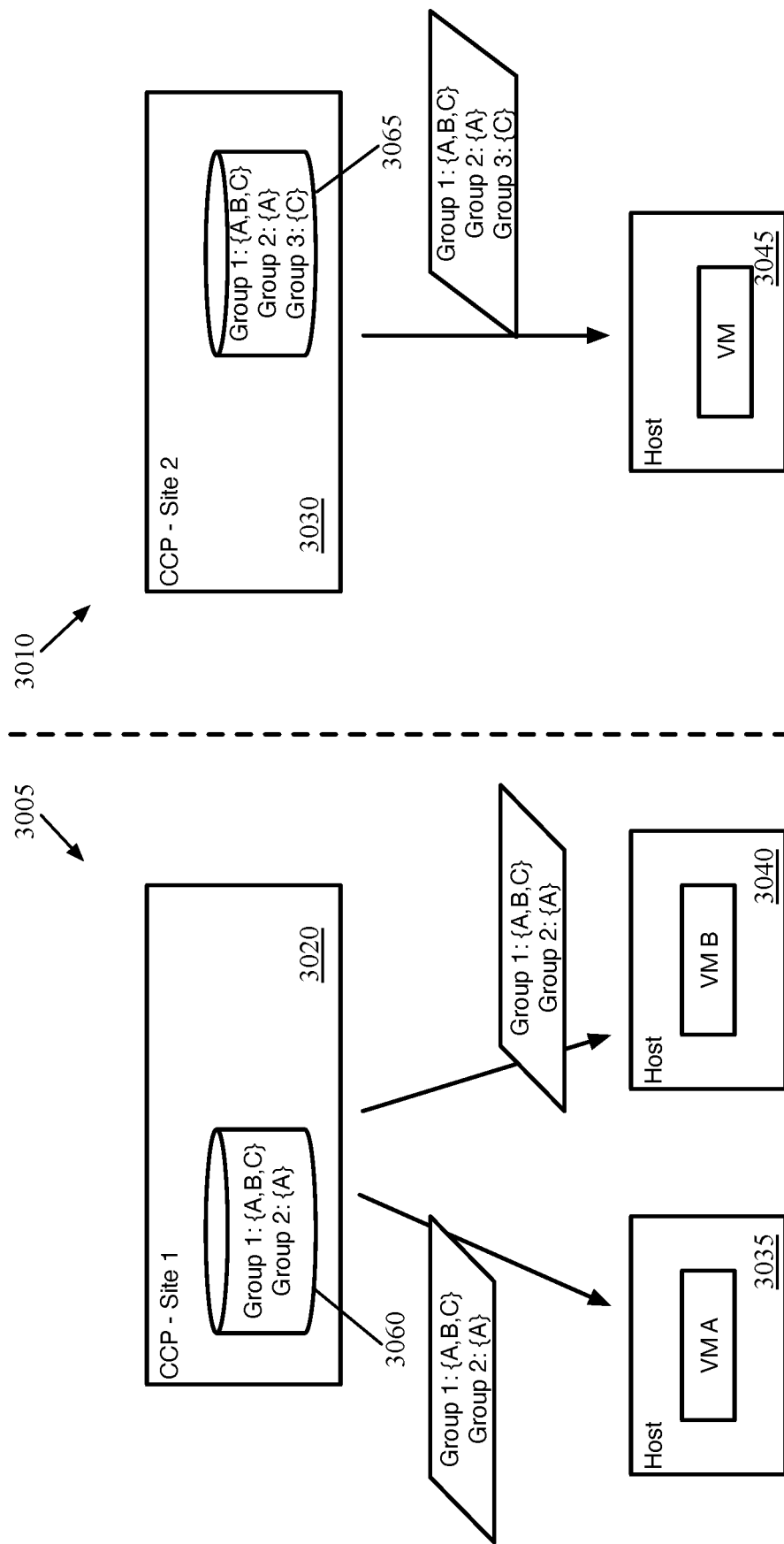

FIGS. 30A-B conceptually illustrate the generation and transmission of these lists of logical network addresses for dynamic security groups both within a site and between sites. In this example, two sites 3005 and 3010 are illustrated. The first site 3005 includes a local manager 3015 and a CCP cluster 3020 (as in the previous figure, the internal data transfer among the nodes of the cluster is not shown). The second site 3010 includes a local manager 3025 and a CCP cluster 3030. In addition, the first site 3005 includes two relevant host computers 3035 (hosting VM A) and 3040 (hosting VM B), while the second site 3010 includes one relevant host computer 3045 (hosting VM C).

From the local managers 3015 and 3025, the CCPs 3020 and 3030 respectively receive definitions 3050 and 3055 of dynamic security groups. In some embodiments, these dynamic security group definitions include security groups defined at the global manager for the global logical network as well as any security groups defined at the respective local manager. In some embodiments, security groups may be defined statically (e.g., as a pre-specified list of MAC and/or IP addresses) or dynamically (e.g., as a set of criteria). The controllers are responsible for determining which local logical network endpoint DCNs belong to each dynamic security group. The criteria for belonging to a dynamic security group may vary in different embodiments. For instance, these criteria can include attachment to a specific logical switch, an IP address in a particular subnet, the operating system running on a particular VM, the site at which a DCN is located, the type of application operating on a DCN, etc. In this example, the security groups include two groups (Group 1 and Group 2) that span both sites 3005 and 3010, as well as a third group (Group 3) that only spans the second site 3010.

As mentioned with respect to FIG. 29, in some embodiments when a logical network endpoint DCN (e.g., any of VMs A-C) is created on a host computer, that host computer reports the new DCN along with data about the DCN to one of the network controllers of the cluster. This data includes not only the MAC and IP addresses of the VM, but information about the logical switch to which the DCN attaches as well as various other runtime state data for the DCN in some embodiments. As shown, host computer 3035 reports the attachment of VM A and host computer 3040 reports the attachment of VM B to the CCP 3020, while host computer 3045 reports the attachment of VM C to the CCP 3030.

When a logical network endpoint DCN matches the set of criteria for a particular security group, the controller adds the logical network addresses (e.g., MAC and IP addresses) for the DCN to the security group. In some embodiments, the controllers use information received from a host computer when the DCN is created on the host computer to (i) identify to which groups the DCN belongs and (ii) identify the MAC and IP addresses to add to the lists for the identified groups. The CCP 3020 identifies that both VM A and VM B matches the criteria for Group 1, while only VM A matches the criteria for Group 2. At the second site 3010, the CCP 3030 determines that VM C belongs to Group 1 and Group 3 (but not to Group 2). These CCPs store this information in their respective storages 3060 and 3065. In some embodiments, these storages 3060 and 3065 represent the amalgamation of the stored security group information at each of the controller clusters. As described above, in some embodiments the data storing lists of network addresses for each security group is stored separately for each site (i.e., different storages for each remote site as well as for the local site).

For each group spanning multiple sites, the controller clusters at those sites share the list of logical network addresses belonging to the group with each other. The controllers then provide the full list of addresses for each group to the host computers and/or edge devices that enforce policy rules using the security groups. As shown in FIG. 30A, the CCP 3020 at the first site 3005 provides data to the CCP 3030 at the second site 3010 indicating the network addresses located in the first site 3005 for both of Group 1 and Group 2. Correspondingly, the CCP 3030 at the second site 3010 provides data to the CCP 3020 at the first site 3005 indicating the network addresses located in the second site for Group 1. No data is exchanged for Group 2 because the VM in the second site 3010 does not belong to this security group, and no data is exchanged for Group 3 because this security group does not span to the first site 3005.

FIG. 30B illustrates that the CCPs 3020 and 3030 have updated their respective storages 3060 and 3065 to include the logical network state data received from the other site (e.g., by adding this information to their respective distributed databases for storing data from the respective remote site). In addition, this information is provided to each of the host computers at their respective sites. The host computers 3035 and 3040 at the first site 3005 receive information about the complete group membership for Groups 1 and 2, while the host computer 3045 at the second site 3010 receives information about the complete group membership for Groups 1, 2, and 3.

In the previous examples, the controller clusters send all of the state from their respective sites at once. While this is plausible for the simple examples shown in these figures, realistic examples may have hundreds or thousands of network addresses associated with a single security group or logical switch in one site, with many different security groups and/or logical switches for which network state data needs to be synchronized between sites. In such a situation, updates will occur frequently, and it would be very bandwidth-intensive to transfer the entire logical network state with each update.

Instead, when providing updates to the logical network state data, some embodiments send each change to the current state as an atomic update specifying the change, thereby minimizing the amount of data that needs to be transferred between sites. The controllers at a particular site maintain a snapshot of the current logical network state (e.g., in the distributed database at the site), and whenever this state changes (e.g., due to creation or deletion of a DCN from a host computer in the site), each controller that handles sending that state to another site identifies the change and sends the change as an update to the other site. Because these changes can be derived by any of the controllers in the cluster at the sending site, this site does not persist the queue of updates in some embodiments. In some embodiments, the synchronization protocol is lossless, so once an update is sent from a first site to a second site it can be assumed that the second site will process that update (and will do so in the order that the updates are received). In addition, the controllers at the second site persist these updates in a distributed database.

Figure 31A:
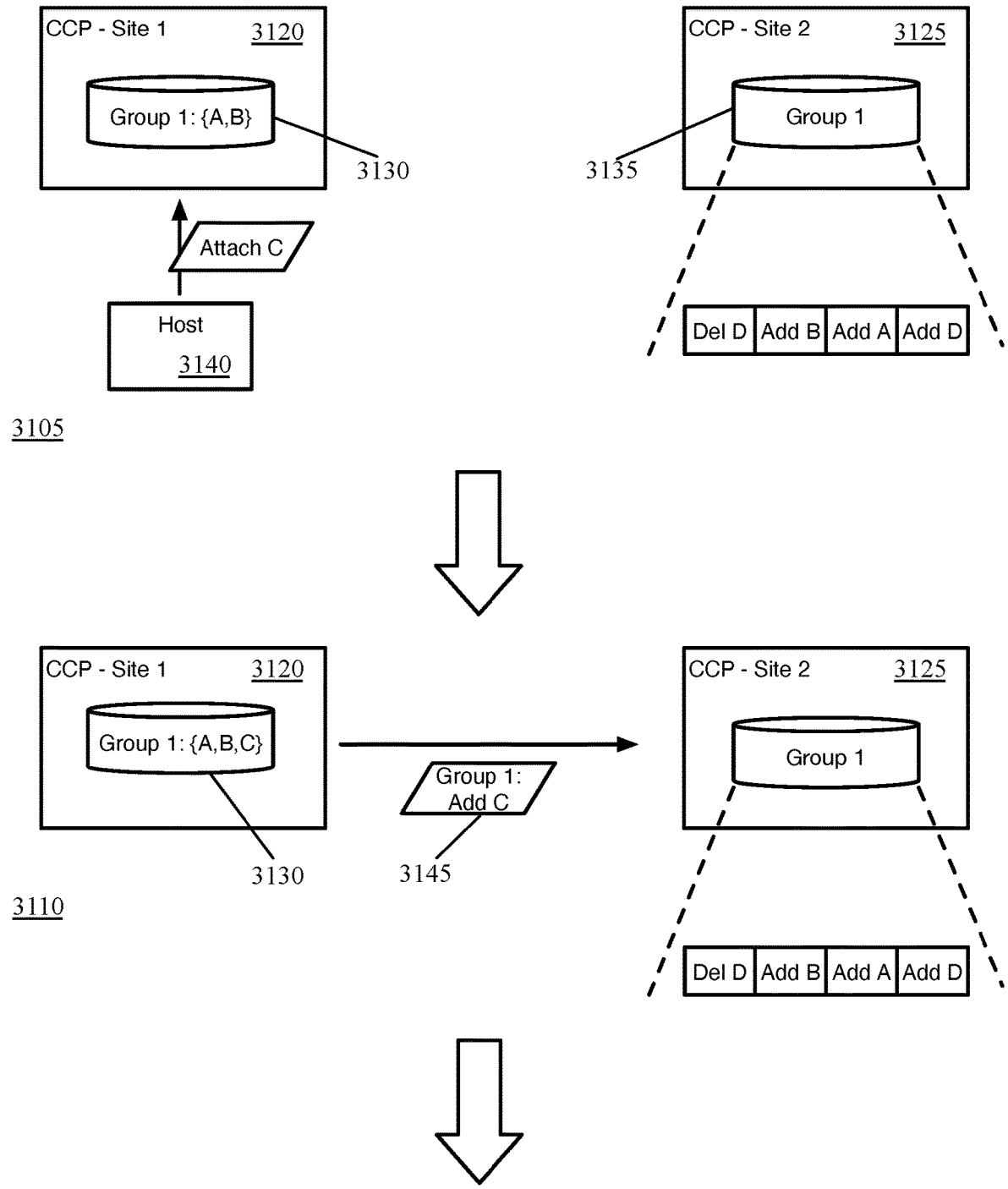
FIGS. 31A-B conceptually illustrates an update to a dynamic security group at a first site and the persisting of updates at a second site.
Figure 31B:
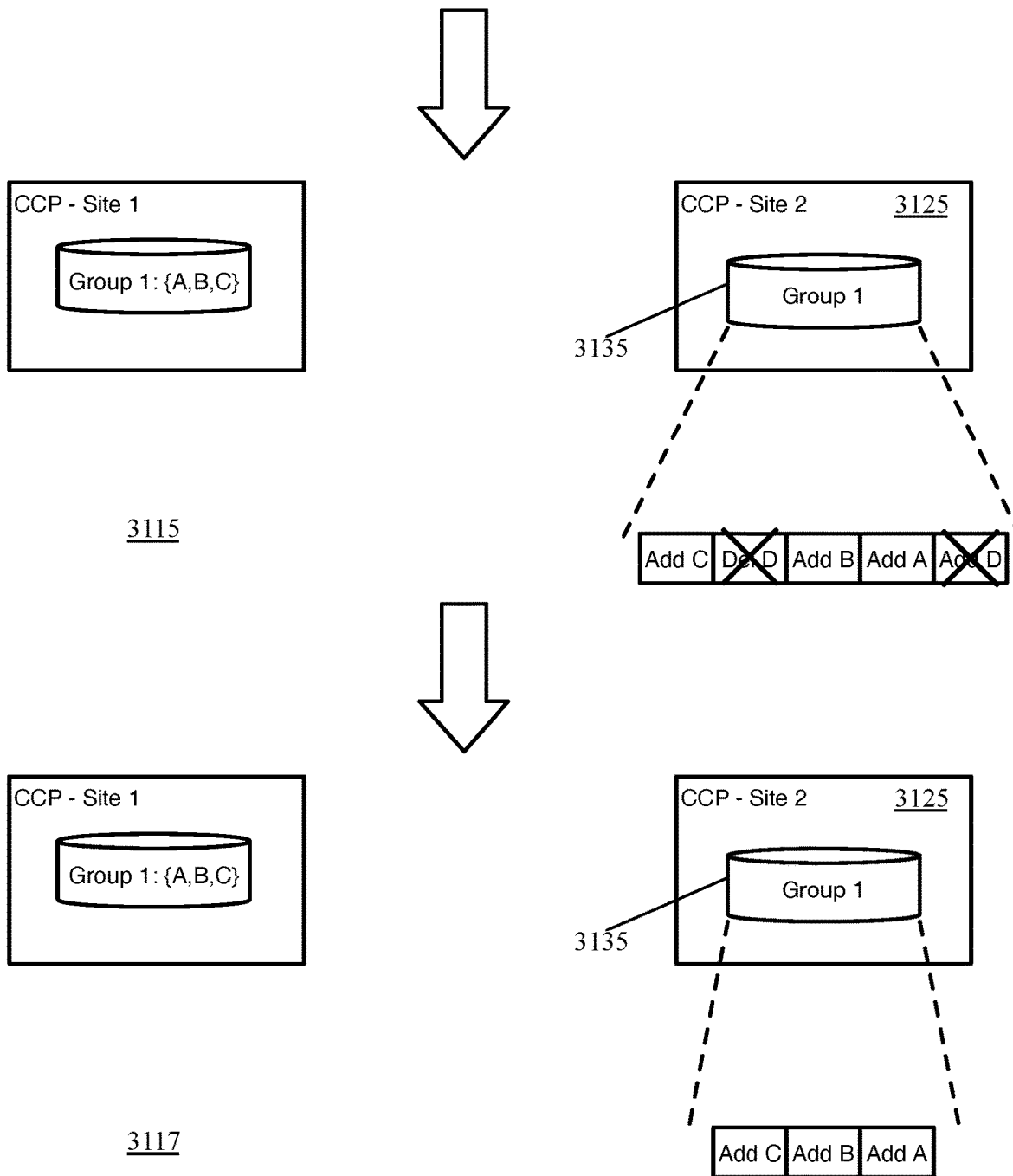

FIGS. 31A-B conceptually illustrate such an update to a dynamic security group at a first site and the persisting of updates at a second site over four stages 3105-3117. The first stage 3105 illustrates the CCPs 3120 and 3125 at two different sites, and their respective storages 3130 and 3135 for the logical network state data indicating the membership of a security group (Group 1) at the first site. In some embodiments, each controller cluster separately stores the logical network state data for its own site and for each site from which the state data is received. For instance, some embodiments store the list of security group members (e.g., IP and MAC addresses) in their own site persisted in a database (or persist the data received from local computing devices, from which the list of security group members can be generated), and also persist a queue of updates for each other site. The queue of updates, in different embodiments, may be separate queues for updates from each other site, or a single queue for all of the sites with tags that indicate from which site each update was received. Thus, the database 3130 stores a list of current members of Group 1 (A and B) at the first site, while the database 3135 stores a set of updates to Group 1. These updates specify to Add D to the security group, Add A to the security group, Add B to the security group, and finally to delete D from the security group.

In the first stage 3105, a host computer 3140 reports to the CCP 3120 the creation of a new logical network endpoint DCN C on the host computer 3140. As a result, the CCP 3120 determines to which dynamic security groups the DCN C belongs, which in this case includes Group 1. As shown in the second stage 3110, the CCP 3120 adds the network addresses for DCN C to Group 1 in its database 3130. Though not shown, the CCP 3120 would provide this information to the host computer 3140. In addition, as shown in the second stage 3110, the CCP 3120 at the first site sends an update 3145 to the CCP 3125 at the second site, specifying to add the network addresses for DCN C to Group 1.

In response to receiving the update 3145, in the third stage 3115 the CCP 3125 adds the update adding the network addresses for DCN C to Group 1 in its persisted queue of updates for Group 1 in the database 3135. This data, stored as a series of updates, now is equivalent to the data stored in the database 3130. Though not shown, the CCP 3125 would subsequently provide this update to any host computers at the second site that require the membership of Group 1 for enforcing policies.

The third stage 3115 also illustrates that, after a period of time, the CCP 3125 removes the updates to Add D and delete D from the update queue 3135. In some embodiments, the CCP removes logical network state data updates that are no longer relevant (i.e., when an update specifies to delete an entity from a list, all previous updates regarding that entity can be removed. Different embodiments may perform these operations periodically, upon receiving the delete update, etc. The fourth stage 3117 illustrates that the update queue 3135 now only includes the updates for DCNs A, B, and C. It should be noted that while this example shows an update to security group membership, some embodiments treat updates to other logical network state data (e.g., logical network to physical network mapping records) in the same manner.

If the connection from a first (sending) site to a second (receiving site) goes down, some of the updates generated at the first site may not be sent to the second site. The CCP at the first site may not know which updates need to be sent to the second site (e.g., because these updates are not persisted at the first site, and there is no acknowledgment process for each individual update). However, sending the entire logical network state to be synchronized with the second site is an inefficient use of bandwidth, as mentioned above. Instead, some embodiments compare (i) a snapshot of the persisted data at the second site and (ii) a snapshot of the state at the first site to identify the differences. The first site can thus only send these differences to the second site.

Figure 32:
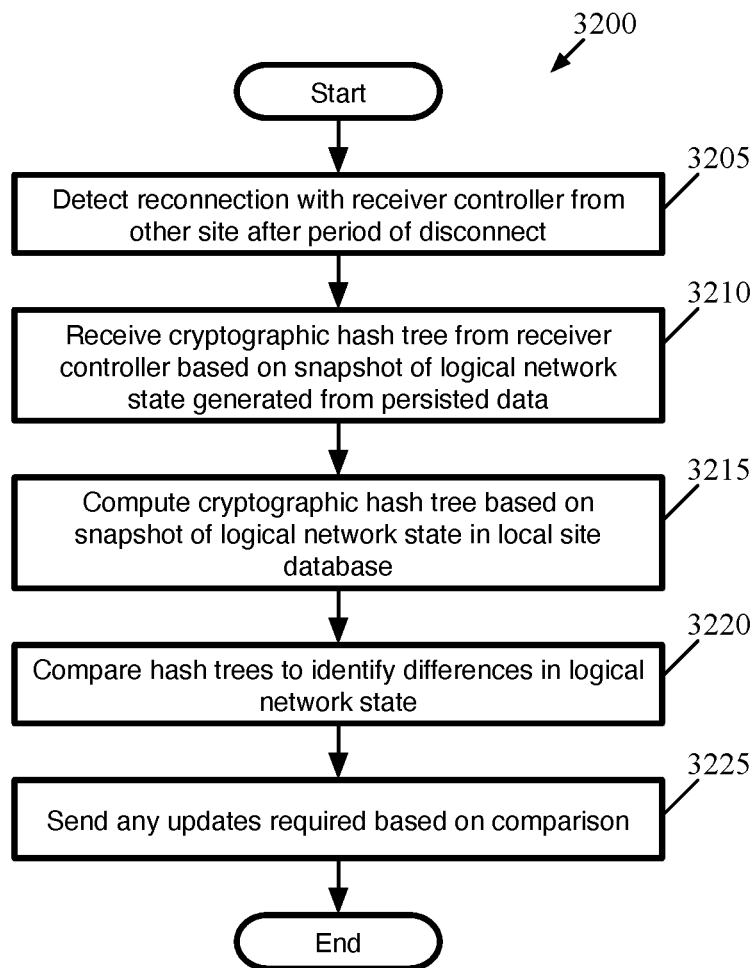
FIG. 32 conceptually illustrates a process of some embodiments for identifying logical network state data updates required to be sent to a controller at a remote site after reconnection with the remote site.

FIG. 32 conceptually illustrates a process 3200 of some embodiments for identifying logical network state data updates required to be sent to a controller at a remote site after reconnection with the remote site. In some embodiments, the process 3200 is performed by a network controller cluster at a first site (e.g., the network controller responsible for sending logical network state data to a second, remote site).

As shown, the process 3200 begins by detecting (at 3205) reconnection with a receiver controller from another site after a period of disconnect. In some embodiments, the controllers use a heartbeat protocol or other mechanism to detect when the connection with controllers at other sites is down or has come back up. This connection could be down due to a physical connection issue between the sites, an issue with the controller nodes at the remote site, or other reasons.

After reconnection, the process 3200 receives (at 3210) a cryptographic hash tree from the receiver controller based on a snapshot of the logical network state generated from the persisted data at the other site. In some embodiments, as discussed above, this persisted data is a queue of updates, which can be used to generate the logical network state (e.g., a list of MAC addresses at the sender site associated with a particular logical switch and the RTEP IP addresses for the sender site, a list of network addresses belonging to a particular security group at the sender site). In some embodiments, the recipient controller uses this logical network state to generate a cryptographic hash tree (e.g., a Merkle tree) and sends this hash tree to the sending controller. In some embodiments, the hash tree leaf nodes are hashes of data blocks (e.g., logical network state data), and subsequent parent nodes are hashes of their children.

The process 3200 also computes (at 3215) a cryptographic hash tree based on a snapshot of the logical network state stored in the local site database (i.e., for the logical network state data that should be represented at the second site). This data is already stored in the distributed database for the controller cluster, and the same algorithm is used to compute the hash tree as was performed at the receiver.

Next, the process 3200 compares (at 3220) the two hash trees to identify the differences in the logical network state. In some embodiments, if the root node is the same, this is (effectively) a guaranteed that the entire state is the same, and no updates are required. If there are differences in the root node, the process can continue towards the leaf nodes to identify the differences. If any node is the same between the two hash trees, then any child nodes will be the same. Using this process, the initial data blocks that are different can be identified, and thus the differences in logical network state between the two sites are identified. Based on this comparison, the process 3200 sends (at 3225) any required updates to the remote site.

Another consequence of a connection problem can be a conflict between logical network state data from two different sites. Specifically, when a logical network endpoint DCN moves from a first site to a second site, conflicts may arise at a third site based on data received from the first two sites. When a DCN is migrated from the first site to the second site, or crashes in the first site and is brought back up in the second site, in an ideal scenario (i) the controller at the first site is notified of the deletion of the DCN, updates its logical network state data accordingly, and shares this data with the third site (and the second site), and (ii) the controller at the second site is notified of the DCN creation, updates its logical network state data accordingly, and shares this data with the third site (and the first site). However, if there is a connection problem at the second site (e.g., between the host computer and the controller cluster or between the first and second sites), then the first site will not receive information about the deletion, and will thus end up with conflicting information (e.g., IP addresses in a security group) once the information from the third site is received.

Figure 33:
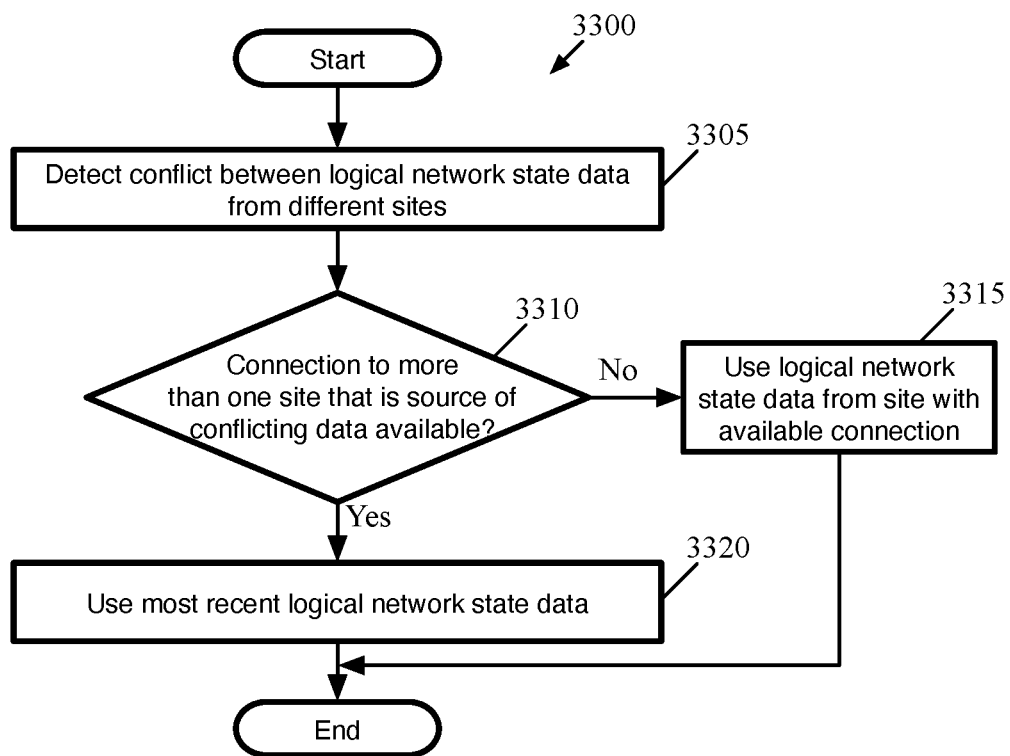
FIG. 33 conceptually illustrates a process of some embodiments for resolving conflicting logical network state data.

FIG. 33 conceptually illustrates a process 3300 of some embodiments for resolving such conflicting logical network state data. The process 3300 is performed by a controller at one site upon detecting conflicting logical network state data between data received from two other sites.

As shown, the process 3300 begins by detecting (at 3305) a conflict between logical network state data from two different sites. An example of such a conflict could be if a controller from a first site sends an update that a particular IP address should be added to a security group and is located at the first site, when that particular IP address has already been added to the security group based on logical network state data from a second state (and has not been deleted from the security group). In some cases, the MAC address for a DCN will change when the DCN is moved between sites, but the IP address will stay the same. If the MAC address is also the same, then a conflict in the logical network to physical network mapping records may also occur.

Upon detecting the conflict, the process 3300 determines (at 3310) whether the connection to controllers at more than one site that is the source of conflicting data is available. While the examples above describe conflicts between information from two sites, it is possible in rare situations to have conflicts between more than two sites.

If the connection to the controllers at only one site is available, then the process 3300 uses (at 3315) the logical network state data from the site with the available connection on the presumption that this logical network state data is up to date and the controllers at the other site(s) would provide an update resolving the conflict if the connection was available. On the other hand, if the connection is available with multiple sites, then the process 3300 uses (at 3320) the most recent logical network state data based on timestamps appended to the updates. It may also be the case that a DCN was removed from a host in one of the sites but, due to a loss of connection between the host and the controllers at that site, the controller cluster was not made aware of the removal and thus could not generate or send an update. In this case, the creation of the new DCN at a different site will be more recent and thus should be used.

Figure 34:
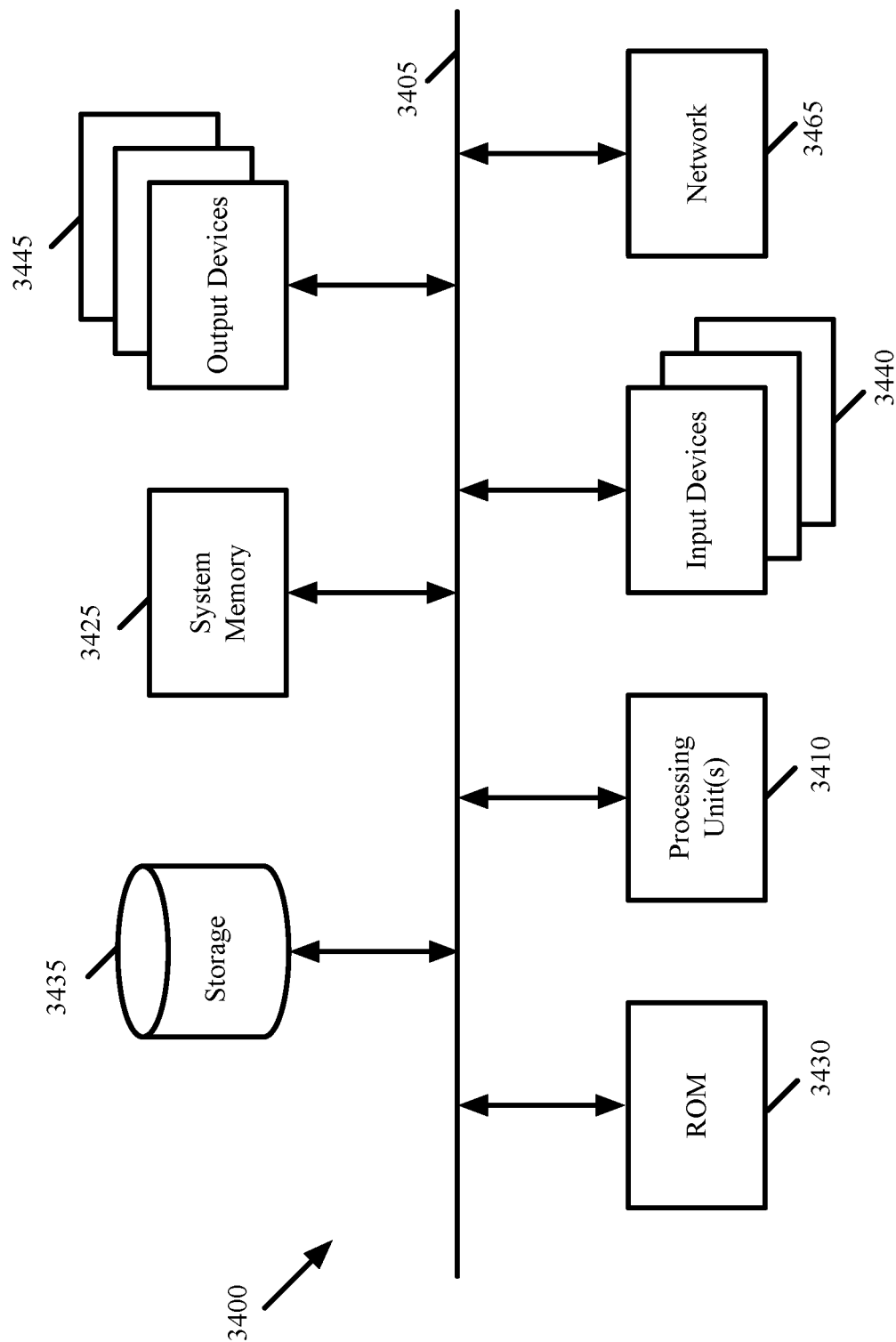
FIG. 34 conceptually illustrates an electronic system with which some embodiments of the invention are implemented.

FIG. 34 conceptually illustrates an electronic system 3400 with which some embodiments of the invention are implemented. The electronic system 3400 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 3400 includes a bus 3405, processing unit(s) 3410, a system memory 3425, a read-only memory 3430, a permanent storage device 3435, input devices 3440, and output devices 3445.

The bus 3405 collectively represents all system, peripheral, and chipset buses that communicatively connect the numerous internal devices of the electronic system 3400. For instance, the bus 3405 communicatively connects the processing unit(s) 3410 with the read-only memory 3430, the system memory 3425, and the permanent storage device 3435.

From these various memory units, the processing unit(s) 3410 retrieve instructions to execute and data to process in order to execute the processes of the invention. The processing unit(s) may be a single processor or a multi-core processor in different embodiments.

The read-only-memory (ROM) 3430 stores static data and instructions that are needed by the processing unit(s) 3410 and other modules of the electronic system. The permanent storage device 3435, on the other hand, is a read-and-write memory device. This device is a non-volatile memory unit that stores instructions and data even when the electronic system 3400 is off. Some embodiments of the invention use a mass-storage device (such as a magnetic or optical disk and its corresponding disk drive) as the permanent storage device 3435.

Other embodiments use a removable storage device (such as a floppy disk, flash drive, etc.) as the permanent storage device. Like the permanent storage device 3435, the system memory 3425 is a read-and-write memory device. However, unlike storage device 3435, the system memory is a volatile read-and-write memory, such a random-access memory. The system memory stores some of the instructions and data that the processor needs at runtime. In some embodiments, the invention's processes are stored in the system memory 3425, the permanent storage device 3435, and/or the read-only memory 3430. From these various memory units, the processing unit(s) 3410 retrieve instructions to execute and data to process in order to execute the processes of some embodiments.

The bus 3405 also connects to the input and output devices 3440 and 3445. The input devices enable the user to communicate information and select commands to the electronic system. The input devices 3440 include alphanumeric keyboards and pointing devices (also called "cursor control devices"). The output devices 3445 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 34, bus 3405 also couples electronic system 3400 to a network 3465 through a network adapter (not shown). In this manner, the computer can be a part of a network of computers (such as a local area network ("LAN"), a wide area network ("WAN"), or an Intranet, or a network of networks, such as the Internet. Any or all components of electronic system 3400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 13, 14, 17, 27, 32, and 33) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. For a first network controller executing at a first site of a plurality of sites spanned by a logical network, wherein network controllers execute at each site of the plurality of sites, a method comprising:

generating logical network state data for the first site based on (i) data received from computing devices that implement the logical network at the first site and (ii) logical network configuration data from a network manager at the first site, wherein the data received from the computing devices comprises information about logical network endpoint data compute nodes (DCNs) located at the computing devices and the logical network configuration data comprises a definition of a dynamic group of logical network endpoint DCNs, wherein the generating comprises determining the logical network endpoint DCNs located at the first site that belong to the dynamic group;

providing the logical network state data for the first site to a second network controller executing at a second site of the plurality of sites; and providing logical network state data received from the second site to the computing devices that implement the logical network at the first site.

2. The method of claim 1, wherein a cluster of network controllers executes at each site of the plurality of sites.

3. The method of claim 2, wherein each network controller at the first site has connectivity to each of the network controllers at each of the other sites of the plurality of sites.

4. The method of claim 3, wherein for each other site of the plurality of sites, (i) one of the network controllers at the first site is designated for providing the logical network state data to the other site and (ii) one of the network controllers at the first site is designated for receiving logical network state data from the other site.

5. The method of claim 4, wherein (i) the first network controller is designated for providing the logical network state data to the second site based on a determination made by the network controllers at the first site and (ii) the second network controller is designated for receiving the logical network state data from the first site based on a determination made by the network controllers at the second site.

6. The method of claim 5 further comprising, prior to providing the logical network state data to the second network controller:

detecting the addition of the second site to the plurality of sites spanned by the logical network;

determining that the first network controller is designated for providing the logical network state data to the second site;

selecting a third network controller executing at the second site; and sending a message to the third network controller that the first network controller is designated for providing the logical network state data to the second site.

7. The method of claim 6 further comprising:

receiving a message from the third network controller indicating that the second network controller is designated for receiving the logical network state data from the first site;

sending a message to the second network controller that the first network controller is designated for providing the logical network state data to the second site; and receiving a message from the second network controller indicating for the first network controller to begin providing the logical network state data for the first site.

8. The method of claim 6, wherein the third network controller is the same network controller as the second network controller, the method further comprising receiving a message from the second network controller indicating for the first network controller to begin providing the logical network state data for the first site.

9. The method of claim 4, wherein at each other site, (i) one of the network controllers at the other site is designated for providing the logical network state data to the first site and (ii) one of the network controllers at the other site is designated for receiving logical network state data from the first site.

10. The method of claim 1, wherein the logical network state data comprises network addresses of the logical network endpoint DCNs located at the first site that belong to the dynamic group.

11. The method of claim 10, wherein providing logical network state data received from the second site to the computing devices at the first site comprises providing network addresses of logical network endpoint DCNs located at the second site that belong to the dynamic group, the method further comprising providing the network addresses of the logical network endpoint DCNs located at the first site that belong to the dynamic group to the computing devices at the first site.

12. The method of claim 11, wherein the computing devices at the first site use the network addresses of the logical network endpoint DCNs at the first and second sites that belong to the dynamic group to apply logical network policy rules to data messages sent to and from the logical network endpoint DCNs located at the computing devices.

13. A non-transitory machine-readable medium storing a first network controller for execution by at least one processing unit of a computing device at a first site of a plurality of sites spanned by a logical network, wherein network controllers execute at each site of the plurality of sites, the network controller comprising sets of instructions for:

generating logical network state data for the first site based on (i) data received from computing devices that implement the logical network at the first site and (ii) logical network configuration data from a network manager at the first site, wherein the data received from the computing devices comprises information about logical network endpoint data compute nodes (DCNs) located at the computing devices and the logical network configuration data comprises a definition of a dynamic group of logical network endpoint DCNs, wherein the generating comprises determining the logical network endpoint DCNs located at the first site that belong to the dynamic group;

providing the logical network state data for the first site to a second network controller executing at a second site of the plurality of sites; and providing logical network state data received from the second site to the computing devices that implement the logical network at the first site.

14. The non-transitory machine-readable medium of claim 13, wherein:

a cluster of network controllers executes at each site of the plurality of sites;

each network controller at the first site has connectivity to each of the network controllers at each of the other sites of the plurality of sites; and for each other site of the plurality of sites, (i) one of the network controllers at the first site is designated for providing the logical network state data to the other site and (ii) one of the network controllers at the first site is designated for receiving logical network state data from the other site.

15. The non-transitory machine-readable medium of claim 14, wherein (i) the first network controller is designated for providing the logical network state data to the second site based on a determination made by the network controllers at the first site and (ii) the second network controller is designated for receiving the logical network state data from the first site based on a determination made by the network controllers at the second site.

16. The non-transitory machine-readable medium of claim 13, wherein the network controller further comprises sets of instructions for:
receiving a first set of logical network state data from the second site and a second set of logical network state data from a third site of the plurality of sites;
determining that the first and second sets of logical network state data conflict; and
using timestamps to determine a less recent one of the first and second sets of logical network state data and to discard the less recent set of logical network state data.

17. The non-transitory machine-readable medium of claim 13, wherein the network controller further comprises sets of instructions for:
identifying a modification to a particular set of logical network state data provided to the second network controller; and
providing the modification to the particular set of logical network state data to the second network controller as an update specifying how to modify the particular set of logical network state data.

18. For a first network controller executing at a first site of a plurality of sites spanned by a logical network, wherein network controllers execute at each site of the plurality of sites, a method comprising:
generating logical network state data for the first site based on (i) data received from computing devices that implement the logical network at the first site and (ii) logical network configuration data from a network manager at the first site, wherein the data received from the computing devices at the first site comprises mappings of logical network addresses to physical network addresses associated with the computing devices, wherein generating logical network state data for the first site comprises generating a list of logical network addresses associated with a particular logical switch and located at the first site, wherein the list of logical network addresses does not include the physical addresses of the computing devices at the first network;
providing the logical network state data for the first site to a second network controller executing at a second site of the plurality of sites, said providing the logical network state data for the first site to the second network controller comprising providing the list of logical network addresses to the second network controller, wherein the second network controller maps the list of logical network addresses to a set of physical network addresses used by the computing devices at the second site to transmit data messages associated with the logical switch to destinations located at the first site; and
providing logical network state data received from the second site to the computing devices that implement the logical network at the first site.

19. The method of claim 18 further comprising providing the mapping of a particular logical network address to a particular physical network address received from a first computing device at the first site to a second computing device at the first site.

20. The method of claim 18 further comprising:
receiving a first set of logical network state data from the second site and a second set of logical network state data from a third site of the plurality of sites;
determining that the first and second sets of logical network state data conflict; and
using timestamps to determine a less recent one of the first and second sets of logical network state data and to discard the less recent set of logical network state data.

21. The method of claim 18 further comprising:
identifying a modification to a particular set of logical network state data provided to the second network controller; and
providing the modification to the particular set of logical network state data to the second network controller as an update specifying how to modify the particular set of logical network state data.

22. The method of claim 18, wherein the first network controller and a set of additional network controllers store the logical network state data for the plurality of sites as a distributed database at the first site.

23. A non-transitory machine-readable medium storing a first network controller for execution by at least one processing unit of a computing device at a first site of a plurality of sites spanned by a logical network, wherein network controllers execute at each site of the plurality of sites, the network controller comprising sets of instructions for:
generating logical network state data for the first site based on (i) data received from computing devices that implement the logical network at the first site and (ii) logical network configuration data from a network manager at the first site, wherein the data received from the computing devices at the first site comprises mappings of logical network addresses to physical network addresses associated with the computing devices, wherein the set of instructions for generating logical network state data for the first site comprises a set of instructions for generating a list of logical network addresses associated with a particular logical switch and located at the first site, wherein the list of logical network addresses does not include the physical addresses of the computing devices at the first network;
providing the logical network state data for the first site to a second network controller executing at a second site of the plurality of sites, said set of instructions for providing the logical network state data for the first site to the second network controller comprising a set of instructions for providing the list of logical network addresses to the second network controller, wherein the second network controller maps the list of logical network addresses to a set of physical network addresses used by the computing devices at the second site to transmit data messages associated with the logical switch to destinations located at the first site; and
providing logical network state data received from the second site to the computing devices that implement the logical network at the first site.

24. The non-transitory machine-readable medium of claim 23, wherein the first network controller further comprises a set of instructions for providing the mapping of a particular logical network address to a particular physical network address received from a first computing device at the first site to a second computing device at the first site.

25. The non-transitory machine-readable medium of claim 23, wherein:
a cluster of network controllers executes at each site of the plurality of sites;
each network controller at the first site has connectivity to each of the network controllers at each of the other sites of the plurality of sites; and for each other site of the plurality of sites, (i) one of the network controllers at the first site is designated for providing the logical network state data to the other site and (ii) one of the network controllers at the first site is designated for receiving logical network state data from the other site.

* * * * *